United States Patent
Zhu et al.

(10) Patent No.: US 12,525,888 B2
(45) Date of Patent: Jan. 13, 2026

(54) BIDIRECTIONAL POWER SUPPLY APPARATUS

(71) Applicant: Nanjing Chervon Industry Co., Ltd., Nanjing (CN)

(72) Inventors: Hong Zhu, Nanjing (CN); Qing Gao, Nanjing (CN); Mingyang Chen, Nanjing (CN); He Huang, Nanjing (CN); Zhijian Lu, Nanjing (CN); Yiwen Xiao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/913,304

(22) Filed: Oct. 11, 2024

(65) Prior Publication Data

US 2025/0119064 A1    Apr. 10, 2025

Related U.S. Application Data

(63) Continuation of application No. PCT/CN2023/096524, filed on May 26, 2023.

(30) Foreign Application Priority Data

May 26, 2022   (CN) .......................... 202210581680.5
Jan. 18, 2023   (CN) .......................... 202310067166.4
Apr. 21, 2023   (CN) .......................... 202310436685.3

(51) Int. Cl.
*H02M 3/335*   (2006.01)
*H02J 7/34*   (2006.01)
*H02J 7/35*   (2006.01)

(52) U.S. Cl.
CPC ........... *H02M 3/33584* (2013.01); *H02J 7/34* (2013.01); *H02J 7/35* (2013.01)

(58) Field of Classification Search
CPC ...... H02M 3/335; H02M 3/33584; H02J 7/34; H02J 7/35
See application file for complete search history.

(56) References Cited

U.S. PATENT DOCUMENTS

| | | |
|---|---|---|
| 6,134,124 A | 10/2000 | Jungreis |
| 2011/0115295 A1 | 5/2011 | Moon |
| 2017/0047760 A1 | 2/2017 | Rippel |
| 2018/0102706 A1 | 4/2018 | Gao |
| 2020/0207227 A1 | 7/2020 | Tan |

*Primary Examiner* — Robert L Deberadinis
(74) *Attorney, Agent, or Firm* — Greenberg Traurig, LLP

(57) ABSTRACT

A bidirectional power supply apparatus includes: an alternating current input port for inputting an alternating current to the bidirectional power supply apparatus; an alternating current output port for outputting the alternating current to an alternating current device; a direct current input or output port for transmitting a direct current between the bidirectional power supply apparatus and a direct current device bidirectionally; a bidirectional energy conversion module for performing multiple energy conversions on electrical energy inputted to the bidirectional power supply apparatus; and a power management module electrically connected to the alternating current input port, the alternating current output port, and the direct current input or output port. The power management module is configured to control an energy conversion manner of the bidirectional energy conversion module according to a port connection status of the alternating current input port, the alternating current output port, or the direct current input or output port.

20 Claims, 43 Drawing Sheets

BIDIRECTIONAL POWER SUPPLY APPARATUS

RELATED APPLICATION INFORMATION

This application is a continuation of International Application Number PCT/CN2023/096524, filed on May 26, 2023, through which this application also claims the benefit under 35 U.S.C. § 119(a) of Chinese Patent Application No. 202210581680.5, filed on May 26, 2022, Chinese Patent Application No. 202310067166.4, filed on Jan. 18, 2023, and Chinese Patent Application No. 202310436685.3, filed on Apr. 21, 2023, which applications are incorporated herein by reference in their entireties.

TECHNICAL FIELD

The present application relates to an energy apparatus, for example, a bidirectional power supply apparatus and system.

BACKGROUND

A charger is required to perform an energy conversion on an alternating current when a battery pack is charged with utility power while an inverter is required to convert the energy of the battery pack when the battery pack is used as a power supply of an alternating current powered device. Generally, the inverter that outputs energy to a load or the charger that outputs charging energy to the battery pack can only perform a unidirectional energy output.

SUMMARY

An energy apparatus includes: a load interface configured to access a load; a first power interface configured to access an alternating current power supply; a second power interface including a battery connection terminal adapted to be connected to a battery pack; and an energy conversion circuit capable of supplying charging energy to the battery back when the alternating current power supply and the battery pack are accessed or capable of supplying discharging energy to the load when the battery pack and the load are accessed.

An energy apparatus includes: a load interface configured to access a load; a power interface configured to access an alternating current power supply and/or a battery pack; and an energy conversion circuit capable of supplying charging energy to the battery back when the alternating current power supply and the battery pack are accessed or capable of supplying discharging energy to the load when the battery pack and the load are accessed. Charging power at which the energy apparatus supplies the charging energy is greater than or equal to 50 W and less than or equal to 8 kW. Discharging power at which the energy apparatus supplies the discharging energy is greater than or equal to 50 W and less than or equal to 8 kW.

An energy apparatus includes: a load interface configured to access a load; a power interface configured to access an alternating current power supply and/or a battery pack; and an energy conversion circuit capable of supplying charging energy to the battery back when the alternating current power supply and the battery pack are accessed or capable of supplying discharging energy to the load when the battery pack and the load are accessed. A charging current with which the energy apparatus supplies the charging energy is greater than or equal to 1 A and less than or equal to 150 A. A discharging current with which the energy apparatus supplies the discharging energy is greater than or equal to 1 A and less than or equal to 150 A.

An energy apparatus includes: a housing; a load interface configured to access a load; a first power interface configured to access an alternating current power supply; a second power interface configured to access a first energy storage apparatus; a second energy storage apparatus disposed in the housing to store electrical energy; and an energy conversion circuit capable of being electrically connected to the load interface, the first power interface, the second power interface, and the second energy storage apparatus, performing multiple energy conversions on accessed electrical energy, and supplying the converted electrical energy to the second power interface, the load interface, or the second energy storage apparatus.

An energy apparatus includes: a load interface configured to access a load; a first power interface configured to access an alternating current power supply; a second power interface including a battery connection terminal adapted to be connected to a battery pack; and an energy conversion circuit having a first circuit port and a second circuit port. The first circuit port is electrically connected to one or two of the load interface, the first power interface, and the second power interface, and the second circuit port is electrically connected to at least one remaining interface. The energy conversion circuit is capable of performing multiple energy conversions on accessed electrical energy and outputting electrical energy to be supplied to the first circuit port and electrical energy to be supplied to the second circuit port.

An energy apparatus includes: a load interface configured to access a load; a first power interface configured to access an alternating current power supply; a second power interface including a battery connection terminal adapted to be connected to a battery pack; and an energy conversion circuit having a first circuit port and a second circuit port. The first circuit port is electrically connected to one or two of the load interface, the first power interface, and the second power interface, and the second circuit port is electrically connected to at least one remaining interface. The energy conversion circuit is capable of performing multiple energy conversions on accessed electrical energy and outputting electrical energy to be supplied to the first circuit port and electrical energy to be supplied to the second circuit port. Output power at which the energy apparatus supplies the electrical energy is greater than or equal to 50 W and less than or equal to 8 kW.

An energy apparatus includes: a load interface configured to access a load; a first power interface configured to access an alternating current power supply; a second power interface including a battery connection terminal adapted to be connected to a battery pack; and an energy conversion circuit having a first circuit port and a second circuit port. The first circuit port is electrically connected to one or two of the load interface, the first power interface, and the second power interface, and the second circuit port is electrically connected to at least one remaining interface. The energy conversion circuit is capable of performing multiple energy conversions on accessed electrical energy and outputting electrical energy to be supplied to the first circuit port and electrical energy to be supplied to the second circuit port. An output current at which the energy apparatus supplies the electrical energy is greater than or equal to 1 A and less than or equal to 150 A.

An energy apparatus includes: a housing; a load interface configured to access a load; an external power interface configured to access an alternating current power supply and a first energy storage apparatus and configured to access a first energy storage apparatus; an internal power interface configured to access a second energy storage apparatus disposed in the housing; and an energy conversion circuit having a first circuit port and a second circuit port. The first circuit port is electrically connected to at least one of the load interface, the external power interface, and the internal power interface, and the second circuit port is electrically connected to at least one remaining interface. The energy conversion circuit is capable of performing multiple energy conversions on accessed electrical energy and outputting electrical energy to be supplied to the first circuit port and electrical energy to be supplied to the second circuit port.

An energy system includes: a load; a battery pack configured to supply direct current electrical energy for supplying power; an alternating current power supply configured to supply alternating current electrical energy for supplying power; and an energy apparatus including at least a load interface configured to access the load, a first power interface configured to access the alternating current power supply, and a second power interface including a battery connection terminal adapted to be connected to the battery pack. The energy apparatus is capable of outputting electrical energy for supplying the power so that the battery pack or the load is powered, where the electrical energy for supplying the power has different flow directions.

An energy system includes: a load; a first energy storage apparatus configured to store electrical energy; an alternating current power supply configured to supply alternating current electrical energy for supplying power; an energy apparatus electrically connected to at least two of the first energy storage apparatus, the alternating current power supply, and the load; and a control unit connected to at least the energy apparatus and capable of controlling the energy apparatus to provide multiple energy conversion states. The energy apparatus outputs electrical energy in different flow directions in different energy conversion states. Output power at which the energy apparatus supplies the electrical energy is greater than or equal to 50 W and less than or equal to 8 kW.

An energy system includes: a load; a first energy storage apparatus configured to store electrical energy; an alternating current power supply configured to supply alternating current electrical energy for supplying power; an energy apparatus electrically connected to at least two of the first energy storage apparatus, the alternating current power supply, and the load; and a control unit connected to at least the energy apparatus and capable of controlling the energy apparatus to provide multiple energy conversion states. The energy apparatus outputs electrical energy in different flow directions in different energy conversion states. An output current at which the energy apparatus supplies the electrical energy is greater than or equal to 1 A and less than or equal to 150 A.

An energy apparatus includes: a housing; a load interface configured to access a load; a power interface configured to access an alternating current power supply and/or a first energy storage apparatus; and a second energy storage apparatus disposed in the housing to store electrical energy. The energy apparatus is configured to output a charging current or a discharging current in different flow directions so that the electrical energy is supplied to the first energy storage apparatus, the second energy storage apparatus, or the load.

A moving device includes: a body; a moving wheel set including moving wheels supporting the body; a functional assembly mounted on the body and used by the moving device to perform the function of an accessory; an energy storage apparatus configured to store energy; and an energy apparatus capable of being mounted on the body and accessing an alternating current power supply to charge the energy storage apparatus or converting the energy in the energy storage apparatus to power the moving device or another electric device.

An energy apparatus includes: a load interface configured to access a load; a power interface configured to access an alternating current power supply and/or a battery pack; and an energy conversion circuit capable of supplying charging energy to the battery back when the alternating current power supply and the battery pack are accessed or capable of supplying discharging energy to the load when the battery pack and the load are accessed. The energy conversion circuit includes a bidirectional direct current-direct current (DC-DC) module, an inverter module, and a power factor correction (PFC) module.

An energy apparatus includes: a load interface configured to access a load; a power interface configured to access an alternating current power supply and/or a battery pack; and an energy conversion circuit capable of supplying charging energy to the battery back when the alternating current power supply and the battery pack are accessed or capable of supplying discharging energy to the load when the battery pack and the load are accessed. The energy conversion circuit includes two unidirectional DC-DC modules and a bidirectional inverter module.

An energy apparatus includes: a housing; a load interface configured to access a load; a power interface configured to access an alternating current power supply and/or a first energy storage apparatus; a second energy storage apparatus disposed in the housing to store electrical energy; and an energy conversion circuit capable of supplying charging energy to the first energy storage apparatus and/or the second energy storage apparatus when the alternating current power supply is accessed or capable of supplying discharging energy to the load when the first energy storage apparatus and/or the second energy storage apparatus are accessed. The energy conversion circuit includes a bidirectional DC-DC module, an inverter module, and a PFC module.

An energy apparatus includes: a housing; a load interface configured to access a load; a power interface configured to access an alternating current power supply and/or a first energy storage apparatus; a second energy storage apparatus disposed in the housing to store electrical energy; and an energy conversion circuit capable of supplying charging energy to the first energy storage apparatus and/or the second energy storage apparatus when the alternating current power supply is accessed or capable of supplying discharging energy to the load when the first energy storage apparatus and/or the second energy storage apparatus are accessed. The energy conversion circuit includes two unidirectional DC-DC modules and a bidirectional inverter module.

A bidirectional power supply apparatus includes: an alternating current input port configured to input an alternating current to the bidirectional power supply apparatus; an alternating current output port configured to output the alternating current to an alternating current device; a direct current input or output port configured to be capable of at least transmitting a direct current between the bidirectional power supply apparatus and a direct current device bidirectionally; a bidirectional energy conversion module configured to be capable of at least performing multiple energy conversions on electrical energy inputted to the bidirectional power supply apparatus; and a power management module electrically connected to at least the alternating current input port, the alternating current output port, and the direct current input or output port. The power management module is configured to control an energy conversion manner of the bidirectional energy conversion module according to a port connection status of the alternating current input port, the alternating current output port, or the direct current input or output port.

A bidirectional power supply apparatus includes: a housing; an alternating current input port configured to input an alternating current to the bidirectional power supply apparatus; an alternating current output port configured to output the alternating current to an alternating current device; a direct current input or output port configured to be capable of at least transmitting a direct current between the bidirectional power supply apparatus and a direct current device bidirectionally, where the direct current device includes at least a third energy storage apparatus capable of storing and outputting electrical energy; a bidirectional energy conversion module configured to be capable of at least performing multiple energy conversions on electrical energy inputted to the bidirectional power supply apparatus; and a power management module electrically connected to at least the alternating current input port, the alternating current output port, and the direct current input or output port. The power management module is configured to control an energy conversion manner of the bidirectional energy conversion module according to a port connection status of the alternating current input port, the alternating current output port, or the direct current input or output port. The output power of the alternating current output port and/or the direct current input or output port is greater than or equal to 600 W.

A bidirectional power supply apparatus includes: a housing; an alternating current input port configured to input an alternating current to the bidirectional power supply apparatus; an alternating current output port configured to output the alternating current to an alternating current device; a direct current input or output port configured to be capable of at least transmitting a direct current between the bidirectional power supply apparatus and a direct current device bidirectionally; a bidirectional energy conversion module configured to be capable of at least performing multiple energy conversions on electrical energy inputted to the bidirectional power supply apparatus; and a power management module electrically connected to at least the alternating current input port, the alternating current output port, and the direct current input or output port. The direct current device includes at least a third energy storage apparatus. The bidirectional power supply apparatus further includes a fourth energy storage apparatus disposed in the housing. The power management module is configured to control a discharging manner of the third energy storage apparatus and a discharging manner of the fourth energy storage apparatus.

A bidirectional power supply apparatus includes: a housing; an alternating current input port configured to input an alternating current to the bidirectional power supply apparatus; an alternating current output port configured to output the alternating current to an alternating current device; a direct current input or output port configured to be capable of at least transmitting a direct current between the bidirectional power supply apparatus and a direct current device bidirectionally; a bidirectional energy conversion module configured to be capable of at least performing multiple energy conversions on electrical energy inputted to the bidirectional power supply apparatus; and a power management module electrically connected to at least the alternating current input port, the alternating current output port, and the direct current input or output port. The direct current device includes at least a third energy storage apparatus. The bidirectional power supply apparatus further includes a fourth energy storage apparatus disposed in the housing. The power management module is configured to control, according to a status of access of the alternating current input port and the direct current input or output port to a charging power supply, the third energy storage apparatus and the fourth energy storage apparatus to be charged.

A power supply apparatus system includes multiple bidirectional power supply apparatuses. Each of the multiple bidirectional power supply apparatuses includes: at least one electrical energy input port configured to input electrical energy to the bidirectional power supply apparatus; at least one electrical energy output port configured to output the electrical energy to a powered device; and a bidirectional energy conversion module configured to be capable of at least performing multiple energy conversions on the electrical energy inputted to the bidirectional power supply apparatus. At least one electrical energy output port of one of at least two bidirectional power supply apparatuses and at least one electrical energy output port of another one of the at least two bidirectional power supply apparatuses are electrically coupled to each other and then output the electrical energy.

A bidirectional power supply apparatus includes: a housing; at least one electrical energy input port configured to input electrical energy to the bidirectional power supply apparatus; at least one electrical energy output port configured to output the electrical energy to a powered device; and a bidirectional energy conversion module configured to be capable of at least performing multiple energy conversions on the electrical energy inputted to the bidirectional power supply apparatus. The at least one electrical energy input port is cascaded to multiple third energy storage apparatuses, or each of the at least one electrical energy input port is connected to one of the multiple third energy storage apparatuses.

A bidirectional power supply apparatus includes: a housing; at least one electrical energy input port configured to input electrical energy to the bidirectional power supply apparatus; at least one electrical energy output port configured to output the electrical energy to a powered device; and a bidirectional energy conversion module configured to be capable of at least performing multiple energy conversions on the electrical energy inputted to the bidirectional power supply apparatus. The bidirectional power supply apparatus is detachably cascaded to at least one capacity expansion apparatus. At least one third energy storage apparatus is built in a capacity expansion apparatus.

A bidirectional power supply apparatus includes an apparatus body. The apparatus body includes: a fourth energy storage apparatus built in the apparatus body; at least one electrical energy input port configured to input electrical energy to the bidirectional power supply apparatus; at least one electrical energy output port configured to output the electrical energy to a powered device; and a bidirectional energy conversion module configured to be capable of at least performing multiple energy conversions on the electrical energy inputted to the bidirectional power supply apparatus. The bidirectional power supply apparatus further includes at least one capacity expansion apparatus detachably cascaded to the apparatus body. At least one third energy storage apparatus is built in a capacity expansion apparatus.

A bidirectional power supply apparatus includes: a housing; at least one electrical energy input port configured to input electrical energy to the bidirectional power supply apparatus; at least one electrical energy output port configured to output the electrical energy to a powered device; and a bidirectional energy conversion module configured to be capable of at least performing multiple energy conversions on the electrical energy inputted to the bidirectional power supply apparatus. The bidirectional power supply apparatus is detachably cascaded to at least one capacity expansion apparatus. At least one third energy storage apparatus is built in a capacity expansion apparatus. Each of multiple third energy storage apparatuses in the capacity expansion apparatus has a different electrical parameter.

DETAILED DESCRIPTION

Figure 1A:
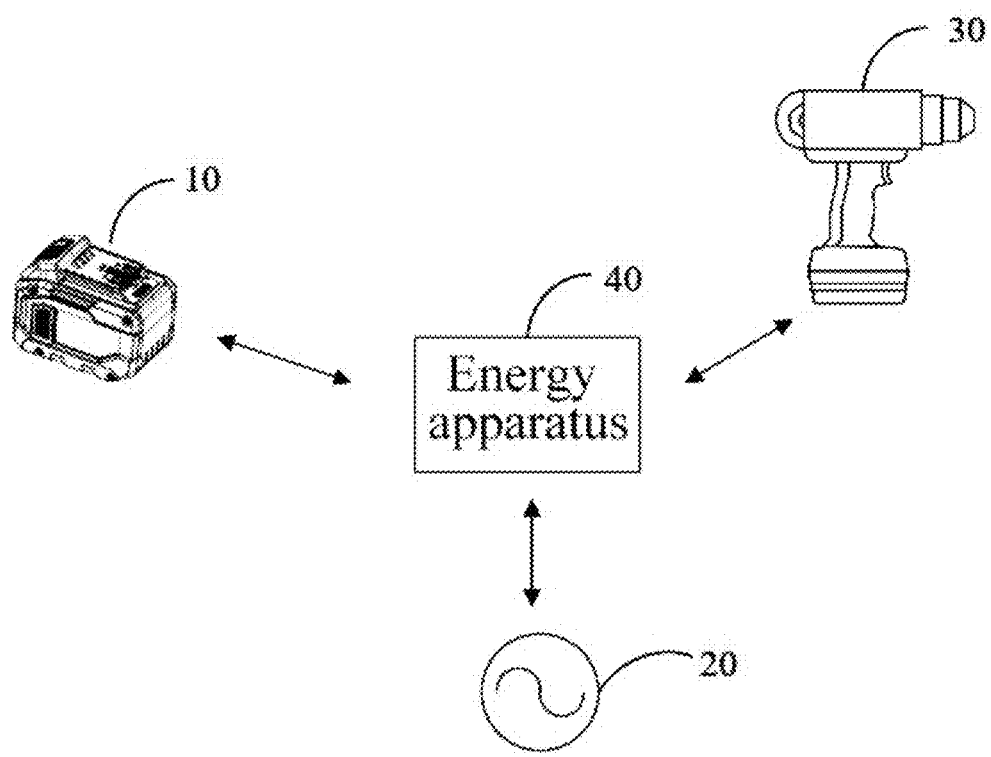
FIG. 1A is a structural view of an energy system in an example of the present application.

The present application is described below in detail in conjunction with the drawings and examples. It is to be understood that the examples described herein are intended to only illustrate the present application and not to limit the present application. Additionally, it is also to be noted that for ease of description, only part, not all, of structures related to the present application are illustrated in the drawings.

Unless otherwise defined, all technical and scientific terms used herein have the same meanings as those commonly understood by those skilled in the art to which the present application pertains. Terms used in the specification of the present application are only used for describing the examples and are not intended to limit the present application. The term "and/or" used herein includes any or all combinations of one or more listed associated items.

A load to which technical solutions in the present application are applicable may be a power tool. The power tool may be a handheld power tool, for example, a drill, a pruner, or a sander. Alternatively, the power tool may be a table tool, for example, a table saw or a miter saw. Alternatively, the power tool may be a push power tool, for example, a push mower or a push snow thrower. Alternatively, the power tool may be a riding power tool, for example, a riding mower, a riding vehicle, or an all-terrain vehicle. Alternatively, the power tool may be a robotic tool, for example, a robotic mower or a robotic snow thrower. In some examples, the power tool may be an electric drill, an electric light, an electric vehicle, or the like. In some examples, the power tool may be a garden tool, for example, a pruner, a blower, a mower, or a chain saw. Alternatively, the power tool may be a decoration tool, for example, a screwdriver, a nail gun, a circular saw, or a sander. In some examples, the power tool may be a vegetation maintenance tool, for example, a string trimmer, a mower, a pruner, or a chain saw. Alternatively, the power tool may be a cleaning tool, for example, a blower, a snow thrower, or a washer. Alternatively, the power tool may be a drilling tool, for example, a drill, a screwdriver, a wrench, or an electric hammer. Alternatively, the power tool may be a sawing tool, for example, a reciprocating saw, a jigsaw, or a circular saw. Alternatively, the power tool may be a table tool, for example, a table saw, a miter saw, a metal cutter, or an electric router. Alternatively, the power tool may be a sanding tool, for example, an angle grinder or a sander. Alternatively, the power tool may be another tool, for example, a light or a fan. Of course, the load may include another type of household appliance.

It is to be noted that an energy storage apparatus in the present application may include a battery pack or a direct current power supply. In different examples, a battery pack, an energy storage apparatus, a direct current power supply, and a battery may be equivalently replaced. That is, all the preceding names may be understood as having the same meaning. An alternating current power supply, utility power, a power grid, or the like in the present application may also be equivalently replaced.

Referring to FIG. 1A, an energy system includes a direct current power supply 10, an alternating current power supply 20, a load 30, and an energy apparatus 40. The direct current power supply 10 may be a rechargeable battery pack applicable to power tools, for example, a lithium battery pack or a lithium iron phosphate battery pack. In the examples of the present application, the direct current power supply 10 mainly refers to a battery pack for tools. Hereinafter, the direct current power supply 10 may be directly replaced by the battery pack 10. The alternating current power supply 20 may be the utility power or an alternating current accessed through another device, for example, a charging pile or an adapter. The energy apparatus 40 may be an apparatus capable of converting and transferring energy. In this example, the energy apparatus 40 has more than one energy transfer direction. The energy transfer direction is related to the type of power supply connected to the energy apparatus 40 or whether the load is connected to the energy apparatus 40. Alternatively, the energy transfer direction may be related to an electrical parameter of a power supply or a load connected to the energy apparatus 40.

In an example, the energy apparatus 40 can be connected to the direct current power supply 10, the alternating current power supply 20, or the load 30 mentioned above. Thus, the energy apparatus 40 can establish multiple connection relationships with the battery pack 10, the alternating current power supply 20, or the load 30 mentioned above. For example, the energy apparatus 40 may establish connection relationships with the battery pack 10 and the alternating current power supply 20, establish connection relationships with the battery pack 10 and the load 30, establish connection relationships with the alternating current power supply 20 and the load 30, or establish connection relationships with the battery pack 10, the alternating current power supply 20, and the load 30. In different connection relationships, the energy apparatus 40 may have different energy transfer directions.

In an example, in the case where the energy apparatus 40 is connected to the alternating current power supply 20 and the load 30, the load 30 may be powered with electrical energy supplied by the alternating current power supply 20. In an example, in the case where the energy apparatus 40 is connected to the alternating current power supply 20 and the battery pack 10 for the tools, the battery pack 10 may be powered with the electrical energy supplied by the alternating current power supply 20. In an example, in the case where the energy apparatus 40 is connected to the battery pack and the load 30, the load 30 may be powered with electrical energy supplied by the battery pack 10. In an example, the energy apparatus 40 may charge the battery pack and power the power tool 30 at the same time in the case where the energy apparatus 40 accesses all of the alternating current power supply 20, the battery pack, and the load 30.

In an example, one port of the energy apparatus 40 may be connected to the lithium iron phosphate battery pack, and another port of the energy apparatus 40 may be connected to the load so that the load is powered by the lithium iron phosphate battery pack. In an example, the energy apparatus 40 may be connected to the lithium iron phosphate battery pack through an adapter, and one port of the energy apparatus 40 may be connected to the load so that the load is powered by the lithium iron phosphate battery pack. In an example, the energy apparatus 40 may be connected to the lithium iron phosphate battery pack through the adapter, and one port of the energy apparatus 40 may access the utility power so that the lithium iron phosphate battery pack is charged.

Figure 1B:
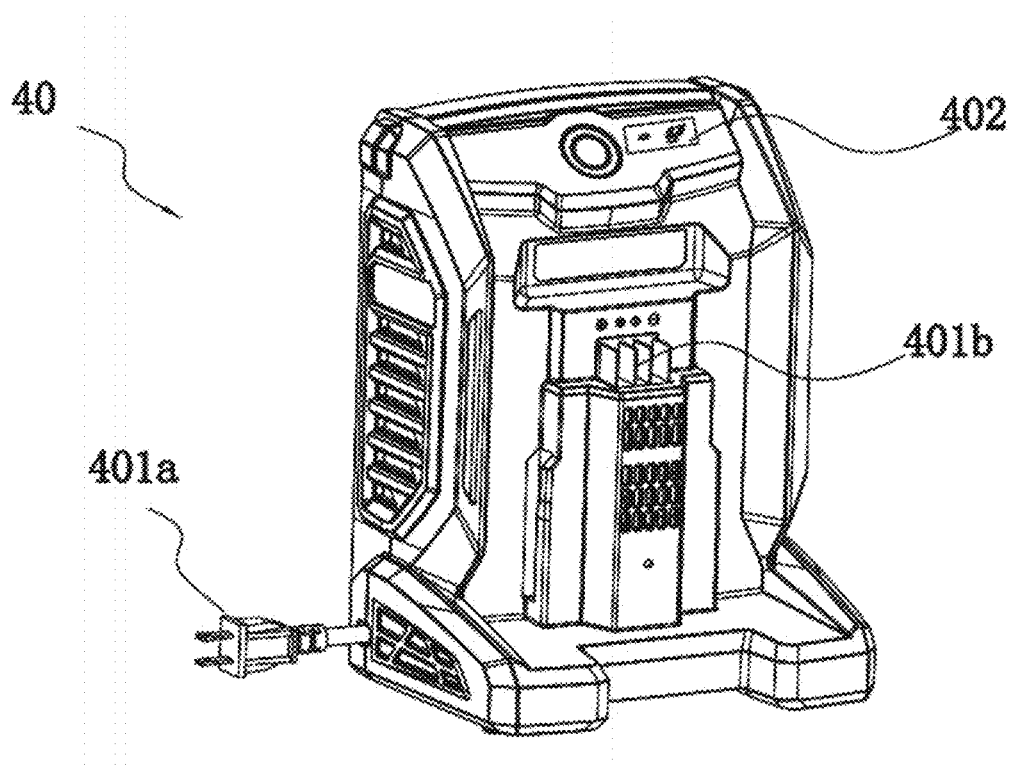
FIGS. 1B to 1B are structural views of possible loads in an example of the present application.

In an example, the energy apparatus 40 may be a charger 40 shown in FIG. 1B. A first power interface 401a can access the utility power. A second power interface 401b can access the battery pack. A load interface 402 can access various types of power tools or household appliances. The second power interface 401b may be a type-C interface, a Universal Serial Bus (USB) interface, a PIN interface, a Lighting interface, or the like.

Figure 1C:
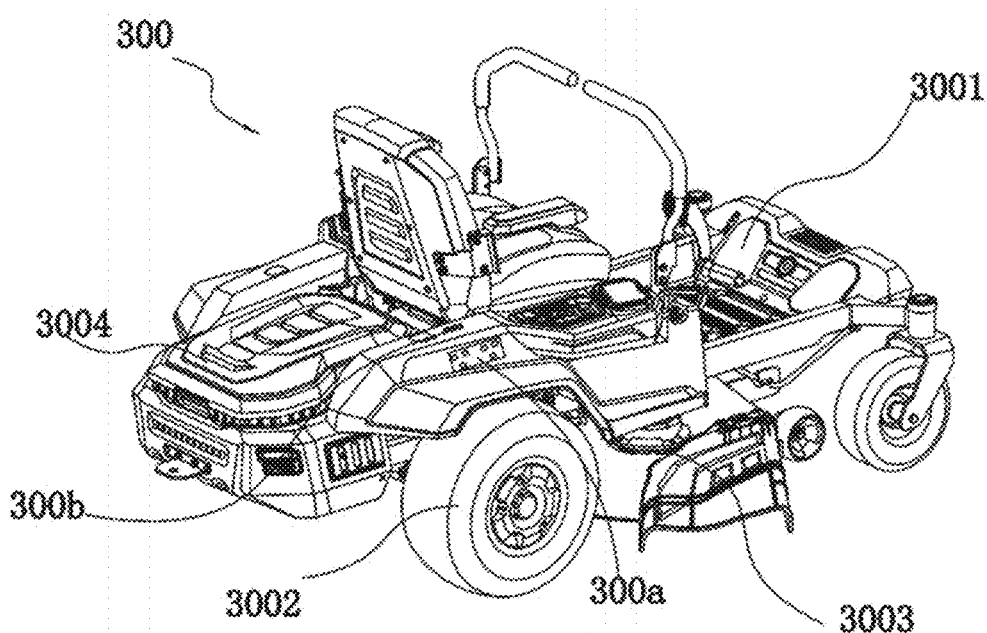
FIG. 1C illustrates an example mowing device.

In an example, a moving device 300 shown in FIG. 1C may be a riding garden power tool. The moving device 300 may include a body 3001, a moving wheel set 3002, a functional assembly 3003, an energy storage apparatus 3004, and the energy apparatus 40. In this example, the functional assembly 3003 may be a mowing assembly. In another example, the functional assembly may be a snow throwing assembly, a blowing assembly, or the like. The energy storage apparatus 3004 may be fixedly mounted in a housing at the front end of the moving device 300 or may be detachably mounted on the moving device 300. In an example, the energy apparatus 40 may be built in the moving device 300 or configured to be immediately adjacent to the energy storage apparatus 3004. Alternatively, the energy storage apparatus 3004 is disposed in the energy apparatus 40 or mounted at the upper or lower end of the energy apparatus 40. In an example, the energy apparatus 40 may be detachably mounted on the moving device 300. In an example, the outside of the moving device 300 may be provided with a first power interface 300a and a load interface 300b. Thus, the moving device 300 may directly access an alternating current power grid to charge the energy storage apparatus 3004 or may access another electric device to power the electric device. For example, a household water heater, a coffee machine, and a blender may directly obtain the electrical energy from the moving device 300 through the load interface 300b.

Figure 1D:
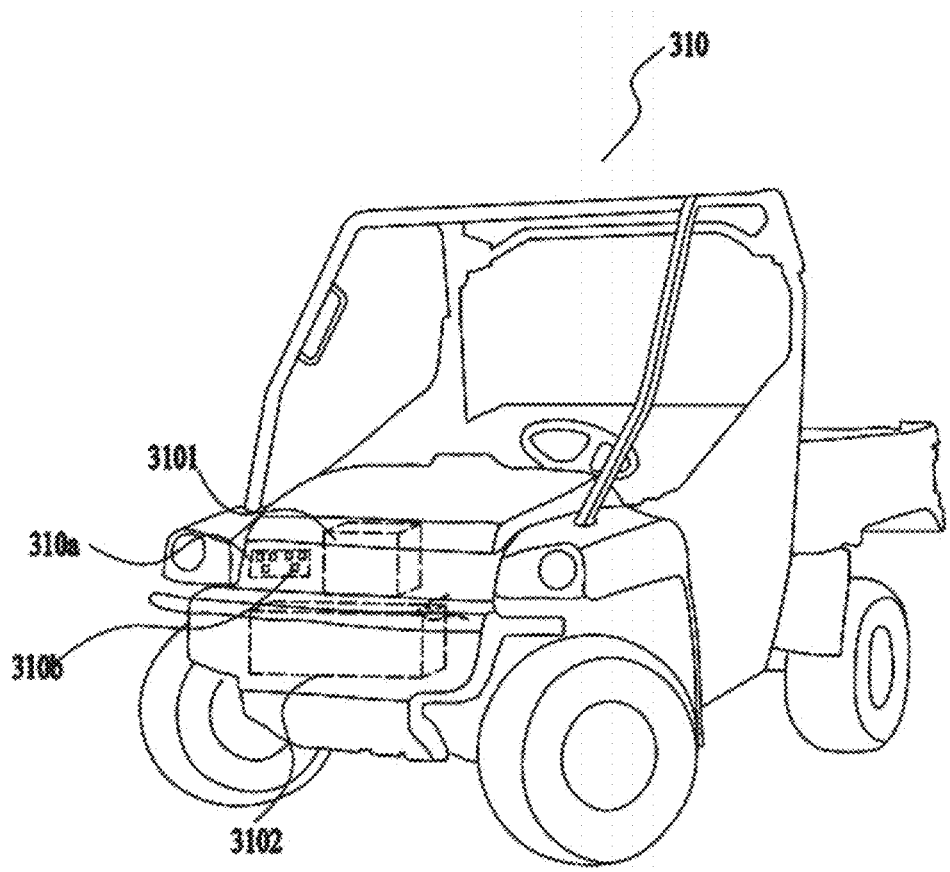
FIG. 1D illustrates a further example mowing device.

An outdoor moving device shown in FIG. 1D may be an all-terrain vehicle 310. An energy storage apparatus 3101 and an energy apparatus 3102 may be disposed at the front end of a vehicle body and inside a hood. The front end of the vehicle may be provided with a first power interface 310a and a load interface 310b. Thus, the all-terrain vehicle 310 may directly access the alternating current power grid to charge the energy storage apparatus 3101 or may access another electric device to power the electric device. In this example, the energy storage apparatus 3101 and the energy apparatus 3102 are disposed near front moving wheels, and the energy storage apparatus 3101 is disposed on the upper side of the energy apparatus 3102. Optionally, the energy storage apparatus 3101 and the energy apparatus 3102 may be disposed near rear moving wheels.

In an example, a charging protocol for the energy apparatus 40 may be matched with a charging protocol for a charging pile interface of an electric vehicle. Thus, the energy apparatus 40 can be connected to a charging pile of the vehicle to charge the battery pack for the tools or power another load. For example, a household appliance, such as a blender or a microwave oven, is powered.

In an example, a battery may be built in the energy apparatus 40. The built-in battery may be mounted in the energy apparatus 40 in a non-detachable manner. In an example, the energy apparatus 40 may charge the built-in battery using the accessed utility power. In an example, the energy apparatus 40 may power the accessed load using the built-in battery. In an example, the built-in battery in the energy apparatus 40 may discharge electricity to the accessed external battery pack 10.

In an example, energy transferred by the energy apparatus 40 in the different connection relationships may be charging currents or discharging currents in different flow directions.

Figure 2:
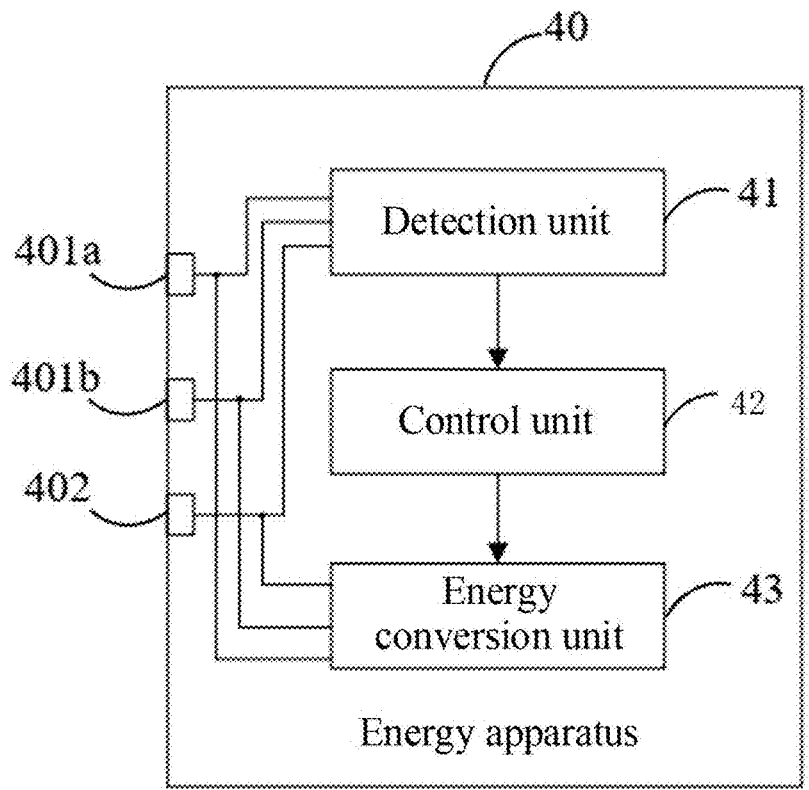
FIG. 2 is a structural diagram of an energy apparatus in an example of the present application.

In an example, referring to FIG. 2, the energy apparatus 40 has two power interfaces 401. When a power interface 401a accesses the alternating current power grid and a power interface 401b accesses the battery pack, the energy apparatus 40 may convert the electrical energy of the alternating current power grid into a charging current to charge the battery pack. The second power interface 401b configured to access the battery pack may be a battery connection terminal adapted to be connected to the battery pack. The type of the terminal may be matched with battery packs with multiple types of interfaces and is matched with a charging port on the battery pack. For example, the battery connection terminal may be a connection electrode plate, a type-C interface, and a wireless charging port. In addition, the energy apparatus 40 also has the load interface 402. In an example, the load interface 402 may be generally an alternating current output port interface capable of outputting an alternating current to power the load. That is to say, the energy apparatus 40 may implement a direct current-alternating current (DC-AC) energy conversion and an alternating current-direct current (AC-DC) energy conversion.

Figure 3:
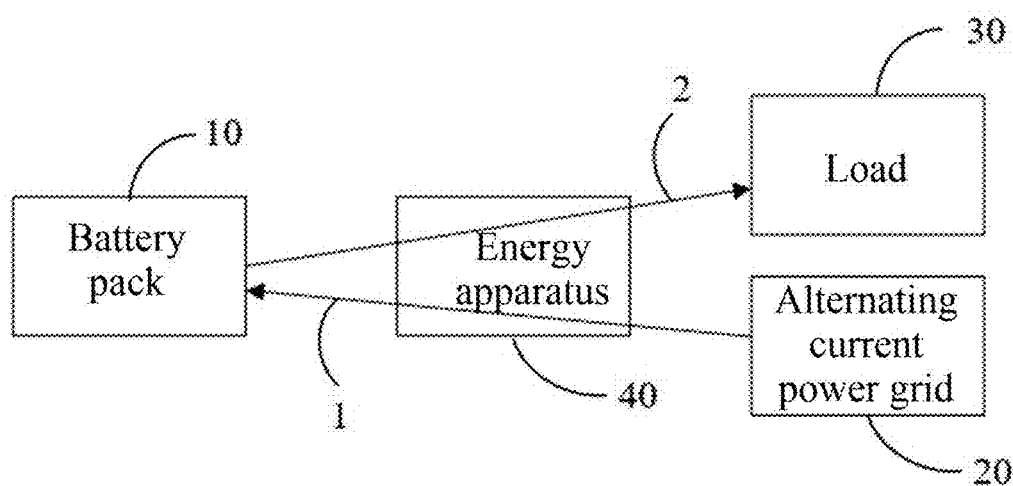
FIGS. 3 to 5 are schematic diagrams showing three connection relationships of an energy apparatus in an example of the present application.

In an example, referring to the connection relationship shown in FIG. 3, when the power interface 401b accesses the battery pack and the load interface 402 accesses the power tool 30, the energy apparatus 40 may convert the electrical energy of the battery pack and then supply the energy to the load 30. In this example, after the power supply or tool accessed by the energy apparatus 40 is determined, the energy flow direction thereof may also be determined. That is to say, after the current connection relationship of the energy apparatus 40 in the energy system is determined, the energy flow direction in the energy system may also be determined. In the preceding connection relationship, the energy apparatus 40 may convert the electrical energy of the alternating current power grid into charging electrical energy to charge the battery pack 10. Line 1 in FIG. 3 represents the flow direction of the charging current. In this example, the energy apparatus 40 may convert the electrical energy of the battery pack 10 into discharging electrical energy to power the power tool 30. Line 2 in FIG. 3 represents the flow direction of a discharging current. In this example, the charging current with which the energy apparatus 40 supplies the charging energy is greater than or equal to 1 A and less than or equal to 150 A, and the discharging current with which the energy apparatus 40 supplies the discharging energy is greater than or equal to 1 A and less than or equal to 350 A. In an example, a maximum charging current outputted by the energy apparatus 40 may fluctuate around 150 A, and a maximum discharging current outputted by the energy apparatus 40 may fluctuate around 350 A. In an example, the charging current that the energy apparatus 40 can supply is greater than or equal to 25 A and less than or equal to 150 A, and the discharging current that the energy apparatus 40 can supply is greater than or equal to 25 A and less than or equal to 150 A. For example, the charging current is 50 A, 60 A, 70 A, 80 A, 90 A, 100 A, 120 A, 130

A, 140 A, or 150 A. For example, the discharging current is 50 A, 60 A, 70 A, 80 A, 90 A, 100 A, 120 A, 130 A, 140 A, or 150 A.

In an example, charging power at which the energy apparatus 40 supplies the charging energy is greater than or equal to 50 W and less than or equal to 8 kW. For example, the charging power may be 50 W, 100 W, 150 W, 200 W, 500 W, 550 W, 1.2 kW, 1.5 kW, 2 kW, 3 KW, 4 KW, 5 KW, 6 KW, 7 kW, or 8 kW. In an example, discharging power at which the energy apparatus 40 supplies the discharging energy is greater than or equal to 50 W and less than or equal to 8 kW. For example, the discharging power may be 50 W, 100 W, 150 W, 200 W, 500 W, 550 W, 1.2 kW, 1.5 KW, 2 KW, 3 KW, 4 kW, 5 kW, 6 KW, 7 kW, or 8 kW.

In an example, the energy apparatus 40 may be a charger capable of outputting charging power of greater than or equal to 550 W and less than or equal to 8 kW.

In this example, the connection relationship shown in FIG. 3 may occur in the following scenarios: in the case where the power grid is normal, the power grid may charge the battery pack through the energy apparatus 40; and in the case where the power grid is abnormal or at a place where no power grid exists, the battery pack may power the load through the energy apparatus 40. That is to say, the energy apparatus 40 may be used as both the charger and an inverter to be capable of implementing a bidirectional flow of the energy.

Figure 4:
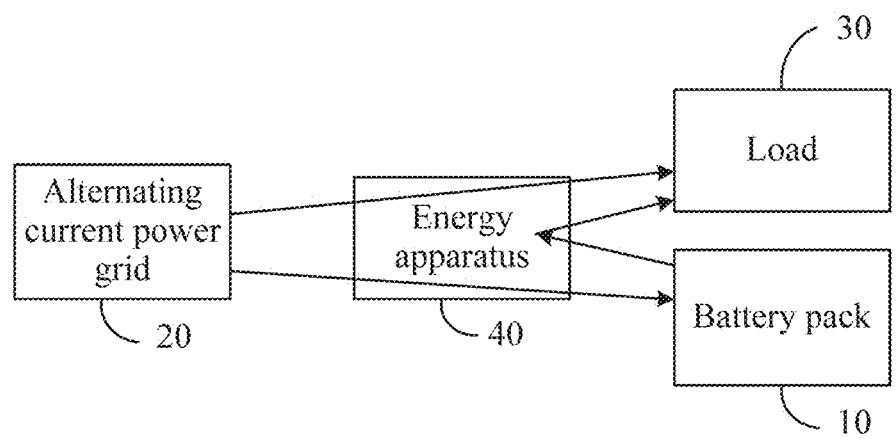

In an example, referring to the connection relationship shown in FIG. 4, the energy apparatus 40 may access the alternating current power grid 20 and the battery pack 10 and convert the electrical energy outputted by the alternating current power grid 20 to output the charging current for charging the battery pack 10, as described in the preceding example. Alternatively, the energy apparatus 40 may access the battery pack 10 and the power tool 30 and convert the electrical energy outputted by the battery pack 10 to output the discharging current for powering the power tool 30. A difference lies in that the energy apparatus 40 may also access the alternating current power grid 20, the battery pack 10, and the power tool 30 at the same time in this example. In this case, the energy apparatus 40 may convert the electrical energy outputted by the alternating current power grid 20 into the charging current for charging the battery pack 10 and the discharging current for powering the power tool 30. That is to say, in this example, the discharging current outputted by the energy apparatus 40 may be supplied by the alternating current power grid 20 in addition to the battery pack 10.

The connection relationship provided in this example may occur in the following scenarios: in the case where the power grid is normal, the power grid may charge the battery pack through the energy apparatus 40 and power the power tool 30 through the energy apparatus 40; and in the case where the power grid is abnormal or at the place where no power grid exists, the battery pack may power the power tool through the energy apparatus 40. That is to say, the energy apparatus 40 may be used as both the charger and the inverter and can implement the bidirectional flow of the energy.

Figure 5:
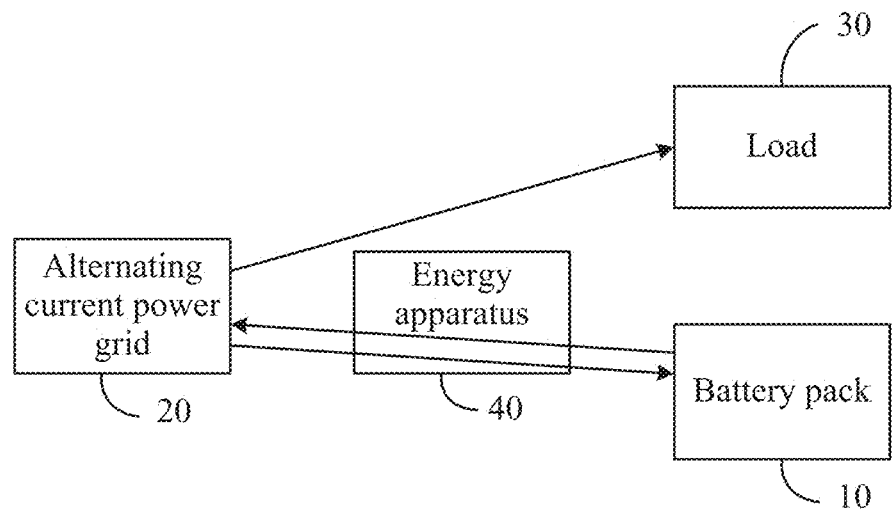

In an example, referring to the connection relationship shown in FIG. 5, the energy apparatus 40 may have no tool interface and may not directly access the power tool 30. The energy apparatus 40 may convert the energy supplied by the alternating current power grid into the charging current to charge the battery pack 10. The alternating current power grid 20 may directly power the power tool 30 without the energy apparatus 40. Moreover, after the energy apparatus 40 accesses the battery pack 10 and the alternating current power grid 20, the alternating current power grid 20 may be used as a power grid node, and the electrical energy outputted by the battery pack 10 may be converted to power the power tool 30 through the power grid node.

The connection relationship provided in this example may occur in the following scenarios: in the case where the power grid is normal, the power grid may charge the battery pack through the energy apparatus 40 and power the power tool 30 without the energy apparatus 40; and in the case where the power grid is abnormal or at the place where no power grid exists, the alternating current power grid as the power grid node may transmit the discharging current supplied by the battery pack in the energy apparatus 40 to power the power tool. That is to say, the energy apparatus 40 may be used as both the charger and the inverter to be capable of implementing the bidirectional flow of the energy.

FIGS. 3 to 5 show the manners in which the energy apparatus 40 implements energy transfer in the different connection relationships. Straight lines with arrows in the figures indicate energy flow directions. A straight line with an arrow passing through the energy apparatus 40 indicates that the energy apparatus 40 can convert the energy and supply the converted energy to the target pointed by the arrow. A straight line with an arrow not passing through the energy apparatus 40 indicates that the devices or power supplies at two ends of the straight line can directly transfer the energy without converting the energy. In fact, the energy flow direction in the energy apparatus 40 is not only related to the current connection relationship of the apparatus but also may be related to an electrical parameter of the power supply or the power tool in the current connection relationship.

In an example, as shown in FIG. 2, the energy apparatus 40 may include a detection unit 41 and a control unit 42. The detection unit 41 can detect at least a connection state of the load interface 402 or a connection state of the power interface 401 and an electrical parameter of the power tool 30, the alternating current power supply 20, or the direct current power supply 10 in the current connection relationship. For example, the connection state may refer to whether the load interface 402 accesses the tool or whether the power interface 401 accesses the power supply and whether the connection between the tool or the power supply and the energy apparatus 40 is stable. For example, the electrical parameter may refer to a current battery level, the maximum charging current, or the maximum charging voltage of the battery pack, the maximum quantity of electricity charged into the battery pack, the rated voltage of the tool, the rated current of the tool, or the voltage of the power grid. The control unit 42 can control, according to the connection state and the electrical parameter detected by the detection unit 41, the energy apparatus 40 to convert the energy accordingly to obtain a charging current or a discharging current that satisfies requirements of the connection state and the electrical parameter. For example, the detection unit 41 detects that the power interface 401*a* accesses the alternating current power grid and the connection state is stable, the power interface 401*b* accesses the battery pack and the connection state is stable, and the battery pack has a relatively low battery level. The control unit 42 controls, according to the preceding detection results, the energy apparatus 40 to convert the electrical energy supplied by the alternating current power grid into the charging current to charge the battery pack.

In this example, the energy apparatus 40 includes an energy conversion circuit 43. The energy conversion circuit 43 can be electrically connected to the load interface 402, the first power interface 401a, the second power interface 401b, and a second energy storage apparatus, perform multiple energy conversions on accessed electrical energy, and supply the converted electrical energy to the second power interface, the load interface, or the second energy storage apparatus. The first energy storage apparatus may be the battery pack for the tools, and the second energy storage apparatus (not shown) may be the built-in battery disposed in the energy apparatus 40. Generally, the first energy storage apparatus is the preceding battery pack 10.

In this example, the energy storage material of the first energy storage apparatus 10 is different from the energy storage material of the second energy storage apparatus. For example, the energy storage material of the first energy storage apparatus 10 is ternary lithium, and the energy storage material of the second energy storage apparatus is lithium iron phosphate. In an example, the total capacity of the first energy storage apparatus is different from the total capacity of the second energy storage apparatus. In an example, the total capacity of the first energy storage apparatus is less than the total capacity of the second energy storage apparatus. In an example, the total capacity of the first energy storage apparatus is greater than the total capacity of the second energy storage apparatus. In an example, the total energy of the first energy storage apparatus is different from the total energy of the second energy storage apparatus. In an example, the total energy of the first energy storage apparatus is less than the total energy of the second energy storage apparatus. In an example, the total energy of the first energy storage apparatus is greater than the total energy of the second energy storage apparatus. In an example, as shown in FIG. 2, the energy apparatus 40 may further include the energy conversion circuit 43. The energy conversion circuit 43 can be electrically connected to the load interface 402, the first power interface 401a, the second power interface 401b, and the second energy storage apparatus, perform the multiple energy conversions on the accessed electrical energy, and supply the converted electrical energy to the second power interface 401b, the load interface 402, or the second energy storage apparatus. As a core module of the energy apparatus 40, the energy conversion circuit 43 can change the on state, the closed state, or the like of functional elements or circuit elements in the circuit according to the load or the energy source accessed by the energy apparatus 40. Thus, desired output energy is obtained so that a power demand of the load, a charging demand of an undervoltage energy source, or the like is satisfied.

Figure 6A:
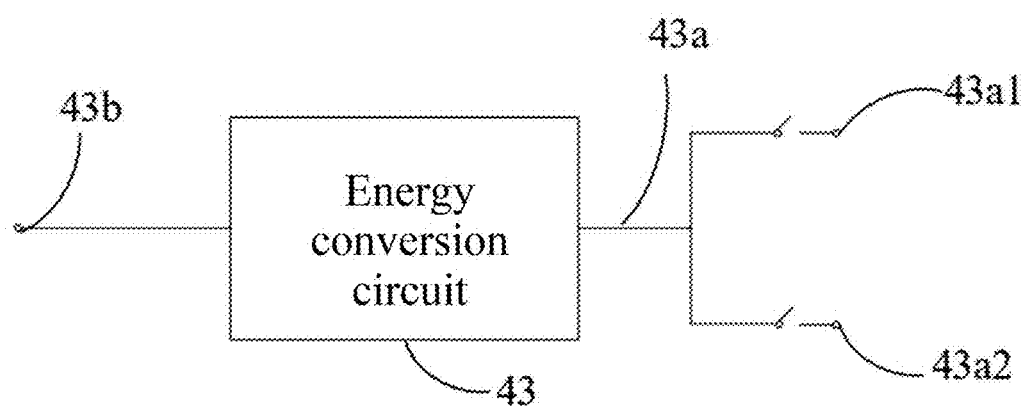
FIG. 6A is a schematic diagram showing a circuit structure of an energy conversion circuit in an example of the present application.

In an example, as shown in FIG. 6A, the energy conversion circuit 43 has a first circuit port 43a and a second circuit port 43b. That is to say, as the circuit capable of performing the multiple conversions on the electrical energy, the energy conversion circuit 43 has at least two circuit ports connected to the power supply and the load. The first circuit port 43a can be used as both an energy input and an energy output of the energy conversion circuit 43. The second circuit port 43b can be used as both an energy input and an energy output of the energy conversion circuit 43.

In an example, the first circuit port 43a can be electrically connected to one or two of the load interface 402, the first power interface 401a, and the second power interface 401b, and the second circuit port 43b is electrically connected to at least one remaining interface. Thus, the energy conversion circuit 43 can perform the multiple energy conversions on the accessed electrical energy and output electrical energy to be supplied to the first circuit port 43a and electrical energy to be supplied to the second circuit port 43b. When one circuit port is connected to two interfaces, the circuit port may be divided into two port branches, and one of the two port branches is connected to a respective one of the two interfaces. For example, the first circuit port 43a is connected to the load interface 402 and the first power interface 401a, and the second circuit port 43b is connected to the second power interface 401b. Then, the first circuit port 43a may be connected to the first power interface 401a and the load interface 402 through a port branch 43a1 and a port branch 43a2, respectively.

In an example, the first power interface 401a of the energy apparatus 40 and the second power interface 401b of the energy apparatus 40 may be collectively referred to as external power interfaces, and an interface in the energy apparatus 40 configured to access the second energy storage apparatus may be referred to as an internal power interface. In an example, the first circuit port 43a of the energy conversion circuit 43 may be electrically connected to at least one of the load interface 402, the external power interfaces, and the internal power interface, and the second circuit port may be electrically connected to the at least one remaining interface.

In an example, the energy conversion circuit 43 may include multiple energy conversion units and can provide at least two energy conversion states. In one energy conversion state, the energy apparatus 40 can output the electrical energy to be supplied to the first circuit port 43a. In another energy conversion state, the energy apparatus 40 can output the electrical energy to be supplied to the second circuit port 43b. That is to say, in one energy conversion state, the energy apparatus 40 can obtain a stable direct current charging current, and in another energy conversion state, the energy apparatus 40 can obtain the discharging current. In this example, the charging current and the discharging current are outputted through different ports in the energy conversion circuit 43, that is, the charging current and the discharging current flow in different directions.

In an example, the control unit 42 may control, according to the connection state or the electrical parameter detected by the detection unit 41, the multiple energy conversion units to change their internal circuit connection states so as to supply appropriate output electrical energy. For example, when the detection unit 41 detects that the power interface 401b accesses the battery pack and the connection state is stable, the battery pack is fully charged, and the load interface 402 accesses the power tool 30 and the connection state is stable, the control unit 42 controls the multiple energy conversion units to provide the energy conversion state where the discharging current can be obtained, thereby supplying the discharging energy to the power tool.

Figure 6B:
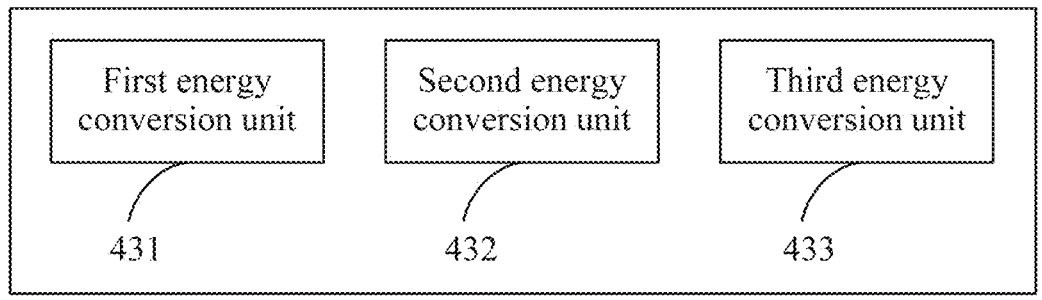
FIG. 6B is a schematic diagram of an energy conversion circuit constituted by multiple energy conversion units in an example of the present application.

In an example, the energy conversion circuit 43 may include three energy conversion units. Each of the three energy conversion units can implement a corresponding energy conversion so that the three energy conversion units can constitute a three-level conversion circuit. Referring to FIG. 6B, a first energy conversion unit 431, a second energy conversion unit 432, and a third energy conversion unit 433 can constitute the three-level conversion circuit. That is to say, the multiple energy conversion units may divide an energy conversion process in the energy apparatus 40 into three levels. Each of the three levels corresponds to one energy conversion form. For example, the three-level conversion circuit may perform a first-level conversion between a variable voltage and a constant voltage, a second-level conversion between voltage increase and voltage decrease, and a third-level conversion between a direct current and an alternating current on the energy inputted to the energy apparatus 40. The first-level conversion, the second-level conversion, and the third-level conversion are only used to distinguish different energy conversion manners and do not represent energy conversion order. That is, the three-level energy conversion that can be implemented by the three-level conversion circuit may be performed in no particular order.

Figure 7:
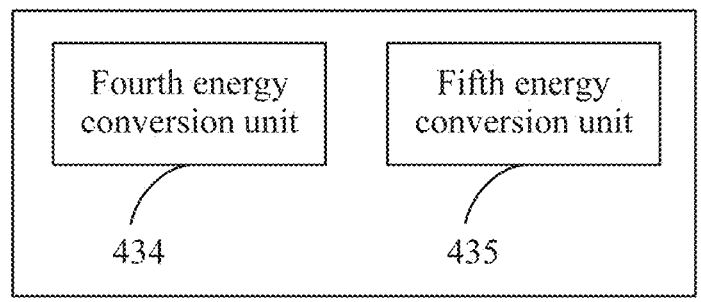
FIG. 7 is a schematic diagram of another energy conversion circuit constituted by multiple energy conversion units in an example of the present application.

In an example, referring to FIG. 7, a fourth energy conversion unit 434 and a fifth energy conversion unit 435 can constitute a two-level conversion circuit. That is, the multiple energy conversion units may divide the energy conversion process in the energy apparatus 40 into two levels. Each of the two levels corresponds to one energy conversion form. In an implementation, the energy apparatus 40 includes two energy conversion units. Each of the two energy conversion units can implement a corresponding energy conversion so that the two energy conversion units can constitute the two-level conversion circuit. For example, the two-level conversion circuit in this example may combine the preceding second-level conversion and the preceding third-level conversion into one energy conversion. That is to say, the two-level energy conversion may include the preceding third-level conversion and the combined conversion constituted by the preceding first-level conversion and the preceding second-level conversion.

The first to fifth energy conversion units may have the same energy conversion function or different energy conversion functions.

In the following examples, the energy conversion process of the energy apparatus 40 is described in conjunction with the specific topological structures of the three-level conversion circuit and the two-level conversion circuit.

Figure 8:
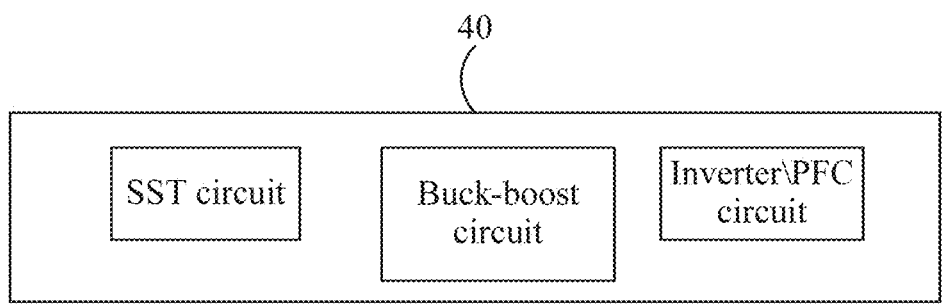
FIG. 8 is a schematic diagram of a three-level conversion circuit in an example of the present application.

In an example, referring to FIG. 8, the energy apparatus 40 is constituted by the three-level conversion circuit. The three-level conversion circuit specifically includes an SST circuit capable of implementing the first-level conversion, a buck-boost circuit capable of implementing the second-level conversion, and an inverter\PFC circuit capable of implementing the third-level conversion.

Figure 9:
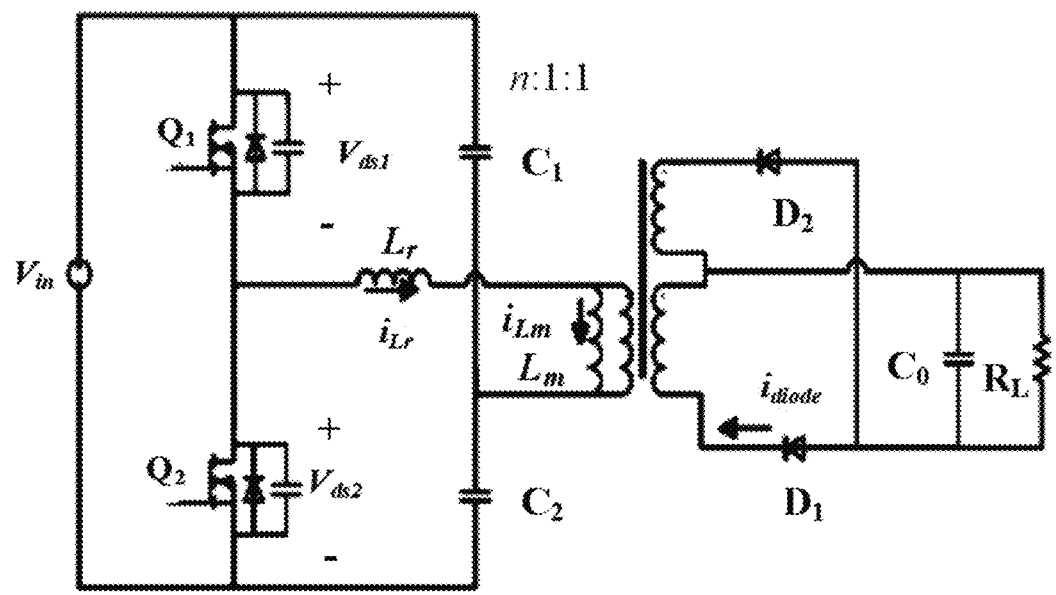
FIG. 9 is a circuit diagram of a solid-state transformer (SST) circuit in FIG. 8.

As shown in FIG. 9, in the SST circuit, rectifier diodes are connected on the secondary side of a transformer with a half-bridge circuit originally provided. In this example, the SST circuit can change the working state of the circuit to adapt to two working modes of the energy apparatus 40. The working modes of the energy apparatus 40 may include a boost inversion mode and a rectifier charging mode. The working processes of the SST circuit in the boost inversion mode and the rectifier charging mode are described below.

The SST circuit may have eight working states in one working cycle. Here, only the four working states in the first half cycle are analyzed. The working states in the second half cycle are similar and not described in detail.

Figure 10A:
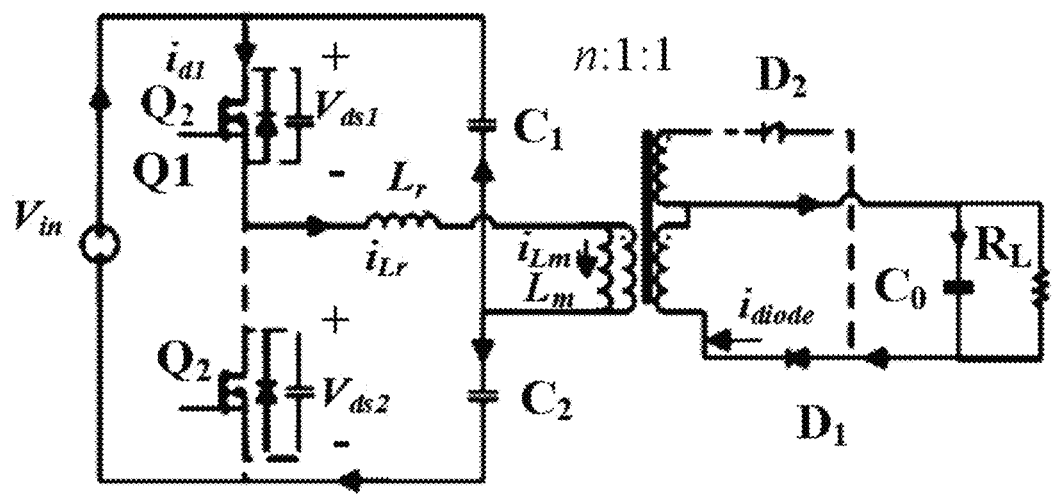
FIGS. 10A to 10D are circuit state diagrams of an SST circuit in FIG. 8 when an energy apparatus is in a boost inversion mode.
Figure 10B:
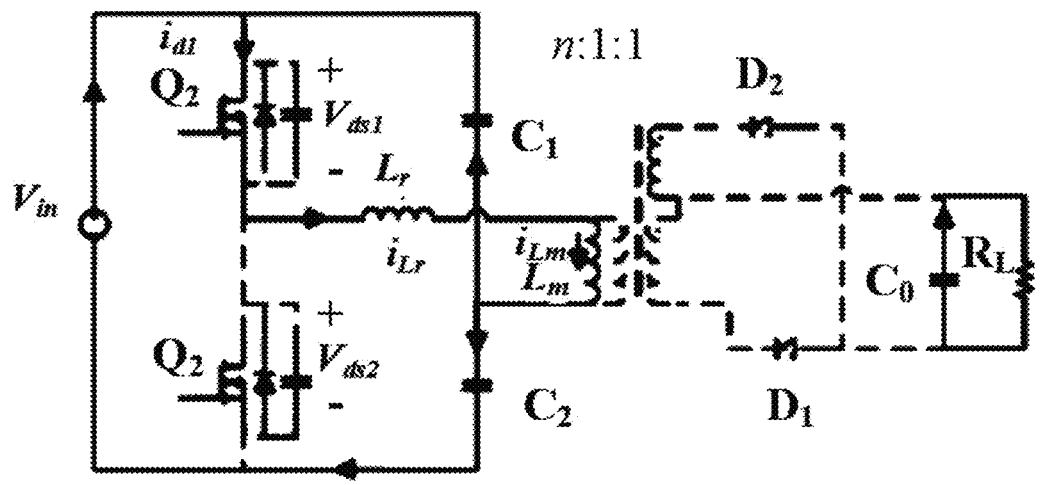
Figure 10C:
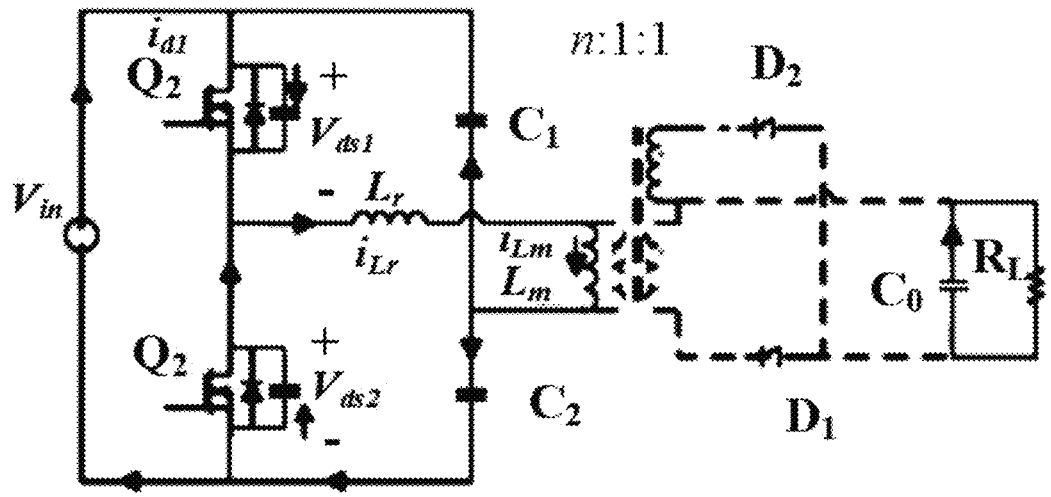
Figure 10D:
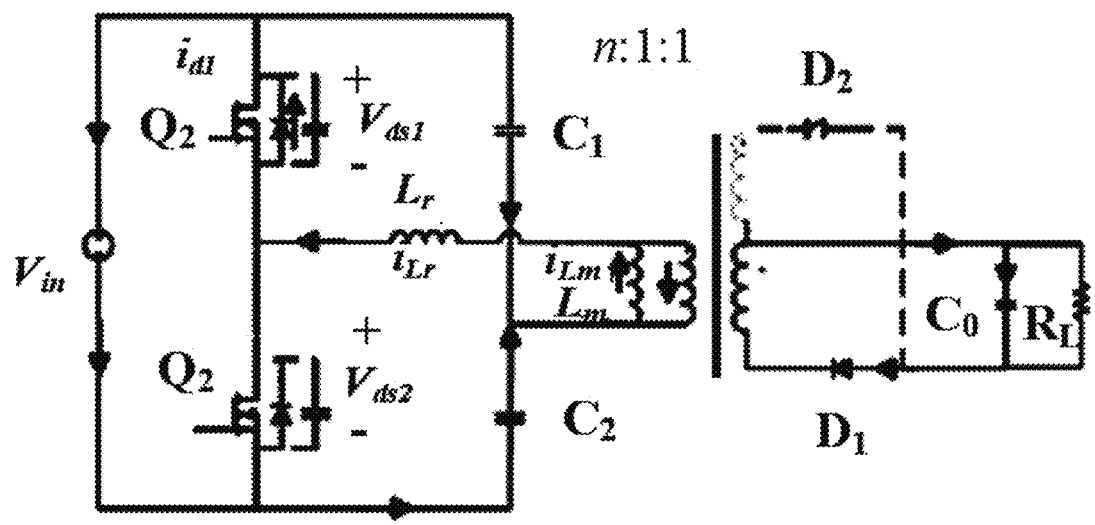
Figure 10E:
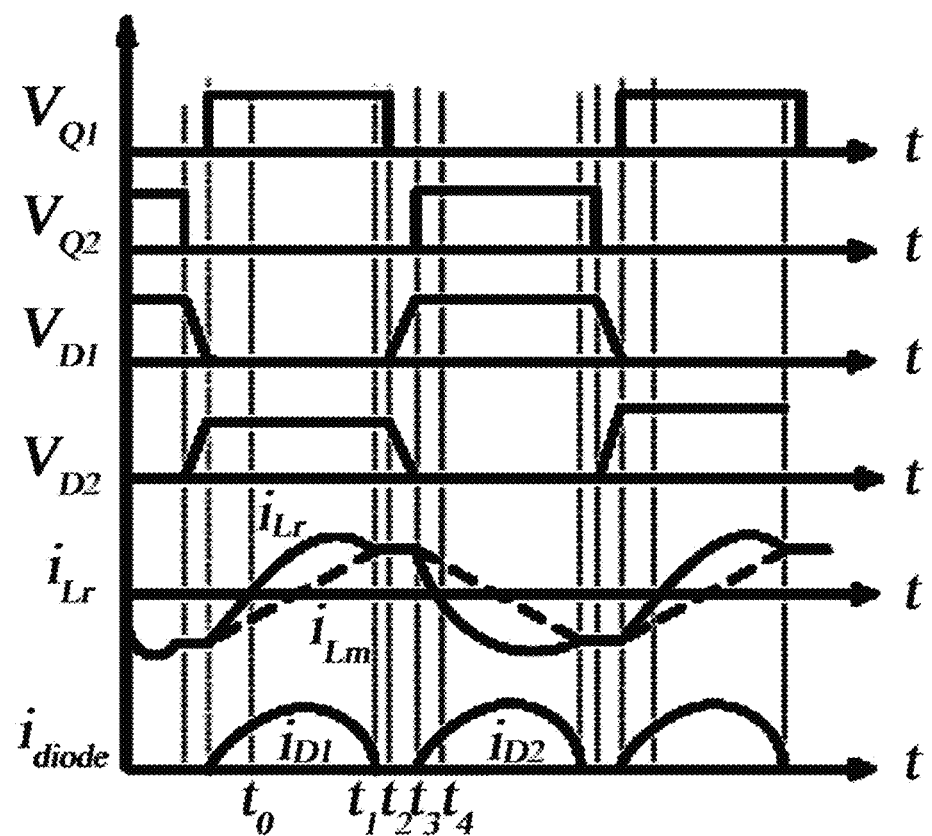
FIG. 10E is a timing diagram of an SST circuit in FIG. 8 when an energy apparatus is in a boost inversion mode.
Figure 10F:
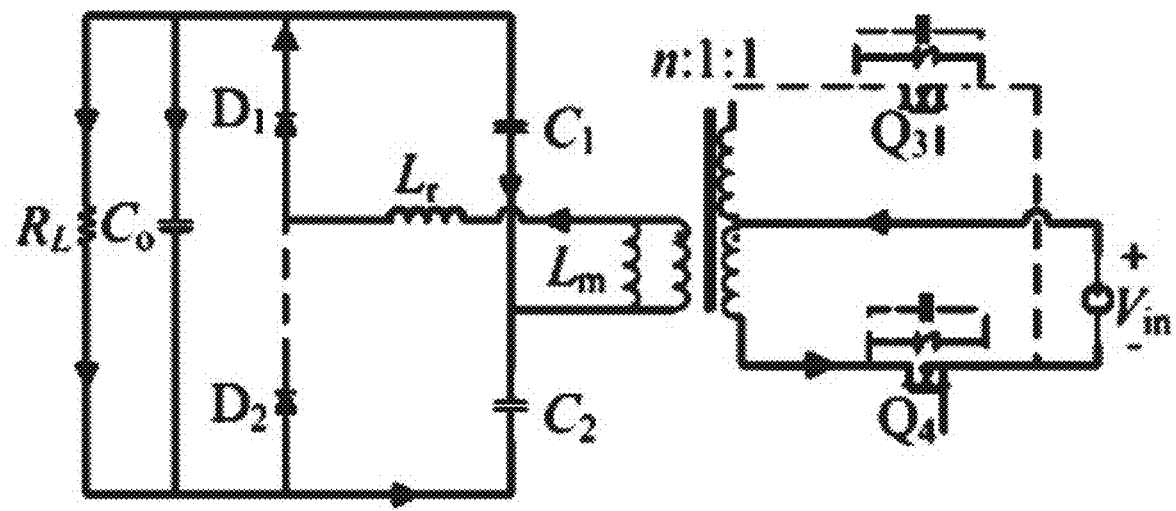
FIGS. 10F to 10I are circuit state diagrams of an SST circuit in FIG. 8 when an energy apparatus is in a rectifier charging mode.

FIGS. 10A to 10D show the four working states of the SST circuit when the energy apparatus 40 is in the boost inversion mode. FIG. 10E shows the working waveforms of each switching element in the SST circuit corresponding to the preceding working states and the current waveforms of different nodes. In an example, referring to FIGS. 10A and 10E, in the first working state, $Q_1$ is turned on and $Q_2$ is turned off at to. A resonant current $i_{L_r}$ passes through $Q_1$ and increases in the form of a sine wave, and $i_{L_m}$ increases linearly. The transformer transfers the energy to the secondary side. The voltage across $L_m$ is clamped. $L_r$ and $C_r$ resonate at a resonant frequency of $f_1$. In addition, $i_{L_r} > i_{L_m}$. Therefore, $i_{load} = i_{L_r} - i_{L_m}$, and $i_{load}$ passes through the transformer to become a current $i_{D1}$ passing through one of the diodes. At $t_1$, $i_{L_r} = i_{L_m}$. Referring to FIGS. 10B and 10E, $Q_1$ remains on and $Q_2$ remains off in the second working state. At $t_1$, $i_{L_r} = i_{L_m}$, the transformer transfers no energy, and $i_{D1}$ decreases to 0. In this case, the diode is turned on or off in a zero current state, no reverse recovery current is generated, and an output capacitor supplies the energy to the load. Since $i_{L_r} = i_{L_m}$, the voltage across $L_m$ is not clamped, and $L_m$, $L_r$, and $C_r$ resonate. The oscillation frequency is $f_2$ in this case. At the end of this state, $Q_1$ is turned off. Referring to FIGS. 10C and 10E, in the third working state, $Q_1$ and $Q_2$ are both turned off, but $i_{L_r} = i_{L_m}$. In this case, the transformer still transfers no energy, and the output capacitor still supplies the energy to the load. In this case, parasitic capacitance of $Q_1$ is charged so that the voltage of the parasitic capacitance increases to $V_{in}$, and parasitic capacitance of $Q_2$ discharges so that the voltage of the parasitic capacitance decreases to zero. At the end of this state, a parasitic diode of $Q_2$ is turned on. Referring to FIGS. 10D and 10E, in the fourth working state, $Q_1$ and $Q_2$ both remain off, and the parasitic diode of $Q_2$ is turned on first so that $Q_2$ in the next working state can achieve zero voltage switching (ZVS). In this case, the voltage across $L_m$ is reversed, and a rectifier diode $D_2$ on the secondary side is turned on. The resonate current on the primary side flows through the magnetizing inductor $L_m$ and the parasitic diode of the switch, and $i_{L_r}$ is less than $i_{L_m}$. In this state, the resonant frequency is $f_1$. At $t_4$, $Q_2$ is turned on.

Figure 10G:
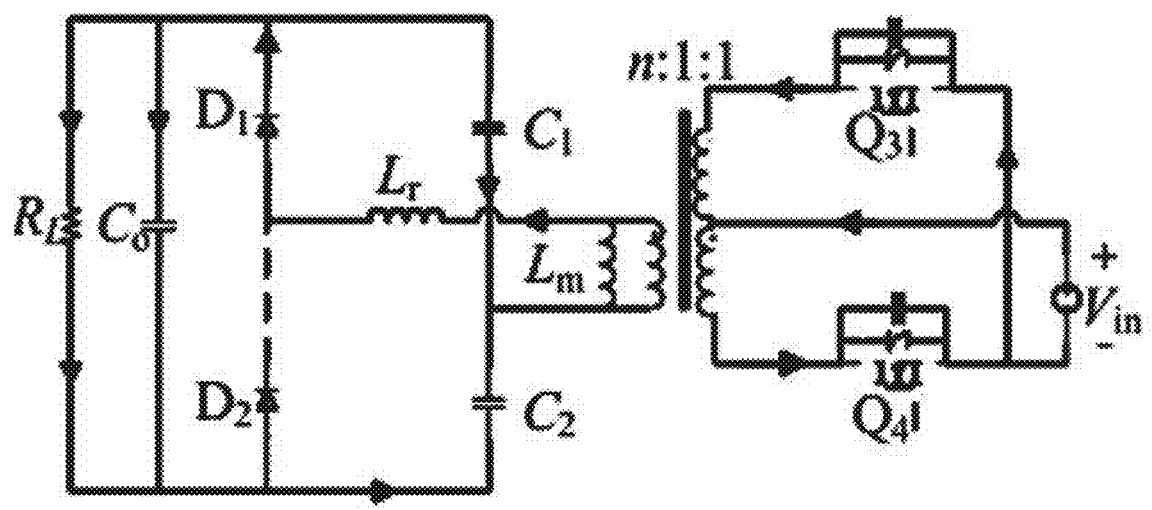
Figure 10H:
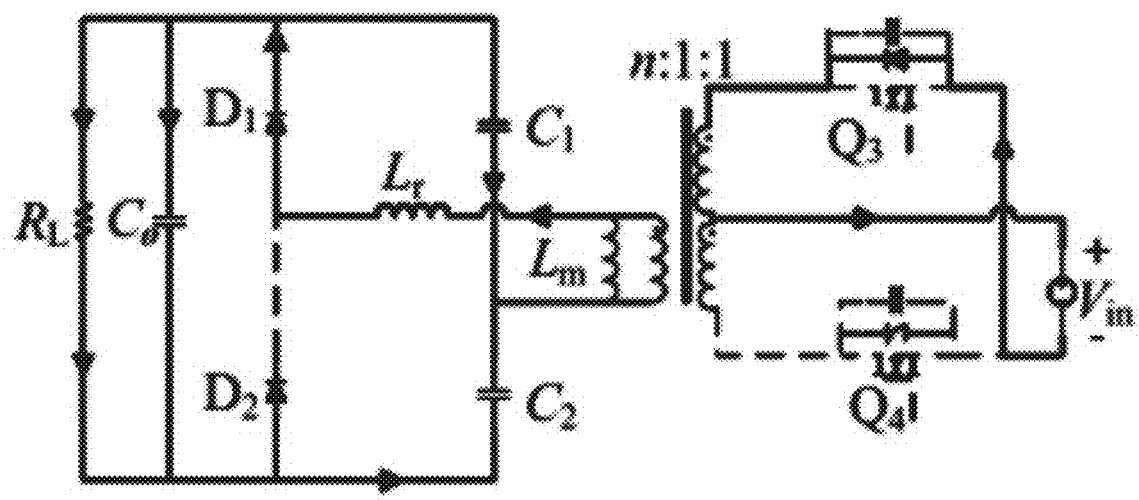
Figure 10I:
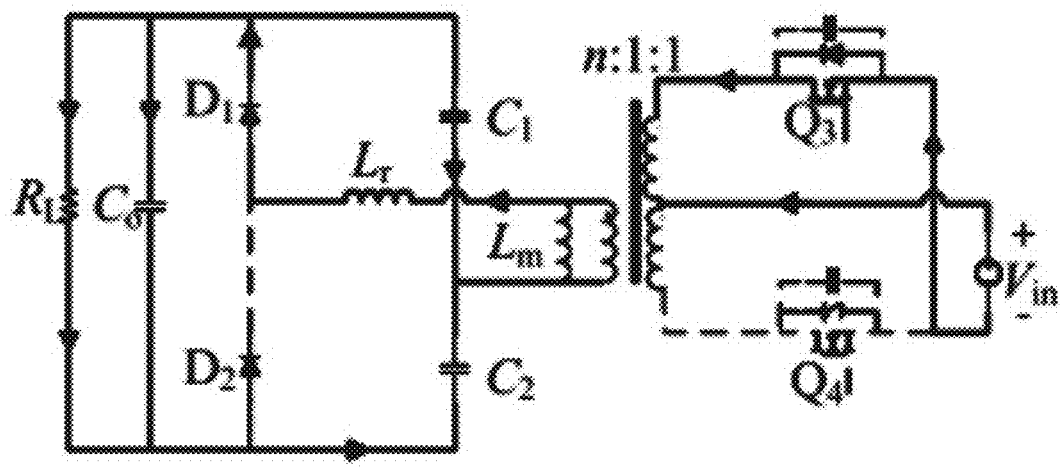
Figure 10J:
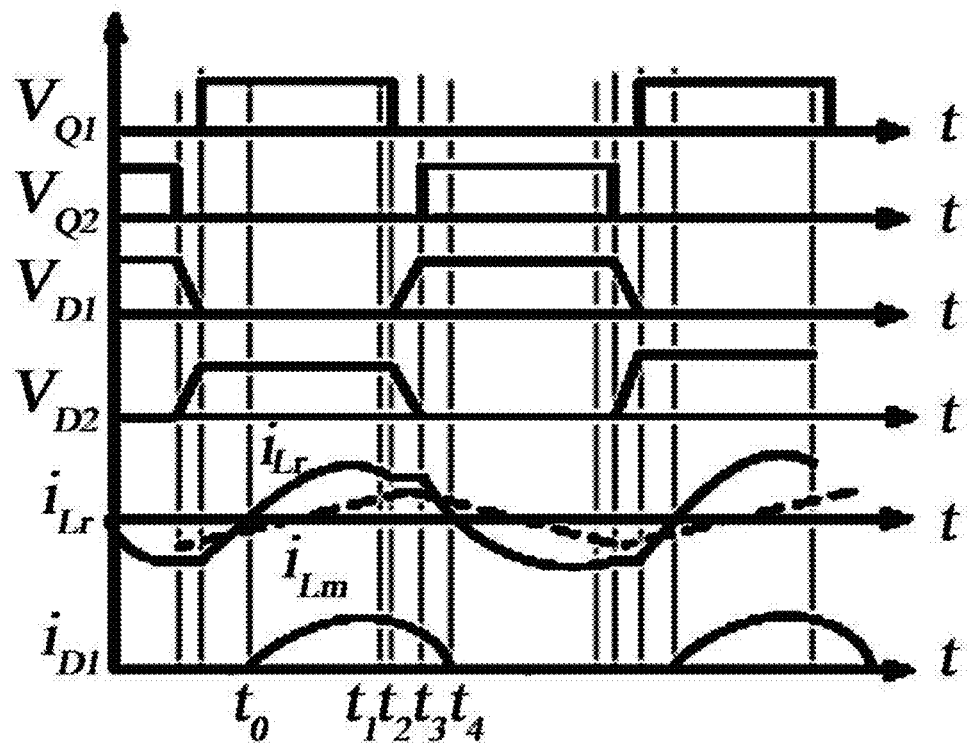
FIG. 10J is a timing diagram of an SST circuit in FIG. 8 when an energy apparatus is in a rectifier charging mode.

FIGS. 10F to 10I show the four working states of the SST circuit when the energy apparatus 40 is in the rectifier charging mode. FIG. 10J shows the working waveforms of each switching element in the SST circuit corresponding to the preceding working states and the current waveforms of the different nodes. In an example, referring to FIGS. 10F and 10J, in the first working state, $Q_4$ is turned on and $Q_3$ is turned off at to. The transformer transfers the energy from the secondary side to the primary side, and the energy is outputted to the load through a resonant inductor $L_m$, a resonant capacitor $C_r$, and a diode $D_1$. Referring to FIGS. 10G and 10J, in the second working state, $Q_4$ is turned off, and a current flowing through $Q_3$ is negative at $t_1$. In this case, parasitic capacitance of $Q_3$ discharges the electricity, and the voltage of the parasitic capacitance of $Q_3$ decreases from $2V_{in}$ to 0. At the same time, parasitic capacitance of $Q_4$ is charged and the voltage of the parasitic capacitance of $Q_4$ increases from 0 to $2V_{in}$. Referring to FIGS. 10H and 10J, in the third working state, $Q_4$ is turned off, and the current passes through a body diode of $Q_3$. Thus, $Q_3$ achieves the ZVS. When a drive signal is inputted to $Q_3$, this state ends. Referring to FIGS. 10I and 10J, in the fourth working state, $Q_3$ starts to be turned on reversely because the current flowing through $Q_3$ is negative. When the resonant current is equal to the magnetizing current, this state ends.

The buck-boost circuit may work in the boost mode when the energy apparatus 40 is in the boost inversion mode and may work in the buck mode when the energy apparatus 40 is in the rectifier charging mode.

Figure 11:
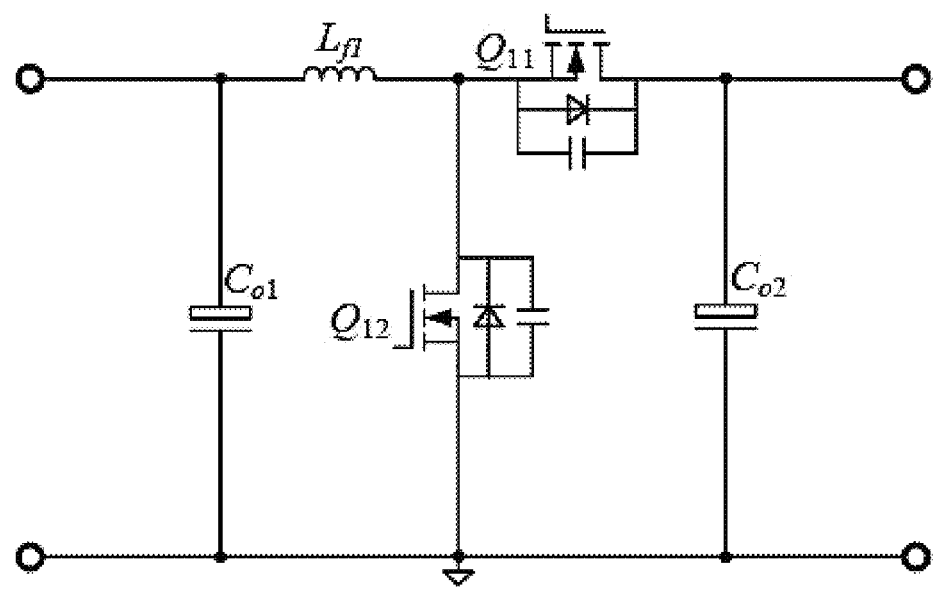
FIG. 11 is a circuit diagram of a buck-boost circuit in FIG. 8.
Figure 12A:
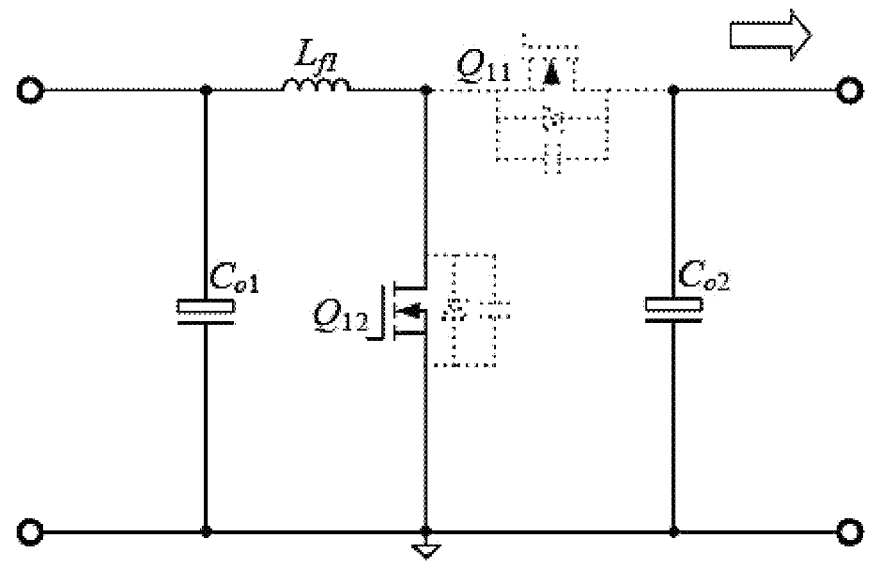
FIGS. 12A and 12B are circuit state diagrams of a buck-boost circuit in FIG. 8 when an energy apparatus is in a boost inversion mode.
Figure 12B:
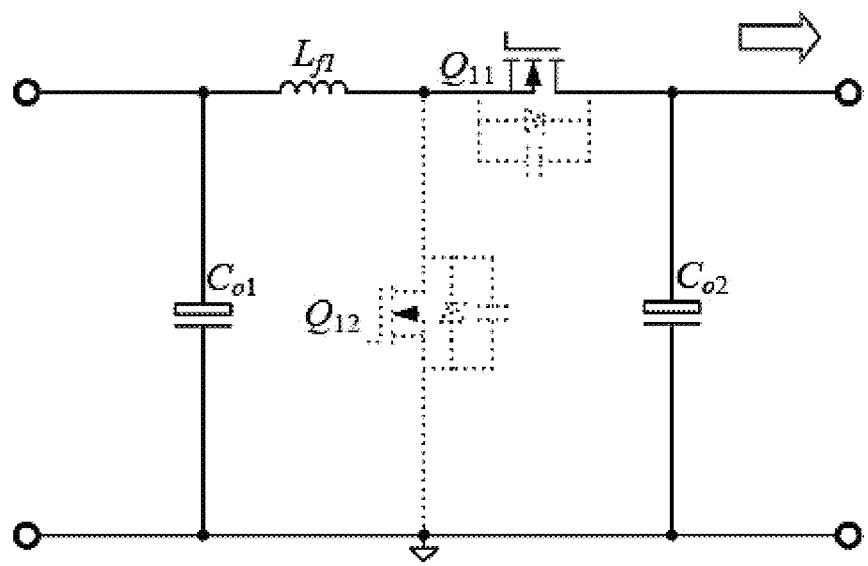
Figure 12C:
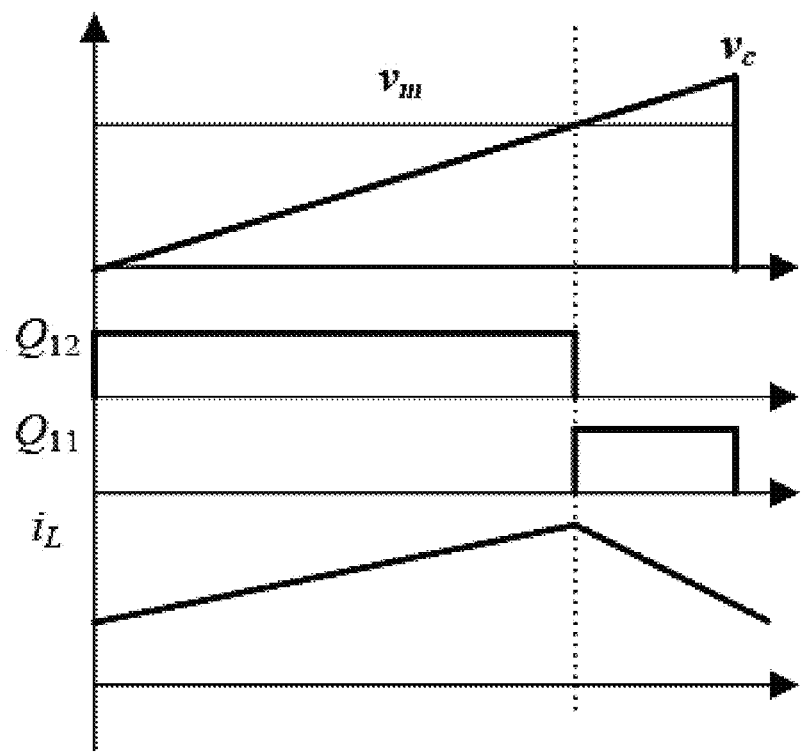
FIG. 12C is a timing diagram of a buck-boost circuit in FIG. 8 when an energy apparatus is in a boost inversion mode.

In an example, as shown in FIG. 11, the buck-boost circuit mainly includes two power elements $Q_{11}$ and $Q_{12}$ that are connected in series, one inductor $L_{f1}$, and two energy storage elements $C_{11}$ and $C_{12}$. Referring to FIGS. 12A and 12B, when the energy apparatus 40 is in the boost inversion mode, the buck-boost circuit has two working states. In the first state, the switching element $Q_{12}$ in the circuit is turned on first, $Q_{11}$ in the circuit is turned off, and $Q_{11}$ and a body diode in $Q_{12}$ stores energy. In the second state, $Q_{12}$ is turned off, $Q_{11}$ is turned on and releases the energy, and a current flows through $Q_{11}$. Thus, the load connected at the back end may be powered. FIG. 12C shows voltage variations or current variations of the elements in the buck-boost circuit. A duty cycle can be generated at the intersection point of a carrier voltage $V_c$ and a modulated voltage $V_m$. A current $i_{L1}$ in the inductor $L_{f1}$ increases at a certain slope in the first state and decreases at a certain slope in the second state. At the intersection point of $V_c$ and $V_m$, $i_L$ reaches a maximum when $L_f$ ends energy storage.

Figure 12D:
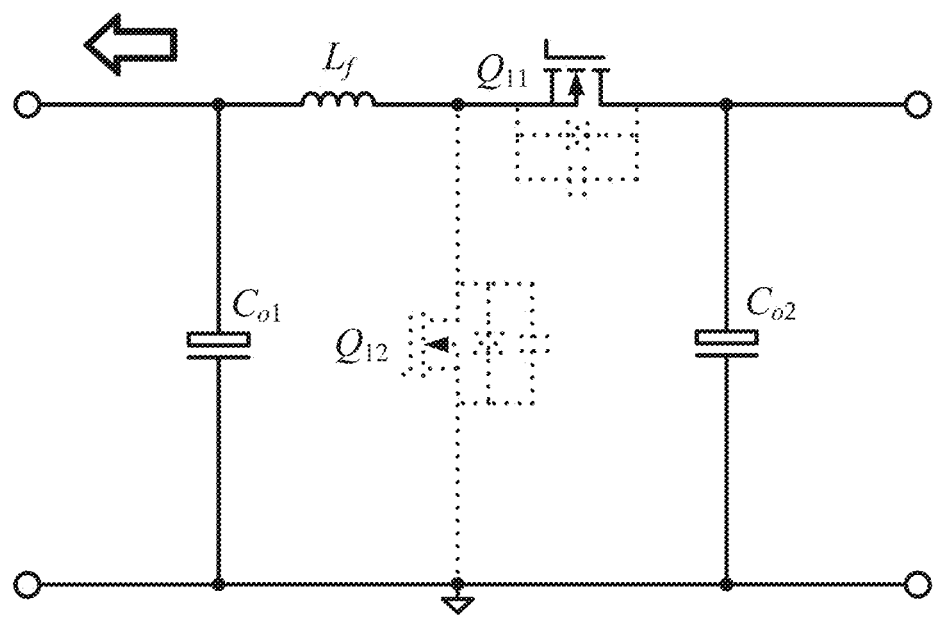
FIGS. 12D and 12E are circuit state diagrams of a buck-boost circuit in FIG. 8 when an energy apparatus is in a rectifier charging mode.
Figure 12E:
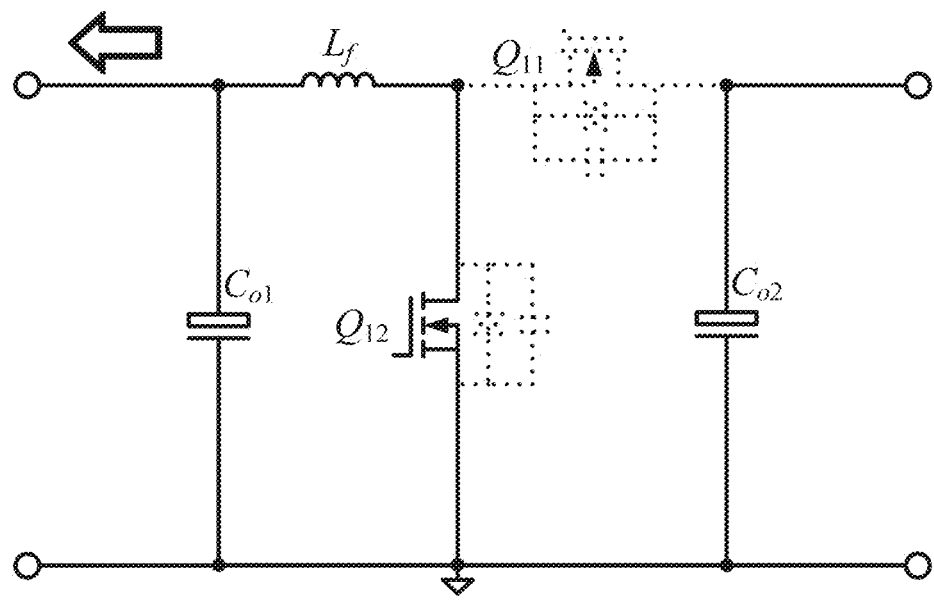
Figure 12F:
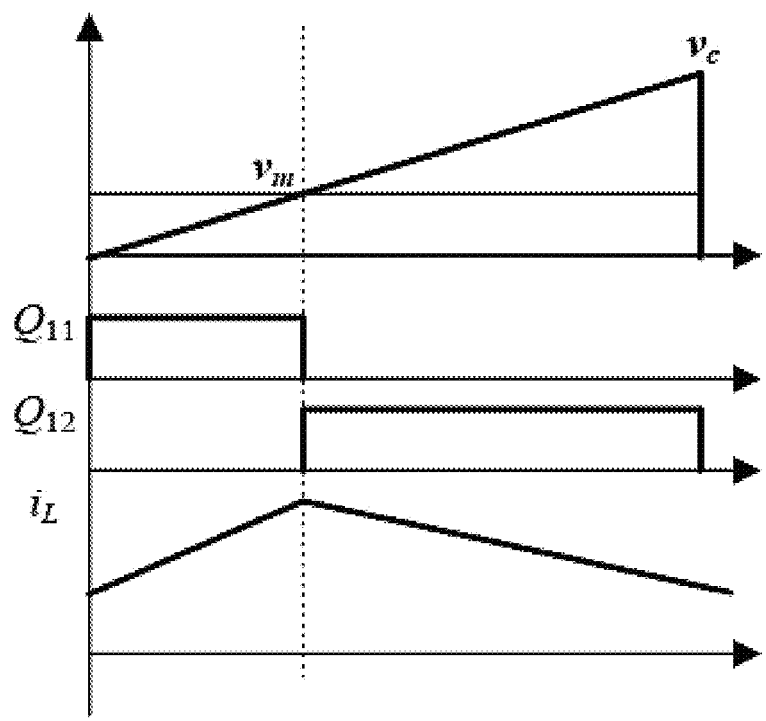
FIG. 12F is a timing diagram of a buck-boost circuit in FIG. 8 when an energy apparatus is in a rectifier charging mode.

Referring to FIGS. 12D and 12E, when the energy apparatus 40 is in the rectifier charging mode, the buck-boost circuit also has two working states. In the first state, $Q_{11}$ is turned on first, $Q_{12}$ is turned off, and $L_f$ stores the energy. In the second state, $Q_{11}$ is turned off, $Q_{12}$ is turned on, the electrical energy flows through $Q_{12}$, and $L_f$ releases the energy so that the connected battery pack can be charged. FIG. 12F shows voltage variations or current variations of the elements in the buck-boost circuit. The variation curves of the carrier voltage $V_c$, the modulated voltage $V_m$, and the current $i_{L1}$ in $L_{f1}$ are consistent with basic trends shown in FIG. 12C and are not further described here.

Figure 13:
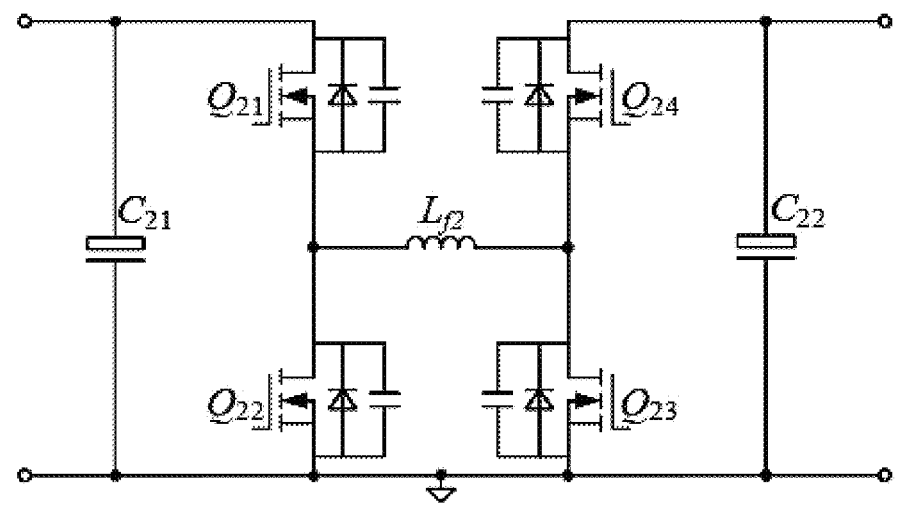
FIG. 13 is another circuit diagram of a buck-boost circuit in FIG. 8.
Figure 14A:
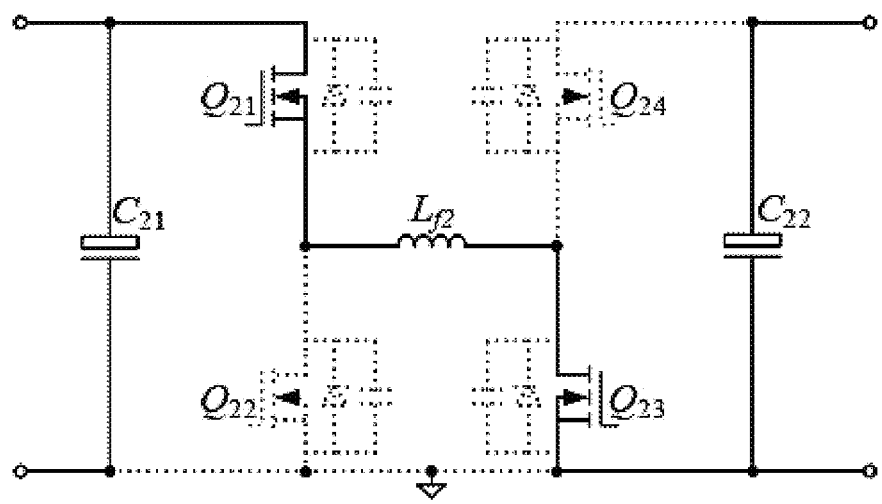
FIGS. 14A to 14D are circuit state diagrams of a buck-boost circuit in FIG. 8.
Figure 14B:
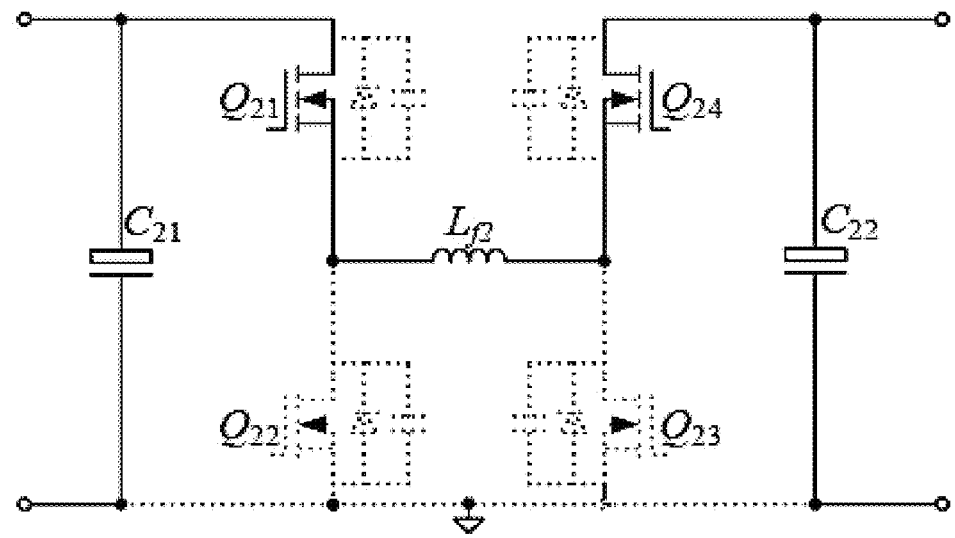
Figure 14C:
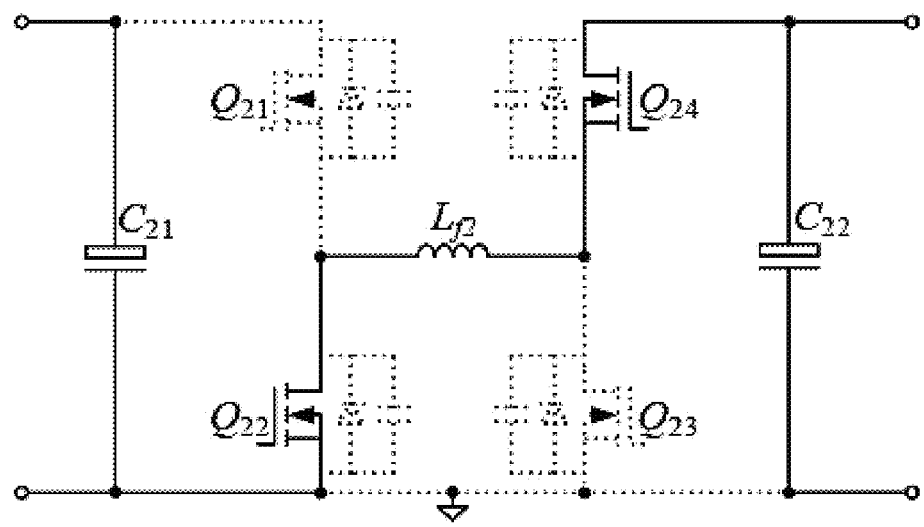
Figure 14D:
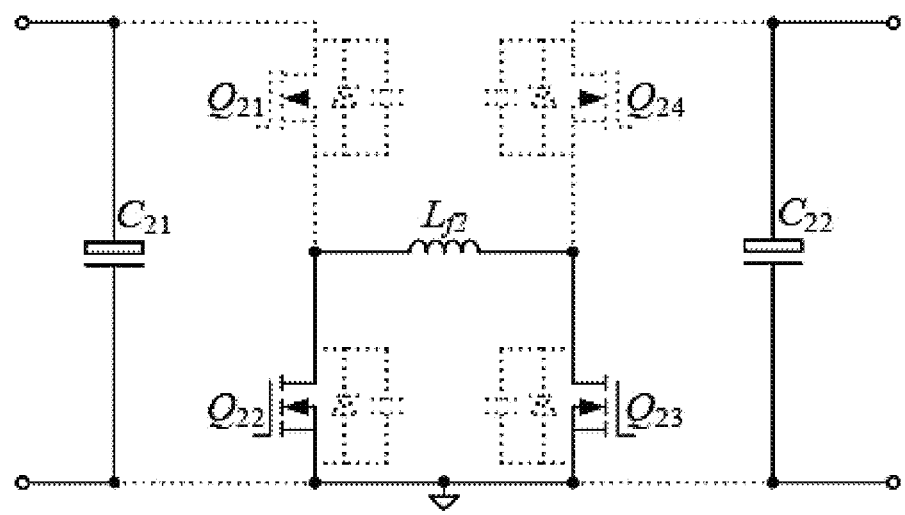
Figure 14E:
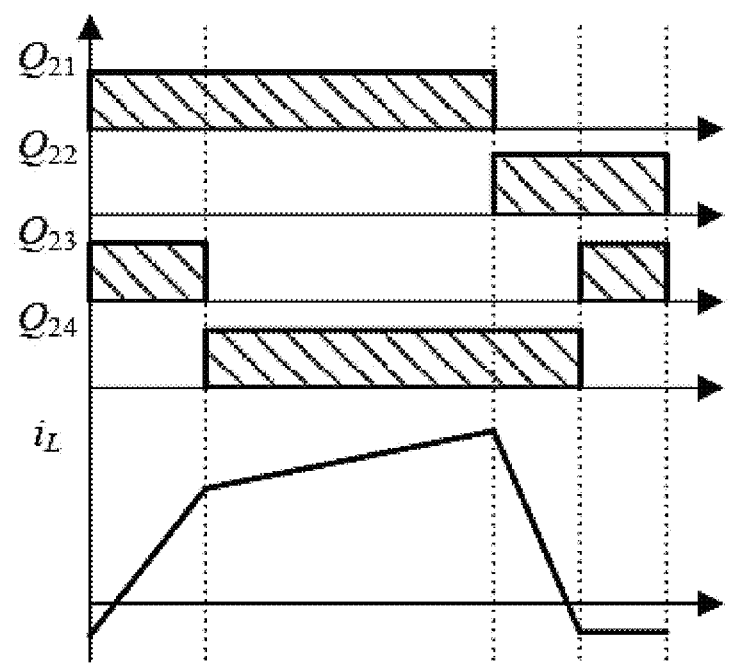
FIG. 14E is a timing diagram of a buck-boost circuit in FIG. 8.

In an example, as shown in FIG. 13, the buck-boost circuit mainly includes a full-bridge circuit constituted by four power elements $Q_{21}$, $Q_{22}$, $Q_{23}$, and $Q_{24}$, one inductor $L_{f2}$ is connected to the intermediate nodes of two bridge arms, and the bridge arms are connected in parallel to an energy storage element $C_{21}$ and an energy storage element $C_{22}$, respectively. Referring to FIGS. 14A and 14D, the buck-boost circuit has four working states. In the first working state, two power switches $Q_{21}$ and $Q_{23}$ at two opposite corners of the bridge arms are turned on, and $L_{f2}$ stores the energy. In the second working state, $Q_{21}$ remains on, $Q_{23}$ is turned off, $Q_{24}$ is turned on, and $L_{f2}$ releases the energy. In the third working state, two power switches $Q_{22}$ and $Q_{24}$ at two opposite corners of the bridge arms are turned on and freewheel. In the fourth working state, $Q_{22}$ remains on, $Q_{24}$ is turned off, $Q_{23}$ is turned on, and $Q_{22}$ and $Q_{23}$ are reset. As shown in FIG. 14E, when $Q_{21}$ and $Q_{24}$ are turned on, a current in the inductor $L_{f2}$ varies at a certain slope. When $Q_{22}$ and $Q_{23}$ are turned on, the circuit is short-circuited, the current in $L_{f2}$ remains constant, and the circuit can perform resetting to facilitate the change of a working state in the next cycle.

Two ends of the inverter\PFC circuit may access the alternating current power supply, a power supply voltage, or the load, which is specifically related to the mode of the energy apparatus 40.

Figure 15:
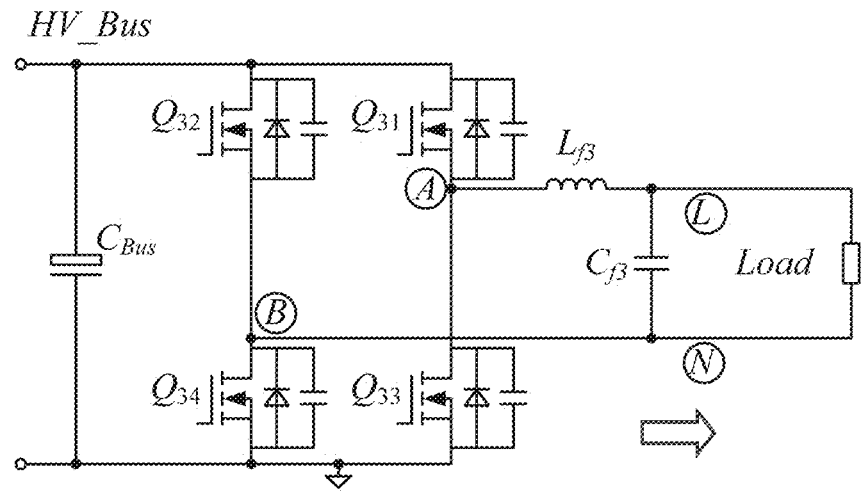
FIG. 15 is a circuit diagram of an inverter\PFC circuit in FIG. 8.

In an example, the energy apparatus 40 is in the boost inversion mode, and the inverter/PFC circuit can implement an inversion function to power the load using the electrical energy outputted by the battery pack. As shown in FIG. 15, the inverter\PFC circuit mainly includes a full-bridge circuit constituted by $Q_{31}$, $Q_{32}$, $Q_{33}$, and $Q_{34}$. $Q_{32}$ and $Q_{34}$ are turned on complementarily, and $Q_{31}$ and $Q_{33}$ are turned on complementarily. $Q_{32}$ and $Q_{34}$ have two ends accessing an input voltage. The intermediate node of the bridge arm with $Q_{32}$ and $Q_{34}$ is denoted by B, the intermediate node of the bridge arm with $_{31}$ and $Q_{33}$ is denoted by A, and the two nodes A and B are connected to the load through one LC circuit.

Figure 16A:
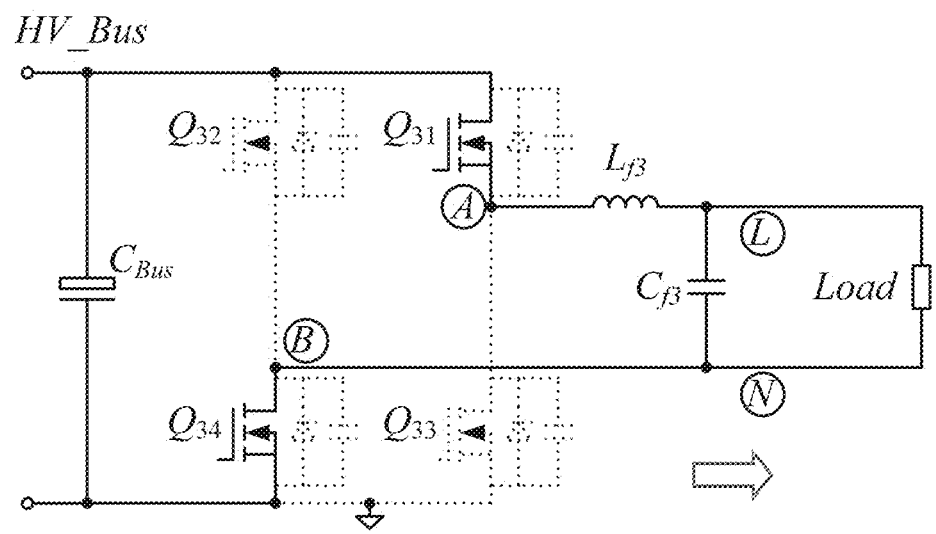
FIGS. 16A to 16D are circuit state diagrams of an inverter\PFC circuit in FIG. 8 when an energy apparatus is in a boost inversion mode.
Figure 16B:
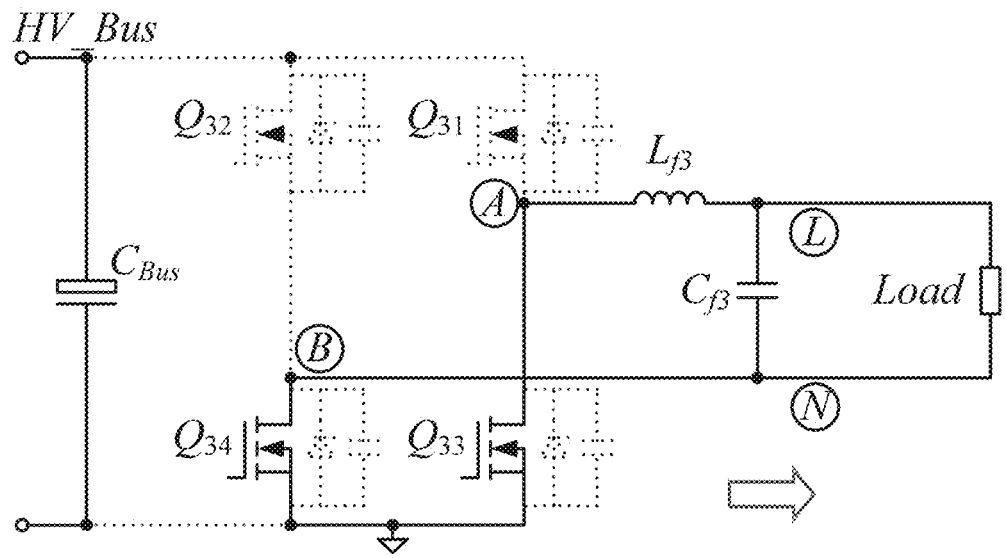
Figure 16C:
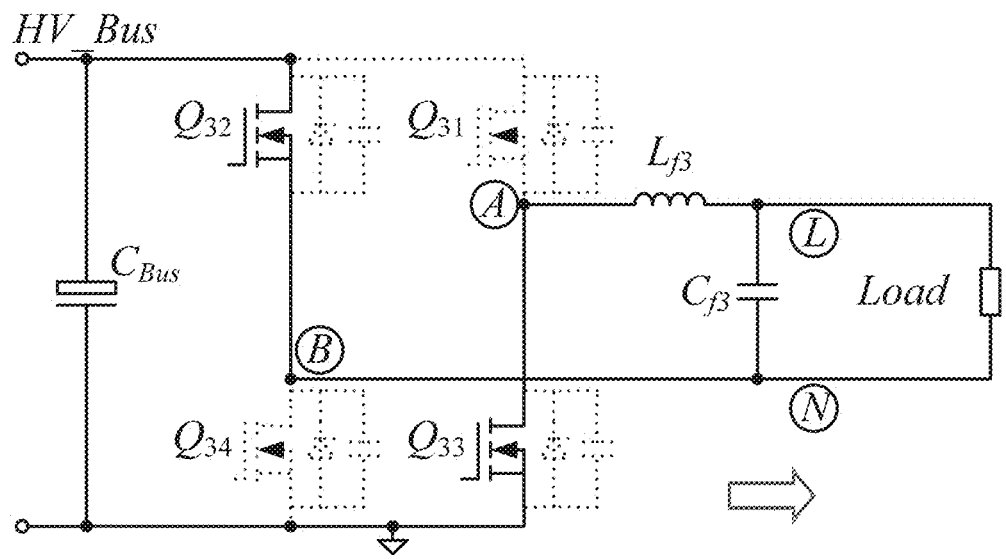
Figure 16D:
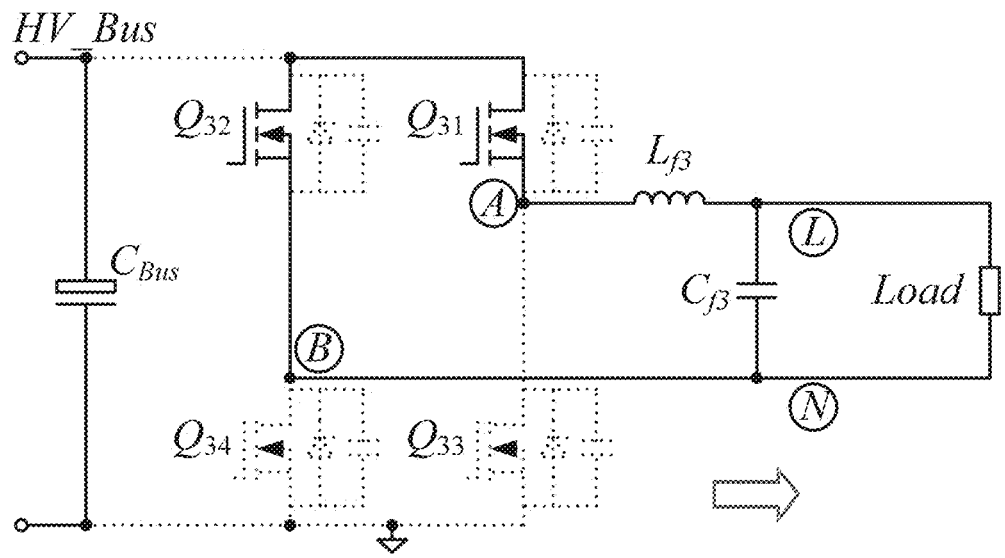
Figure 16E:
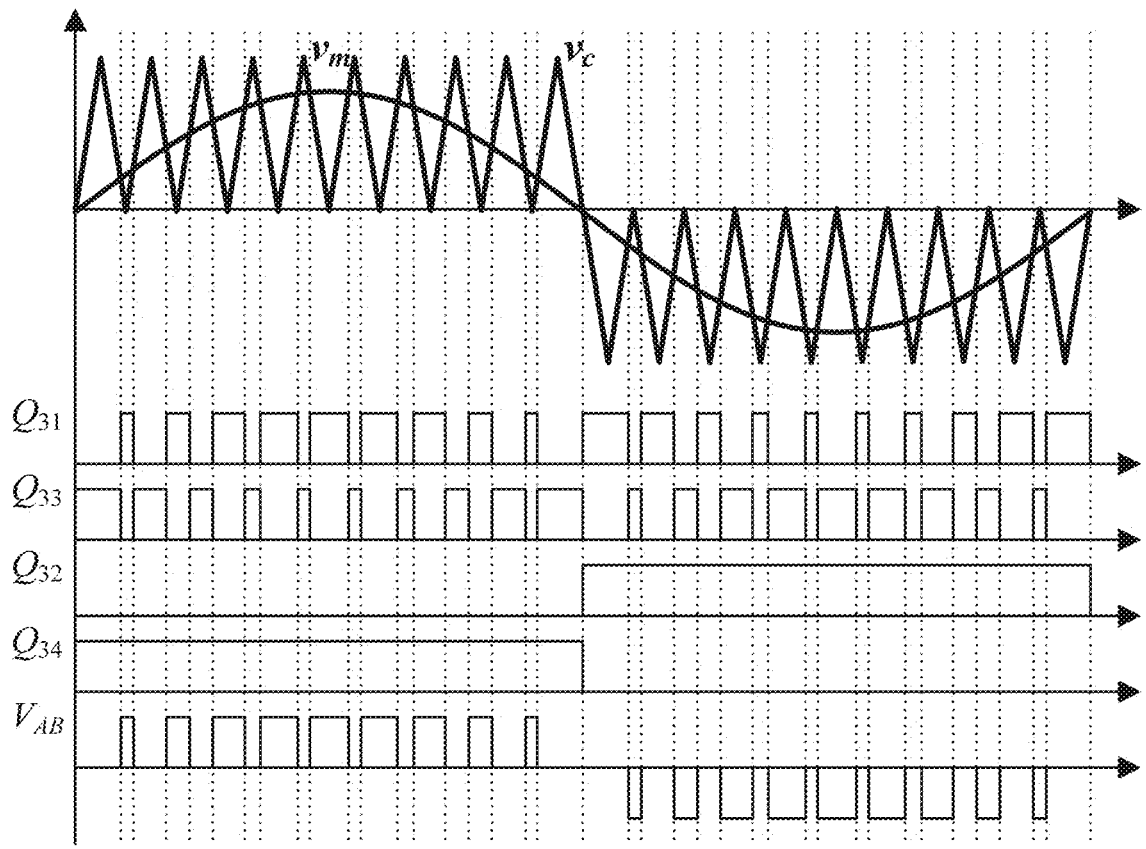
FIG. 16E is a timing diagram of an inverter\PFC circuit in FIG. 8 when an energy apparatus is in a boost inversion mode.

In an example, when the energy apparatus 40 is in the boost inversion mode, unipolar sinusoidal pulse width modulation (SPWM) modulation may be performed on the inverter/PFC circuit. Within one working cycle, the switching elements in the circuit may have two conduction conversion states, as shown in FIGS. 16A to 16D. In the first conduction state, as shown in FIGS. 16A and 16B, $Q_{34}$ remains on constantly, $Q_{32}$ remains off constantly, $Q_{31}$ and $Q_{33}$ are turned on complementarily at a certain duty cycle, a forward voltage $V_{AB}$ exists between the nodes A and B when $Q_{31}$ is turned on, and the voltage is zero when $Q_{31}$ is turned off. In the first conduction state, in the process where $Q_{31}$ and $Q_{33}$ are turned on complementarily, $Q_{31}$ is turned on first. In the second conduction state, as shown in FIGS. 16C and 16D, $Q_{32}$ remains on constantly, $Q_{34}$ remains off constantly, $Q_{31}$ and $Q_{33}$ are turned on complementarily at a certain duty cycle, a reverse voltage $V_{AB}$ exists between the nodes A and B when $Q_{31}$ is turned on, and the voltage is zero when $Q_{31}$ is turned off. In the second conduction state, in the process where $Q_{31}$ and $Q_{33}$ are turned on complementarily, $Q_{33}$ is turned on first. It may be learned from FIG. 16E that within one working cycle, a carrier voltage $V_c$ varies in a zigzag form and a modulated voltage $V_m$ varies in the form of a sine wave in the inverter\PFC circuit, and a duty cycle and a voltage $V_{AB}$ between the nodes A and B are generated at the intersection point of the carrier voltage $V_c$ and the modulated voltage $V_m$. Since the duty cycle is generated at the intersection point of the carrier signal $V_c$ and the modulated signal $V_m$, it may be learned from FIG. 16E that within one carrier cycle, the variation manners of duty cycles for controlling $Q_{31}$ and $Q_{33}$ to be turned on in the first half control cycle are opposite to those in the second half cycle. For example, in the first half cycle, the duty cycle at which $Q_{31}$ is turned on increases and then decreases, but in the second half cycle, the duty cycle at which $Q_{31}$ is turned on decreases and then increases.

Figure 17A:
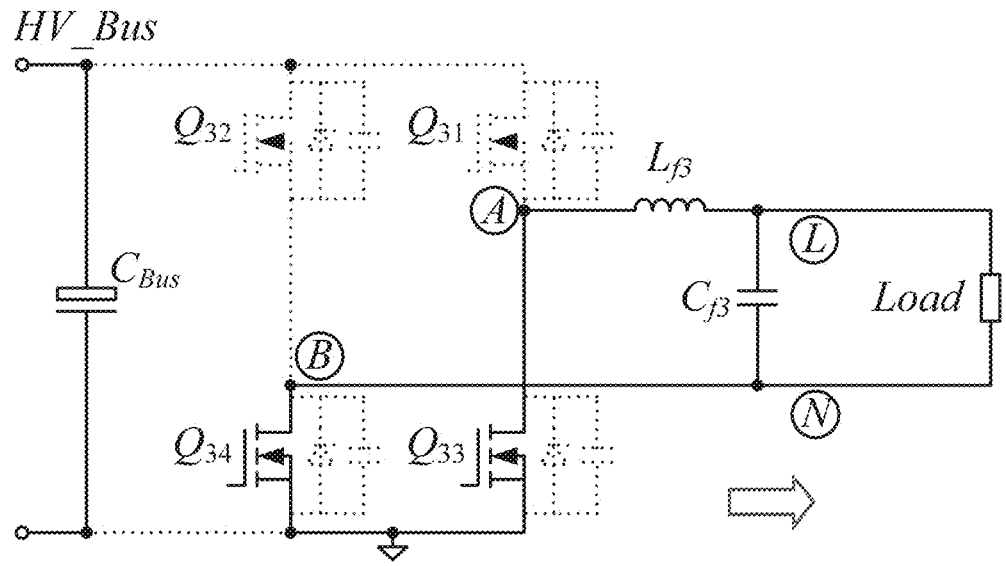
FIGS. 17A to 17D are circuit state diagrams of an inverter\PFC circuit in FIG. 8 when an energy apparatus is in a boost inversion mode.
Figure 17B:
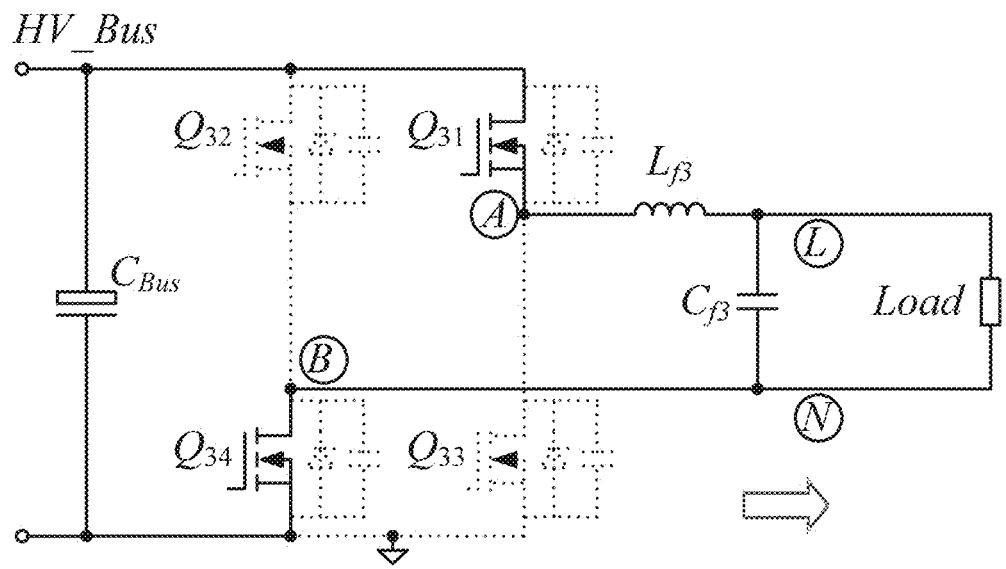
Figure 17C:
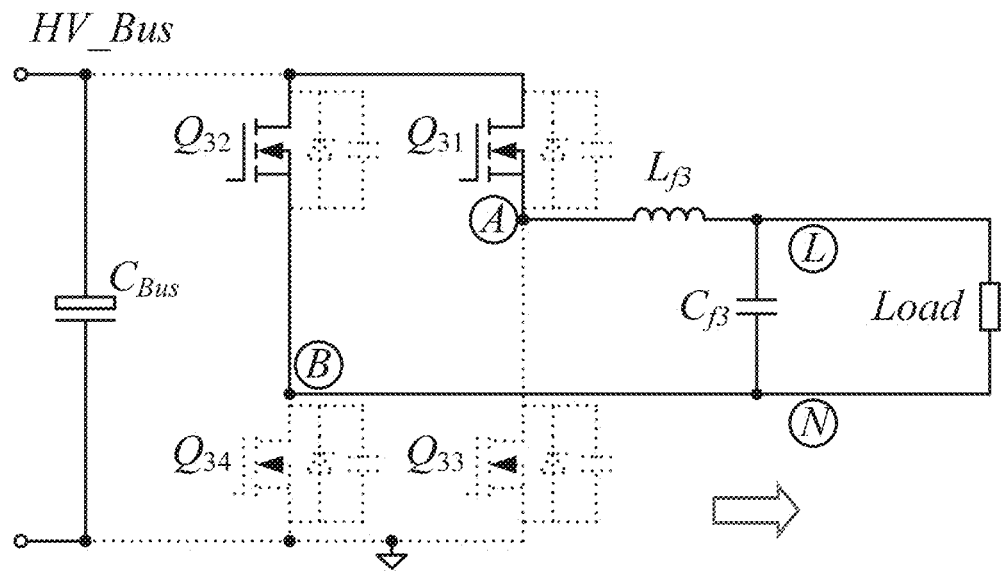
Figure 17D:
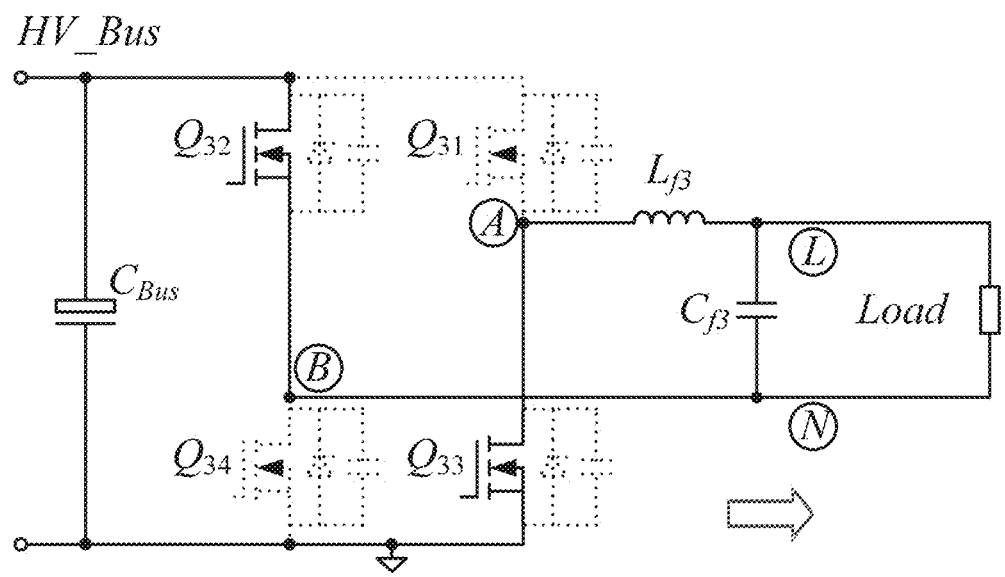
Figure 17E:
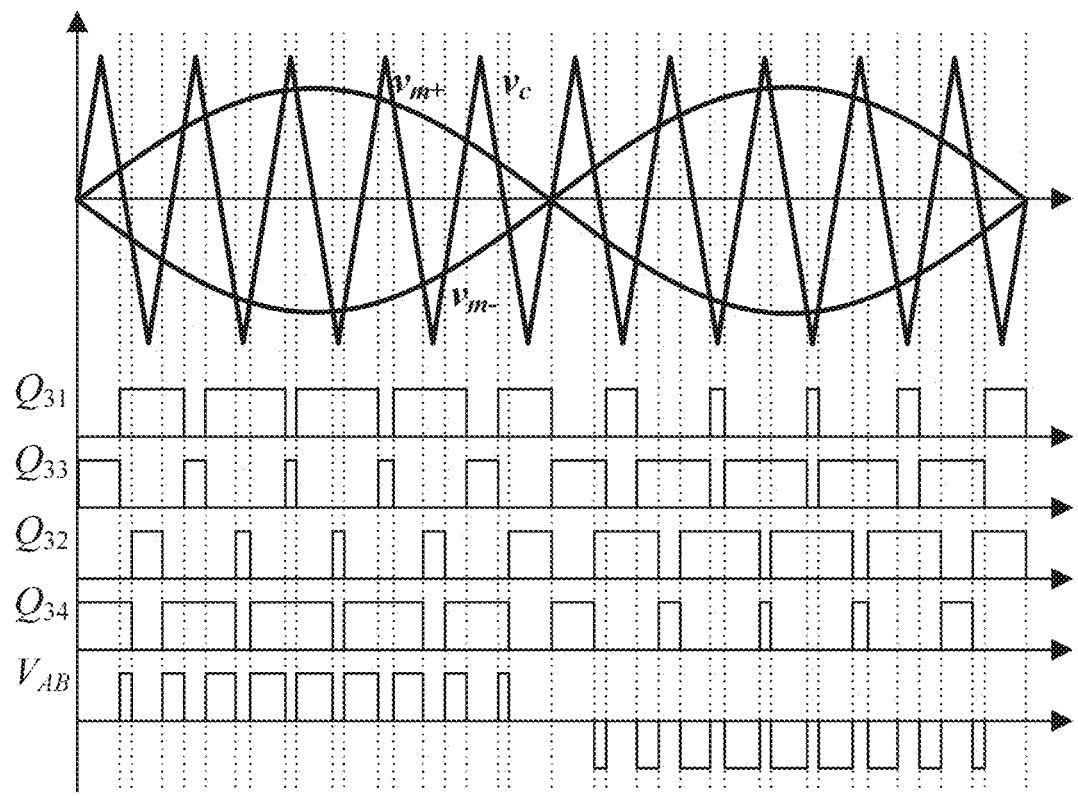
FIG. 17E is a timing diagram of an inverter\PFC circuit in FIG. 8 when an energy apparatus is in a boost inversion mode.

In an example, when the energy apparatus 40 is in the boost inversion mode, unipolar frequency multiplication SPWM modulation may be performed on the inverter/PFC circuit. Within one working cycle, the switching elements in the circuit may have two conduction conversion states, as shown in FIGS. 17A to 17D. In the third conduction state, as shown in FIGS. 17A and 17B, $Q_{34}$ remains on constantly, $Q_{32}$ remains off constantly, $Q_{31}$ and $Q_{33}$ are turned on complementarily at a certain duty cycle, the voltage $V_{AB}$ exists between the nodes A and B when $Q_{31}$ is turned on, and the voltage is zero when $Q_{31}$ is turned off. In the third conduction state, in the process where $Q_{31}$ and $Q_{33}$ are turned on complementarily, $Q_{33}$ is turned on first. In the fourth conduction state, as shown in FIGS. 17C and 17D, $Q_{32}$ remains on constantly, $Q_{34}$ remains off constantly, $Q_{31}$ and $Q_{33}$ are turned on complementarily at a certain duty cycle, the voltage $V_{AB}$ exists between the nodes A and B when $Q_{31}$ is turned on, and the voltage is zero when $Q_{31}$ is turned off. In the fourth conduction state, in the process where $Q_{31}$ and $Q_{33}$ are turned on complementarily, $Q_{31}$ is turned on first. It may be learned from FIG. 17E that within one working cycle, a carrier voltage $V_c$ varies in a zigzag form and modulated voltages $V_{m+}$ and $V_{m-}$ both vary in the form of a sine wave in the inverter\PFC circuit, the phase difference between the two sine waves is x, and the duty cycle and the voltage $V_{AB}$ between the nodes A and B are generated at the intersection point of the carrier voltage $V_c$ and the modulated voltage $V_m$. In addition, it may be learned from FIG. 17E that the variation manners of duty cycles for controlling $Q_{31}$, $Q_{32}$, $Q_{33}$, and $Q_{34}$ to be turned on in the first half control cycle are opposite to those in the second half cycle. For example, in the first half cycle, the duty cycle at which $Q_{31}$ is turned on increases and then decreases, but in the second half cycle, the duty cycle at which $Q_{31}$ is turned on decreases and then increases.

It may be learned from the comparison of the unipolar SPWM modulation with the unipolar frequency multiplication SPWM modulation that the two modulation manners each include the two conduction states, but $Q_{31}$ and $Q_{33}$ are turned on complementarily in different order in different conduction states. In addition, the third and fourth conduction states appear alternately in the whole working cycle during the unipolar frequency multiplication SPWM modulation while only the first conduction state appears in the first half modulation cycle and only the second conduction state appears in the second half modulation cycle during the unipolar SPWM modulation. It may be learned from the comparison of FIG. 17E with FIG. 16E that at the same switching frequency, the equivalent frequency of $V_{AB}$ obtained through the unipolar frequency multiplication SPWM modulation is higher than the equivalent frequency of $V_{AB}$ obtained through the unipolar SPWM modulation so that a smaller energy apparatus can be provided.

Figure 18:
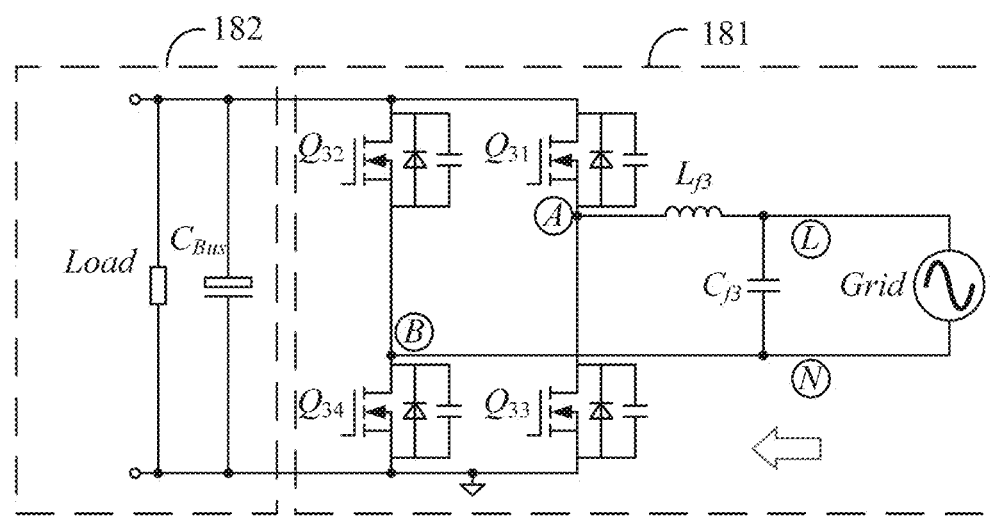
FIG. 18 is a circuit diagram of an inverter\PFC circuit in FIG. 8.

In an example, the energy apparatus 40 is in the rectifier charging mode, and the inverter\PFC circuit can perform PFC modulation to power the load or charge the battery pack using the electrical energy outputted by the alternating current power supply. As shown in FIG. 18, the inverter\PFC circuit mainly includes the full-bridge circuit constituted by $Q_{31}$, $Q_{32}$, $Q_{33}$, and $Q_{34}$. $Q_{32}$ and $Q_{34}$ are turned on complementarily, and $Q_{31}$ and $Q_{33}$ are turned on complementarily. $Q_{32}$ and $Q_{34}$ have two ends accessing the load. The intermediate node of the bridge arm with $Q_{32}$ and $Q_{34}$ is denoted by B, the intermediate node of the bridge arm with 31 and $Q_{33}$ is denoted by A, and the two nodes A and B are connected to the alternating current power supply through the LC circuit.

Figure 19A:
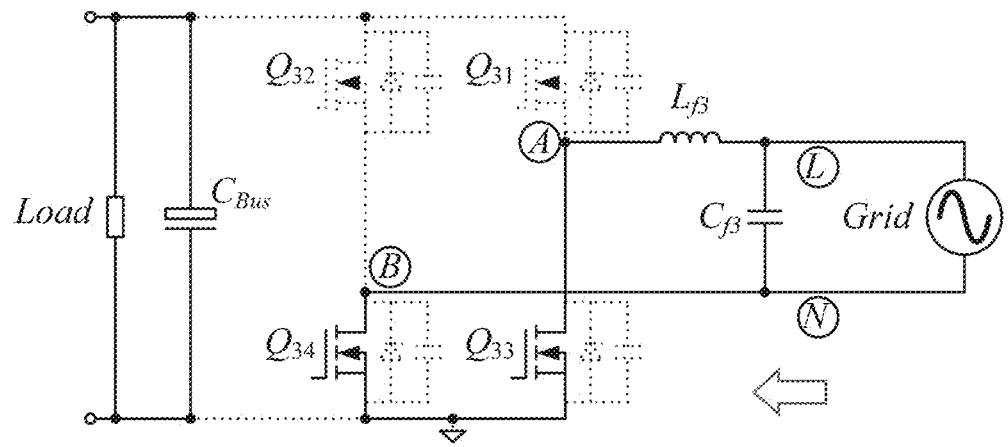
FIGS. 19A to 19D are circuit state diagrams of an inverter\PFC circuit in FIG. 8 when an energy apparatus is in a rectifier charging mode.
Figure 19B:
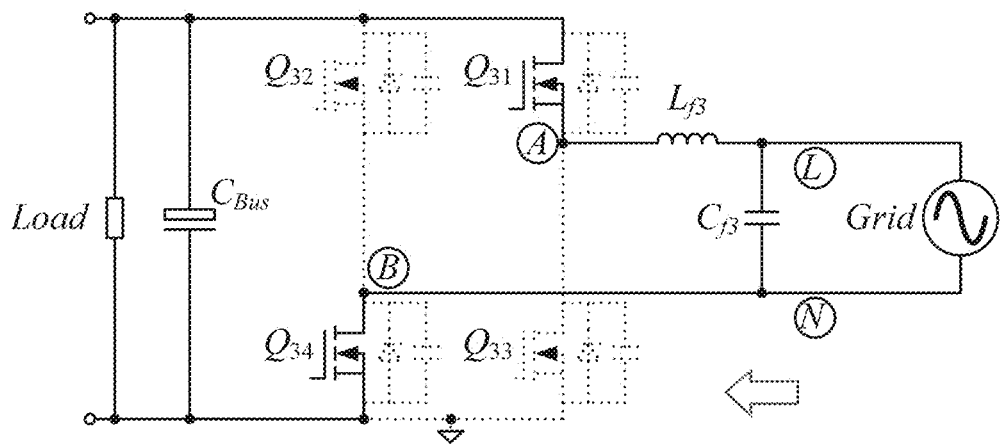
Figure 19C:
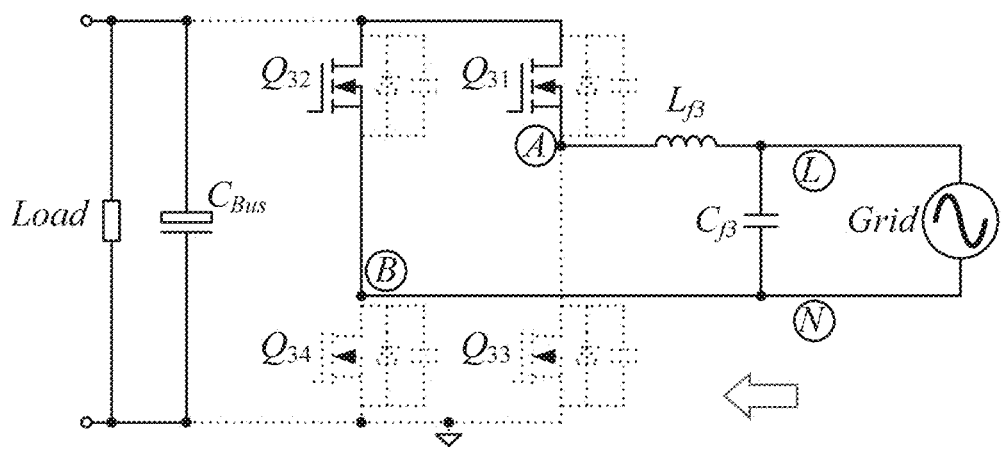
Figure 19D:
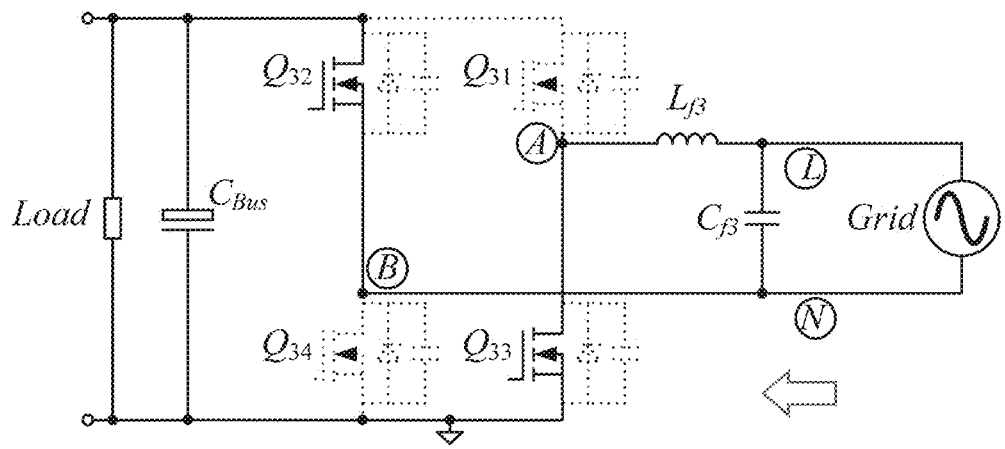
Figure 19E:
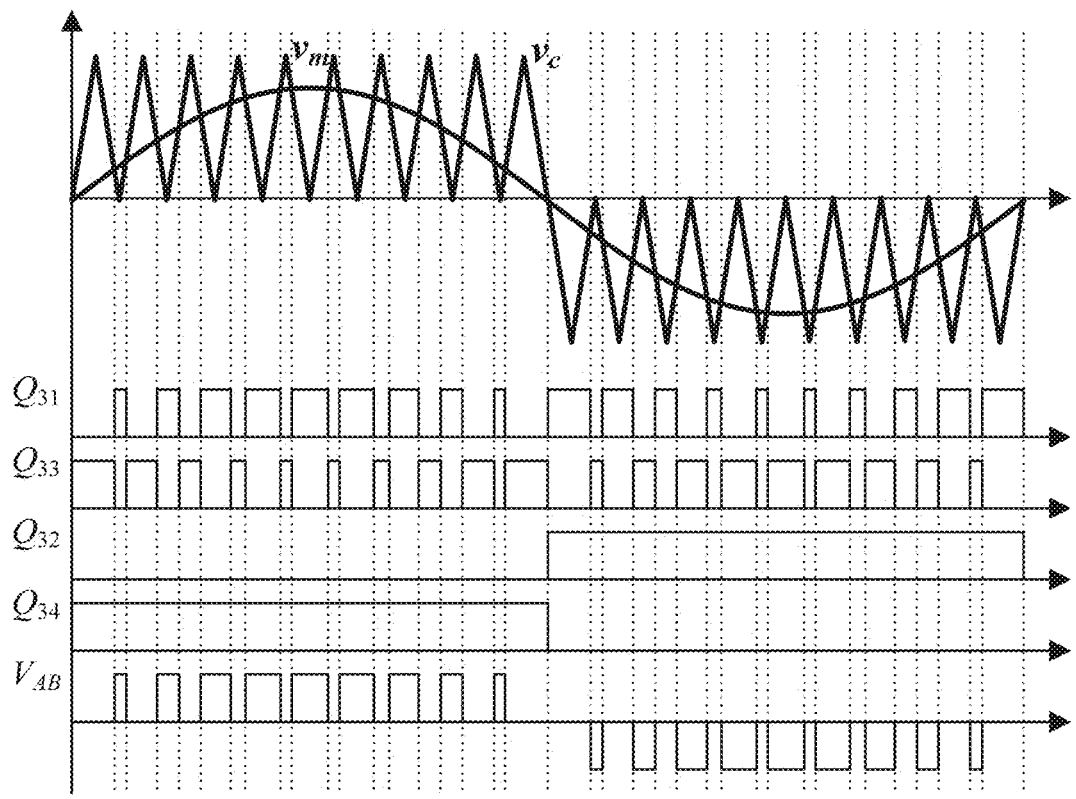
FIG. 19E is a timing diagram of an inverter\PFC circuit in FIG. 8 when an energy apparatus is in a rectifier charging mode.

In an example, when the energy apparatus 40 is in the rectifier charging mode, the switching elements in the inverter\PFC circuit may have two conduction conversion states within one working cycle, as shown in FIGS. 19A to 19D. In the fifth conduction state, as shown in FIGS. 19A and 19B, $Q_{34}$ remains on constantly, $Q_{32}$ remains off constantly, $Q_{31}$ and $Q_{33}$ are turned on complementarily at a certain duty cycle, the voltage $V_{AB}$ exists between the nodes A and B when $Q_{31}$ is turned on, and the voltage is zero when $Q_{31}$ is turned off. In the fifth conduction state, in the process where $Q_{31}$ and $Q_{33}$ are turned on complementarily, $Q_{33}$ is turned on first, and $L_{f3}$ in the circuit stores the energy first and then releases the energy. In the sixth conduction state, as shown in FIGS. 19C and 19D, $Q_{32}$ remains on constantly, $Q_{34}$ remains off constantly, $Q_{31}$ and $Q_{33}$ are turned on complementarily at a certain duty cycle, the voltage $V_{AB}$ exists between the nodes A and B when $Q_{31}$ is turned on, and the voltage is zero when $Q_{31}$ is turned off. In the sixth conduction state, in the process where $Q_{31}$ and $Q_{33}$ are turned on complementarily, $Q_{31}$ is turned on first, and $L_{f3}$ in the circuit stores the energy first and then releases the energy. It may be learned from FIG. 19E that the inverter\PFC circuit works in the fifth conduction manner in the first half modulation cycle and works in the sixth conduction manner in the second half modulation cycle. Within one working cycle, the carrier voltage $V_c$ varies in a zigzag form and the modulated voltage $V_m$ varies in the form of a sine wave in the inverter\PFC circuit, the duty cycle is generated at the intersection point of the carrier voltage $V_c$ and the modulated voltage $V_m$, and the voltage $V_{AB}$ between the nodes A and B is generated.

In FIGS. 15 to 19D, the flow directions of currents in the circuits are indicated by open arrows. In the SPWM modulation manner, the inverter\PFC circuit enables the current to flow into the load from the side of the battery pack to power the load. In the FOC modulation manner, the inverter\PFC circuit enables the current to flow into the load or the battery pack from the side of the alternating current power supply to power the load or charge the battery pack.

Figure 20:
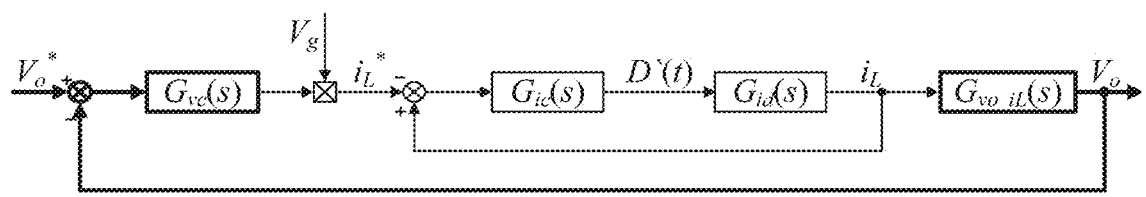
FIG. 20 is a block diagram showing double closed-loop control in a PFC circuit.

In this example, the inverter\PFC circuit shown in FIG. 18 may be abbreviated as a PFC circuit. The PFC circuit may include a current conversion level circuit 181 and a capacitance conversion level circuit 182. The circuit in the first dotted box is the current conversion level circuit 181. The circuit in the second dotted box is the capacitance conversion level circuit 182. When the energy apparatus 40 is in the rectifier charging mode, the PFC circuit can convert the utility power into the direct current and output the direct current to a direct current power tool or the battery pack. Referring to FIG. 20, double closed-loop control of the PFC circuit specifically includes a current loop drawn by a thin solid line and a voltage loop drawn by a thick solid line. Current-loop control may be performed through the current conversion level circuit 181 in FIG. 18. Voltage-loop control may be performed through the capacitance conversion level circuit 182 in FIG. 18. In FIG. 20, $V_o^*$ denotes a reference value of an output voltage, $G_{vc}(s)$ denotes a transfer function for a compensation link of an outer voltage loop, $V_g$ denotes the voltage of the power grid, $i_L^*$ denotes a reference value of an inductor current, $G_{ic}(s)$ denotes a transfer function for a compensation link of an inner current loop, D' (t) denotes a duty cycle of a control signal for controlling $Q_{31}$, $G_{id}(s)$ denotes a transfer function from the inductor current to the duty cycle, $i_L$ denotes a real-time current value of the inductor $L_{f3}$, $G_{vo\_i_L}(s)$ denotes a transfer function from the output voltage to the inductor current, and $V_o$ denotes the output voltage. In the inner current loop, the difference between the reference value $i_L^*$ of the current and the actual value $i_L$ of the inductor current that is fed back is calculated. Then, the compensation link $G_{ic}(s)$ is enabled. A controller (not shown) in a double loop control system may adjust the duty cycle of the switch $Q_{31}$ using a software program and adjust the inductor current in real time using a transfer function $G_{id}(s)$ so that the actual value of the inductor current is closer to the reference value. In the outer current loop, the difference between the reference value $V_o^*$ of the voltage and the actual value $V_o$ of the output voltage that is fed back is calculated. Then, the compensation link $G_{vc}(s)$ is enabled. The controller performs an adjustment using the software program and adjusts the output voltage in real time using the inner current loop and a transfer function $G_{vo\_i_L}(s)$ so that the actual value of the output voltage is increasingly closer to the reference value. To find a factor affecting control stability during the PFC double closed-loop control and eliminate the effect of the factor, a mathematical model for the inner current loop and a mathematical model for the outer voltage loop may be established separately.

In an example, a small signal model may be built for the current conversion level circuit 181 of the PFC circuit:

$$\begin{cases} L\dfrac{d\hat{\imath}_L}{dt} = \hat{V}_g - \hat{V}_o F' - V_o \hat{f}(t) \\ \hat{\imath}_o = \hat{\imath}_L F' + I_L \hat{f}(t) \end{cases} \quad (1)$$

From the preceding model, a small signal function for the inductor current may be determined as follows:

$$\hat{\imath}_L = G_{if}(s)\hat{f} + G_{ig}(s)\hat{V}_g + G_{iv}(s)\hat{V}_o. \quad (2)$$

According to the preceding function, the inductor current $i_L$ is related to three parameters, that is, a freewheeling duty cycle F, the voltage of the power grid $V_g$, and the output voltage $V_o$. $F=D'=1-D$, $G_{if}(s)$ denotes a transfer function from $i_L$ to the duty cycle F, $G_{ig}(s)$ denotes a transfer function from $i_L$ to $V_g$, and $G_{iv}(s)$ denotes a transfer function from $i_L$ to the output voltage $V_o$. The expansions of the three transfer functions are as follows:

$$G_{if}(s) = \frac{\hat{i}_L}{\hat{f}} = -\frac{V_o}{sL+r}, \; G_{ig}(s) = \frac{\hat{i}_L}{\hat{V}_g} = \frac{1}{sL+r}, \; \text{and} \quad (3)$$

$$G_{iv}(s) = \frac{\hat{i}_L}{\hat{V}_o} = -\frac{F}{sL+r};$$

where L denotes the amount of inductance of the inductor $L_{f3}$, and r denotes internal resistance of the inductor $L_{f3}$.

Figure 21A:
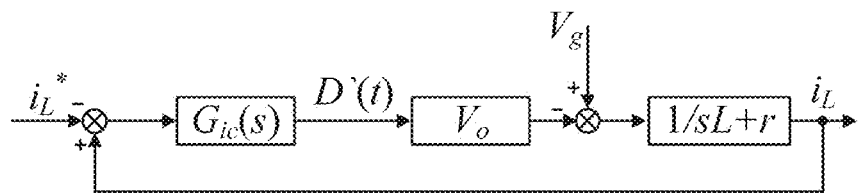
FIGS. 21A and 21B are block diagrams showing current-loop control in a PFC circuit.

In fact, a perturbation voltage $V_g$ exists during the control of the current loop in the PFC circuit. After the parameters in the formulas are substituted, a control block diagram of the inner current loop is shown in FIG. 21a. Thus, a closed-loop transfer function for the inner current loop is as follows:

$$T_i(s) = \frac{G_{ic}(s)V_o(1/sL+r)}{1+G_{ic}(s)V_o(1/sL+r)}. \quad (4)$$

Figure 21B:
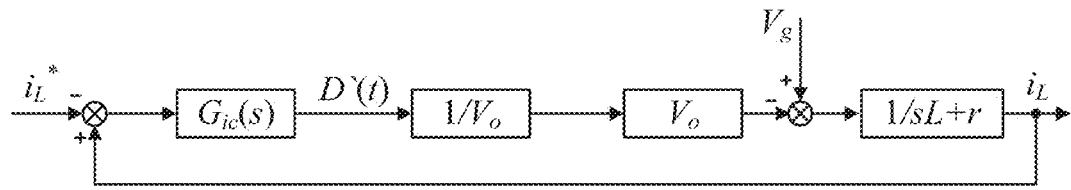

L and r are intrinsic parameters of the physical circuit, that is, the amount of inductance and the internal resistance of the inductor. $V_o$ is regarded as a constant when the PFC circuit works stably. In this case, a controlled object $V_o(1/sL+r)$ in the transfer function $T_i(s)$ for the current loop is stable. The control system may control the controlled object using one set of proportional-integral (PI) controllers. However, in some special cases, $V_o$ is uncertain. For example, during a soft start, $V_o$ continuously increases, and the controlled object also varies constantly. One set of PI controllers are not sufficient to adjust the whole system. As a result, the system is unstable. That is to say, $V_o$ is the factor affecting the control stability of the system. To eliminate the effect of the factor, gain decoupling may be used. That is, $1/V_o$ is multiplied in a forward path shown in FIG. 21A to eliminate the uncertain variable $V_o$. An obtained control loop is shown in FIG. 21B. A current closed-loop transfer function with the gain coupling added is as follows:

$$T_i(s) = \frac{G_{ic}(s)\left(\frac{1}{sL+r}\right)}{1+G_{ic}(s)\left(\frac{1}{sL+r}\right)}. \quad (5)$$

Figure 22:
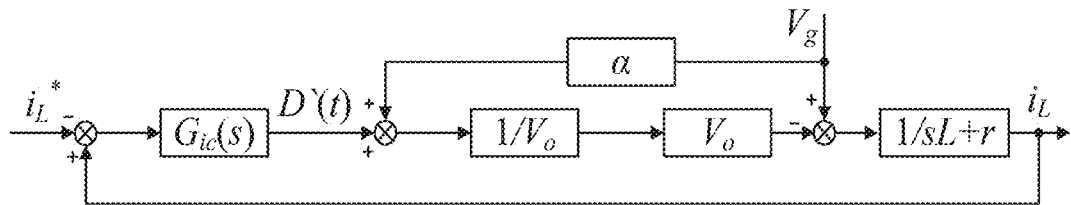
FIG. 22 is a block diagram showing current-loop control in a PFC circuit after feedforward compensation decoupling is added.

In an example, due to the existence of the perturbation voltage $V_g$, one level of feedforward compensation decoupling may be added to implement functions such as per-unit normalization. As shown in FIG. 22, the feedforward compensation decoupling is denoted by $\alpha$. In this case, the controlled object is $1/(sL+r)$, and no variable exists in the forward path. Thus, for $G_{ic}(s)$, the one set of PI controllers can adjust the current control loop under all working conditions.

Figure 23:
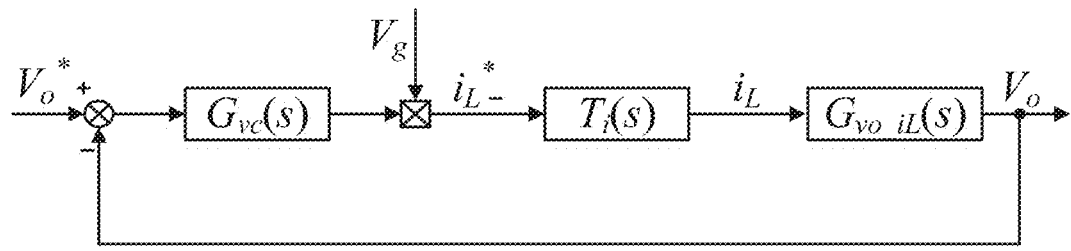
FIG. 23 is a block diagram showing double closed-loop control in a PFC circuit after a transfer function for a current loop is determined.

In an example, the transfer function for the inner current loop for the double closed-loop control is determined as $T_i(s)$, and the double closed-loop control of the PFC circuit shown in FIG. 20 may be transformed into the double closed-loop control shown in FIG. 23. The transfer function $G_{vo\_iL}(s)$ from the output voltage $V_o$ to the inductor current $i_L$ may be decomposed into a transfer function $G_{io\_iL}(s)$ from the output current to the inductor current and a transfer function $G_{vo\_io}(s)$ from the output voltage to the output current. That is, $G_{vo\_iL}(s)=G_{io\_iL}(s)G_{vo\_io}(s)$. The expansions of $G_{io\_iL}(s)$ and $G_{vo\_io}(s)$ in the preceding formula are as follows:

$$G_{io\_iL}(s) = \frac{1}{1-D} = \frac{V_{in\_RMS\_Avg}}{V_{o\_Avg}}; \quad (6)$$

and $$G_{vo\_io}(s) = \frac{R_{L/2}}{1+s(R_{L/2})C_o}. \quad (7)$$

Figure 24:
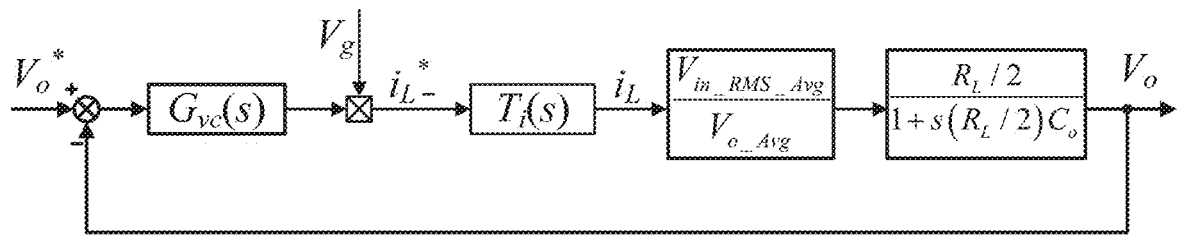
FIG. 24 is a block diagram showing double closed-loop control of a PFC circuit after parameters are substituted.
Figure 25:
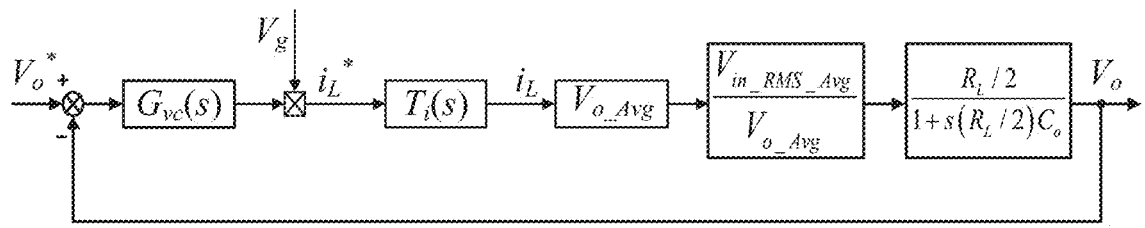
FIG. 25 is a block diagram showing double closed-loop control of a PFC circuit after one-level gain coupling is added.
Figure 26:
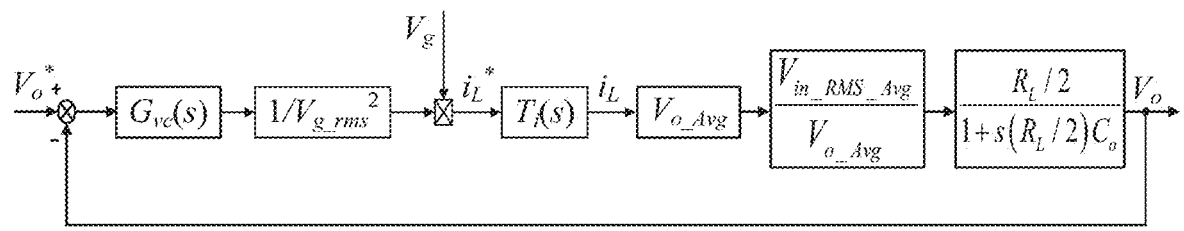
FIG. 26 is a block diagram showing double closed-loop control of a PFC circuit after two-level gain coupling is added.

In the preceding expansions, $V_{in\_RMS\_Avg}$ denotes the average of effective values of an input voltage, $V_{o\_Avg}$ denotes the average of output voltages, $R_L$ denotes internal resistance of the load, and $C_o$ denotes a capacitance value of an output capacitor $C_{Bus}$. After the preceding parameters are substituted into the model for the outer voltage loop, the double closed-loop control of the PFC circuit can be obtained, as shown in FIG. 24. The average $V_{o\_Avg}$ of the output voltages, the voltage $V_g$ of the power grid, and the average $V_{in\_RMS\_Avg}$ of the effective values of the input voltage also need to be eliminated through the gain decoupling separately, which is substantially the same as the principle of the current loop. In an implementation, the gain decoupling may be performed on $V_{o\_Avg}$ first so that the double closed-loop control shown in FIG. 25 is obtained. Then, the gain decoupling is performed on $V_g$ and $V_{in\_RMS\_Avg}$ so that the control block diagram shown in FIG. 26 is obtained. Both $V_{in\_RMS\_Avg}$ and $V_{o\_Avg}$ are the averages within one power frequency period, and $V_g$ is a real-time sine wave value. Therefore, $V_g=(V_{rms})^{(1/2)}$. In this case, a voltage closed-loop transfer function is as follows:

$$T_v(s) = \frac{G_{vc}(s)*\sqrt{2}*T_i(s)*\frac{R_{L/2}}{1+s(R_{L/2})C_o}}{1+G_{vc}(s)*\sqrt{2}*T_i(s)*\frac{R_{L/2}}{1+s(R_{L/2})C_o}}. \quad (8)$$

The parameters in the preceding formula are all fixed values. Therefore, for $G_{vc}(s)$, only the one set of PI controllers can adjust the voltage control loop under all the working conditions.

Figure 27:
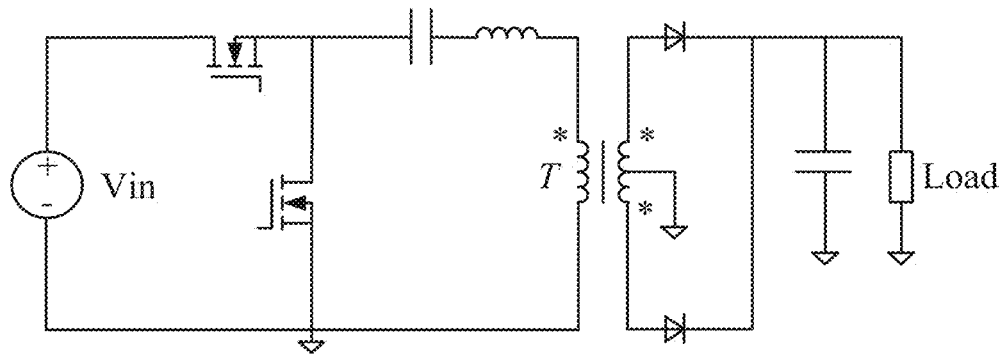
FIG. 27 is a diagram of an LLC circuit.

In an example, when the energy apparatus 40 is in the rectifier charging mode, the energy apparatus 40 may also include an LLC circuit. In an example, as shown in FIG. 27, the LLC circuit can perform a DC-DC conversion on the inputted current and output the converted current to the load. In this example, an LLC resonant circuit may be connected in series after the PFC circuit to achieve a high-frequency and high-efficiency DC-DC conversion, but the output voltage is not easy to adjust. The reason is that the adjustment of the output voltage involves frequency modulation and the adjustment of the duty cycle of the control signal, which is not easy to implement for magnetic elements in the LLC circuit. Therefore, to adjust the output voltage of the LLC circuit, the present application provides a two-level LLC circuit specifically including a main circuit and an adjustable circuit.

Figure 28:
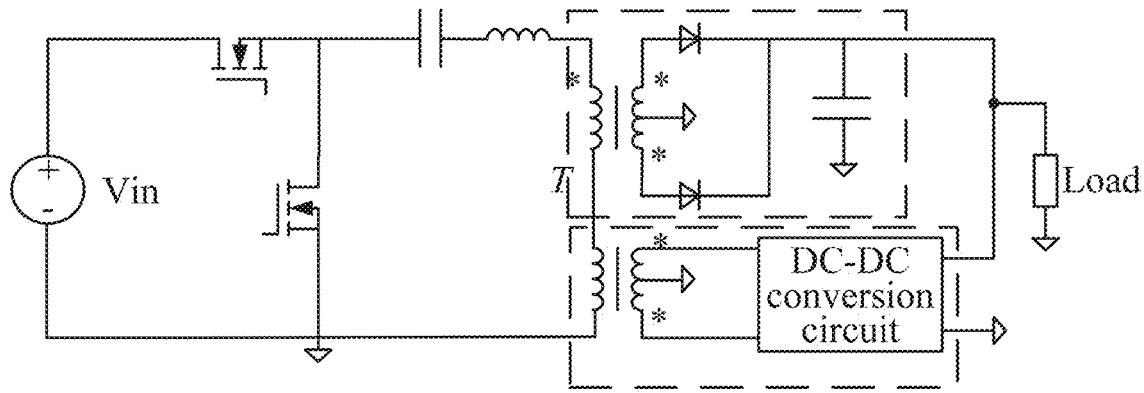
FIG. 28 is a diagram of a two-level LLC circuit.

As shown in FIG. 28, the difference between the two-level LLC circuit and a traditional LLC circuit lies in that the primary winding of a transformer T in the two-level LLC circuit may divide power in the loop of the main circuit into high power and low power. The high power may account for about 90% of the power in the main loop. The low power may account for about 10% of the power in the main loop. In this example, the circuit connected to one secondary winding of the transformer T is the same as the circuit connected to the secondary winding of a transformer in the traditional LLC circuit. The high power in the main loop is allocated to the secondary winding. The other secondary winding of the transformer T is connected to one DC-DC conversion circuit. The low power in the main loop is allocated to the secondary winding. The circuit structure of the DC-DC conversion circuit is not specifically limited in this example. The outputs of the circuits connected to the two secondary windings of the transformer T in the two-level LLC circuit are connected in parallel to be used as the output of the whole circuit.

When output power needs to be adjusted, the output voltage or output power of the DC-DC conversion circuit can be controlled through pulse-width modulation (PWM) modulation. That is to say, when the output power of the LLC circuit needs to be adjusted, the overall output power may be adjusted through the adjustment of a small part of the power in the circuit. Moreover, a large part of the power in the circuit is still outputted after being converted by the traditional LLC circuit. Only the small part of the power in the whole circuit undergoes a two-level conversion, that is, an LLC conversion and the PWM modulation. The large part of the power in the whole circuit undergoes only a one-level conversion, that is, the LLC conversion. Thus, the efficiency of the whole machine can be improved.

Figure 29:
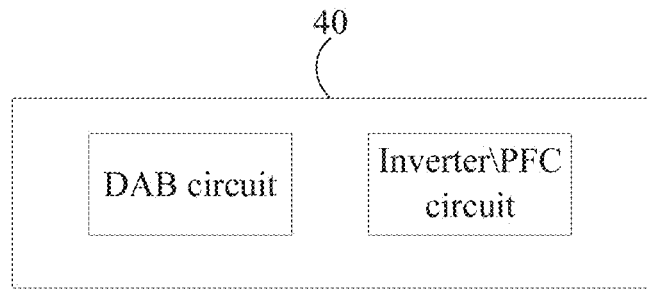
FIG. 29 is a schematic diagram of a two-level conversion circuit in an example of the present application.

In an example, referring to FIG. 29, the energy apparatus 40 is constituted by a two-level conversion circuit. The two-level conversion circuit specifically includes a DAB circuit capable of implementing the first-level conversion and the second-level conversion and the inverter\PFC circuit capable of implementing the three-level conversion. The inverter\PFC circuit is the same as that in the preceding example and is not described in detail here. The DAB circuit is mainly introduced in this example.

Figure 30:
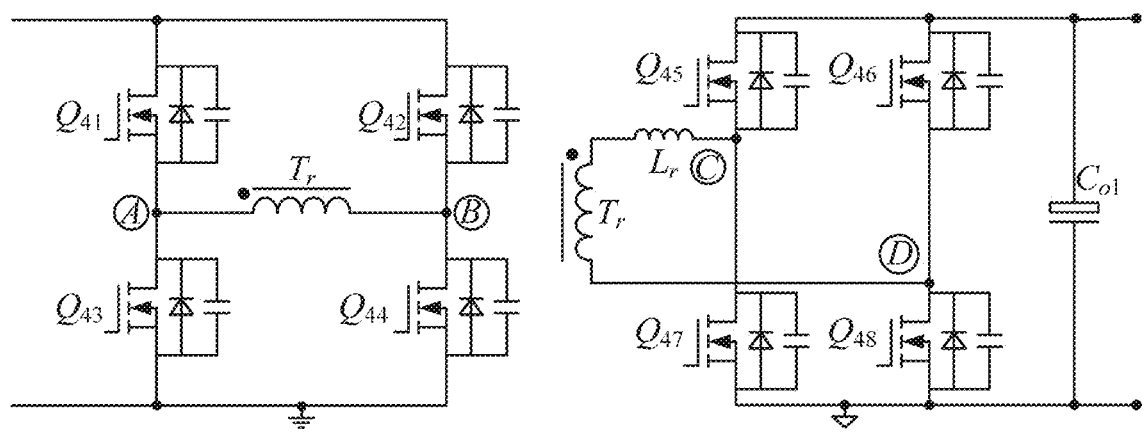
FIG. 30 is a circuit diagram of a dual-active bridge (DAB) circuit in FIG. 8.

In an example, as shown in FIG. 30, the DAB circuit is a dual-active full-bridge bidirectional DC-DC converter. Switching elements on each bridge arm are turned on complementarily with a phase difference of 180°. All switching elements on opposite corners are turned on at the same time. The value of the phase shift angle between the midpoint voltage of a primary bridge arm and the midpoint voltage of a secondary bridge arm may be controlled such that transmission power of the DAB circuit is controlled. A specific transmission process is not described in detail.

In an example, the process in which the control unit 42 controls the energy apparatus 40 to change the energy conversion state in the circuit may be regarded as the process in which the power elements in the circuit are controlled to change the conduction states thereof.

Figure 31:
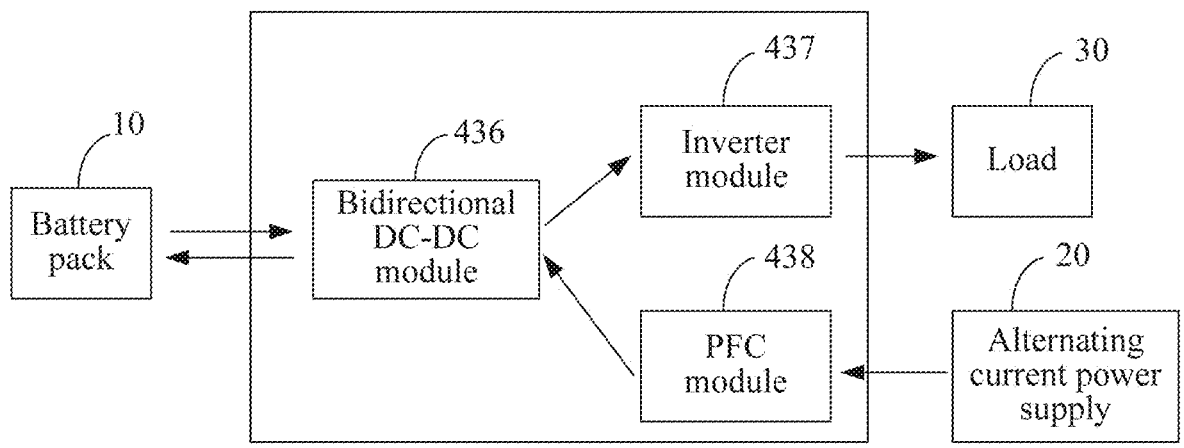
FIG. 31 is a structural diagram of an energy conversion circuit in an energy apparatus.

In an example, as shown in FIG. 31, the energy conversion circuit 43 may include a bidirectional DC-DC module 436, an inverter module 437, and a PFC module 438. The bidirectional DC-DC module 436 and the inverter module 437 can constitute an energy transfer path for the battery pack to supply the discharging energy to the load. That is to say, the energy apparatus 40 can work in the boost inversion mode after accessing the battery pack 10 and the load 30. After passing through the bidirectional DC-DC module 436 and the inverter module 437, the electrical energy outputted by the battery pack 10 can be converted into electrical energy suitable for powering the load 30. For example, if the output voltage of the battery pack 10 is 20 V and the operating voltage of the load is 24 V, the bidirectional DC-DC module 436 and the inverter module 437 need to perform a boost conversion or inversion on the electrical energy outputted by the battery pack 10 and then outputs a power supply voltage of 24 V to the load 30. In addition, the PFC module 438 and the bidirectional DC-DC module constitute an energy transfer path for the alternating current power supply to supply the charging energy to the battery pack. That is to say, the energy apparatus 40 can work in the rectifier charging mode after accessing the alternating current power supply and the battery pack. The alternating current can be converted by the PFC module 438 and the bidirectional DC-DC module 436 into electrical energy suitable for charging the battery pack. In an example, the battery pack 10 may be the first energy storage apparatus, that is, an external battery pack accessed through the power interface of the energy apparatus. In an example, the battery pack 10 may be the second energy storage apparatus, that is, a built-in battery pack built in the housing of the energy apparatus 40. In this example, the battery pack 10 may include the first energy storage apparatus and the second energy storage apparatus. That is, the external battery pack and the built-in battery pack connected to the energy apparatus 40 may discharge the electricity to the load at the same time and may be charged at the same time. In this example, it is to be understood that the bidirectional DC-DC module 436 can perform the DC-DC conversion on both the input electrical energy from the side of the battery pack and the input electrical energy from the side of the alternating current power grid.

Figure 32:
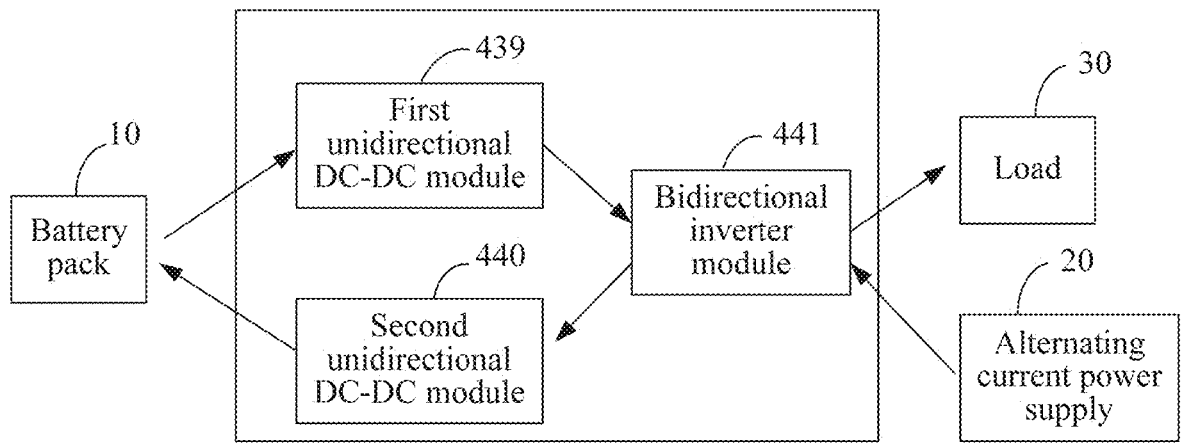
FIG. 32 is another structural diagram of an energy conversion circuit in an energy apparatus.

In an example, as shown in FIG. 32, the energy conversion circuit 43 may include a bidirectional inverter module 441 and two unidirectional DC-DC modules, that is, a first unidirectional DC-DC module 439 and a second unidirectional DC-DC module 440. The two unidirectional DC-DC modules may have the same or different topological structures of circuits. In addition to the inversion function, the bidirectional inverter module 441 may also have a PFC function. In an example, the first unidirectional DC-DC module 439 and the bidirectional inverter module 441 constitute an energy transfer path for the battery pack to supply the discharging energy to the load, and the second unidirectional DC-DC module 440 and the bidirectional inverter module 441 constitute an energy transfer path for the alternating current power supply to supply the charging energy to the battery pack. In an example, the second unidirectional DC-DC module 440 and the bidirectional inverter module 441 constitute an energy transfer path for the battery pack to supply the discharging energy to the load, and the first unidirectional DC-DC module 439 and the bidirectional inverter module 441 constitute an energy transfer path for the alternating current power supply to supply the charging energy to the battery pack. In this example, the battery pack 10 may include the first energy storage apparatus and the second energy storage apparatus. That is, the external battery pack and the built-in battery pack connected to the energy apparatus 40 may discharge the electricity to the load at the same time and may be charged at the same time.

In some examples, the energy apparatus may also be referred to as a bidirectional power supply apparatus or a portable power supply apparatus, which can satisfy application requirements in outdoor, indoor, or various scenarios.

Figure 33:
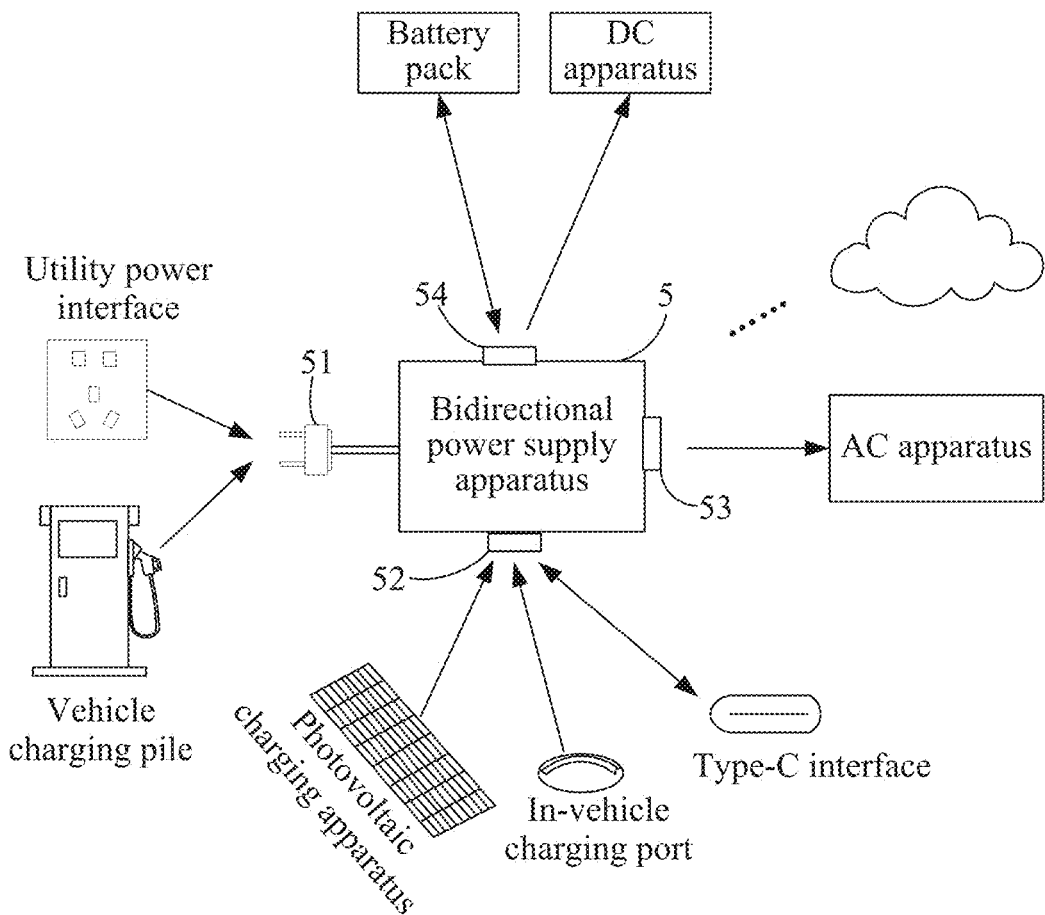
FIG. 33 is a schematic diagram of an ecosystem of a bidirectional power supply apparatus in this example.

Referring to FIG. 33, a power supply system includes at least a bidirectional power supply apparatus 5. The bidirectional power supply apparatus 5 includes at least multiple electrical energy transfer ports, for example, an alternating current input port 51, a first direct current input or output port 52, an alternating current output port 53, and a second direct current input or output port 54. In this example, the number of electrical energy transfer ports of each type is at least one.

The alternating current input port 51 may be a device that can connect a cable to a fixed wire as desired, commonly known as a plug. The alternating current input port 51 can be plugged into an interface of the utility power to input the utility power or can be electrically connected to a charging port of the charging pile of the vehicle to enable charging with electrical energy outputted by the charging pile. The charging pile of the vehicle may be an alternating current slow charging pile. The type of the alternating current input port 51 is not specifically limited in this example. The alternating current input port 51 can support a charging voltage of 220 V, 110 V, or 120 V.

The first direct current input or output port 52 may include a port capable of inputting the direct current and a port capable of inputting and outputting the direct current. For example, the first direct current input or output port 52 may include a direct current input port 521 that can be connected to a photovoltaic charging apparatus or an in-vehicle charging port to input the direct current to the bidirectional power supply apparatus 5. Alternatively, the first direct current input or output port 52 may include a first direct current input port/output port 522 that can be connected to a bidirectional USB type-C interface to transmit the direct current bidirectionally. Alternatively, the first direct current input or output port 52 may include a direct current output port for outputting the direct current to a direct current device. The photovoltaic charging apparatus may include a solar panel or a solar charger. The in-vehicle charging port may be a port that can be connected to a cigar lighter. The so-called bidirectional type-C interface may input external electrical energy to the bidirectional power supply apparatus 5 and may also output the electrical energy from the bidirectional power supply apparatus 5. In this example, the input voltage of the direct current input port 521 is greater than or equal to 5 V and less than or equal to 80 V. For example, the input voltage of the direct current input port 521 may be 5 V, 9 V, 10 V, 12 V, 15 V, 18 V, 20 V, 25 V, 30 V, 35 V, 40 V, 45 V, 50 V, 55 V, 60 V, 65 V, 70 V, 75 V, or 80 V. The input current of the direct current input port 521 does not exceed 10 A. When the first direct current input port/output port 522 is used as the direct current input port, that is, the first direct current input port/output port 522 inputs the electrical energy to the bidirectional power supply apparatus 5, the input voltage of the port is greater than or equal to 5 V and less than or equal to 80 V. For example, the input voltage of the port may be 5 V, 9 V, 10 V, 12 V, 15 V, 18 V, 20 V, 25 V, 30 V, 35 V, 40 V, 45 V, 50 V, 55 V, 60 V, 65 V, 70 V, 75 V, or 80 V. As the direct current input port, the first direct current input port/output port 522 has an input current of no greater than 5 A and output power of no greater than 250 W. For example, the output power may be 240 W, 220 W, or 200 W. When the first direct current input port/output port 522 is used as the direct current output port, that is, the first direct current input port/output port 522 outputs the direct current from the bidirectional power supply apparatus 5, the input voltage of the port is greater than or equal to 60 V and less than or equal to 120 V. For example, the input voltage of the port may be 60 V, 70 V, 80 V, 90 V, 100 V, 110 V, or 120 V. As the direct current output port, the first direct current input port/output port 522 has an output current of no greater than 5 A, and the output peak power is substantially 250 W.

The alternating current output port 53 can output the alternating current to an alternating current apparatus. The alternating current apparatus may include an alternating current power tool, an alternating current household appliance, or the like. The port type of the alternating current output port 53 is not specifically limited in the present application.

The output power of the first direct current input port/output port 52 or the alternating current output port 53 is greater than or equal to 600 W. For example, the output power may be 600 W, 700 W, 800 W, or 900 W. In an example, the output power of the first direct current input port/output port 52 or the alternating current output port 53 is greater than or equal to 1000 W. For example, the output power may be 1000 W, 1200 W, or 1400 W.

The second direct current input or output port 54 may include a port capable of outputting the direct current and a port capable of outputting and inputting the direct current. For example, the second direct current input or output port 54 may include a direct current output port 541 that can be connected to a direct current apparatus to output the direct current to power the direct current apparatus. Alternatively, the second direct current input or output port 54 may include a second direct current input port/output port 542 that can be connected to the rechargeable battery pack to be capable of transmitting the direct current bidirectionally. The direct current apparatus may include the direct current power tool, a supercapacitor, or a direct current household appliance. For example, the direct current apparatus may power a household vacuum cleaner or a cleaning robot.

In another example, the bidirectional energy apparatus 5 may transfer the electrical energy wirelessly. For example, the bidirectional energy apparatus 5 implements energy transfer through energy coupling between coils so that a smartphone or another terminal device can be charged.

In this example, the alternating current apparatus or an alternating current device may be the alternating current power tool, and the direct current apparatus or the direct current device may be the direct current power tool. In another example, an electric device that can be powered with the alternating current or the direct current according to the type of accessed power supply may be referred to as an alternating current/direct current device, for example, an alternating current/direct current power tool.

In this example, the alternating current power tool, the direct current power tool, or the alternating current/direct current power tool may be a handheld power tool, for example, a drill, a pruner, or a sander. Alternatively, the alternating current power tool, the direct current power tool, or the alternating current/direct current power tool may be a table tool, for example, a table saw, a miter saw, a metal cutter, or an electric router. Alternatively, the alternating current power tool, the direct current power tool, or the alternating current/direct current power tool may be a push power tool, for example, a push mower or a push snow thrower. Alternatively, the alternating current power tool, the direct current power tool, or the alternating current/direct current power tool may be a riding power tool, for example, a riding mower, a riding vehicle, or an all-terrain vehicle. Alternatively, the alternating current power tool, the direct current power tool, or the alternating current/direct current power tool may be a robotic tool, for example, a robotic mower or a robotic snow thrower. In some examples, the alternating current power tool or the direct current power tool may be an electric drill, an electric light, an electric vehicle, or the like. In some examples, the alternating current power tool or the direct current power tool may be a garden tool, for example, a pruner, a blower, a mower, or a chain saw. Alternatively, the alternating current power tool or the direct current power tool may be a decoration tool, for example, a screwdriver, a nail gun, a circular saw, or a sander. In some examples, the alternating current power tool or the direct current power tool may be a vegetation maintenance tool, for example, a string trimmer, a mower, a pruner, or a chain saw. Alternatively, the power tool 200 may be a cleaning tool, for example, a blower, a snow thrower, or a washer. Alternatively, the power tool may be a drilling tool, for example, a drill, a screwdriver, a wrench, or an electric hammer. Alternatively, the power tool may be a sawing tool, for example, a reciprocating saw, a jigsaw, or a circular saw. Alternatively, the power tool may be a sanding tool, for example, an angle grinder or a sander. Alternatively, the power tool may be another tool, for example, a light or a fan.

Figure 34:
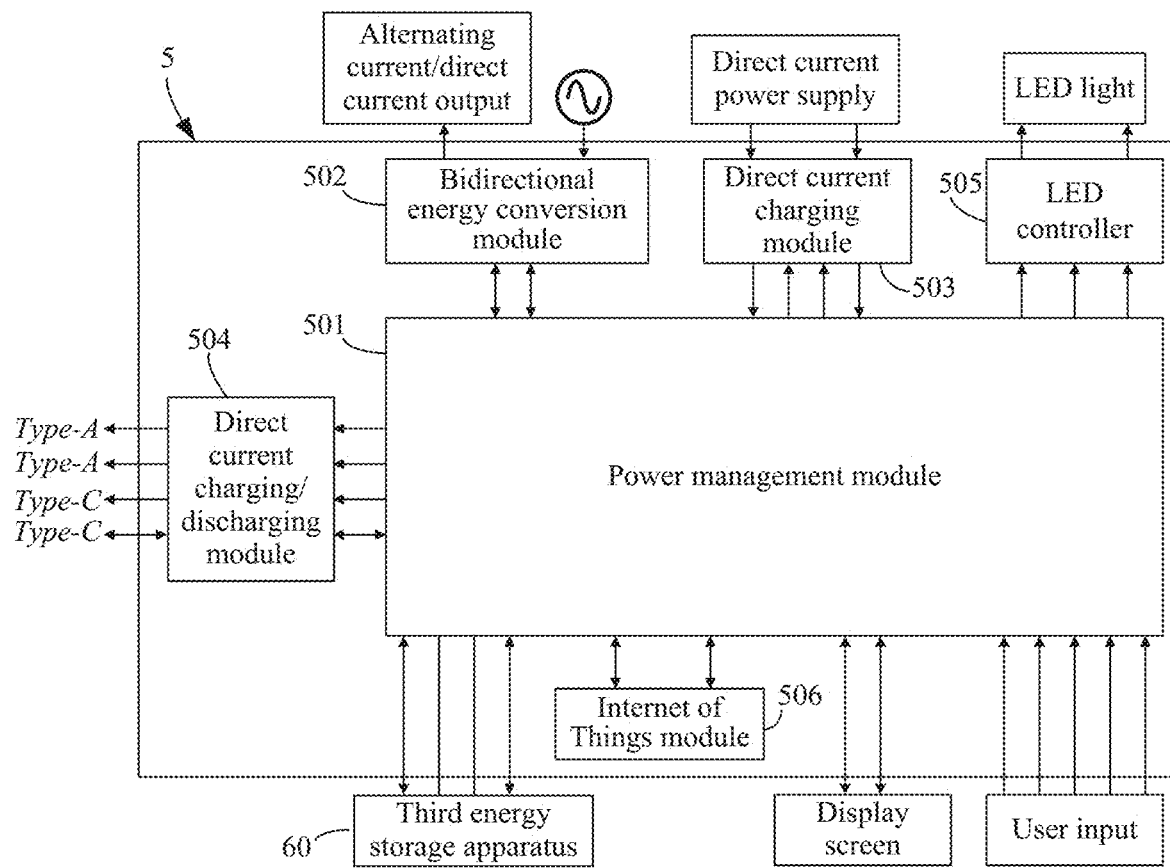
FIG. 34 is a circuit diagram of a bidirectional power supply apparatus in this example.

In an example, referring to FIG. 34, the bidirectional power supply apparatus 5 may at least include a power management module 501, a bidirectional energy conversion module 502 electrically coupled to the power management module 501, a direct current charging module 503, a direct current charging/discharging module 504, a light-emitting diode (LED) controller 505, and an Internet of Things module 506. In an example, the bidirectional power supply apparatus 5 may also be connected to at least one third energy storage apparatus 60. The third energy storage apparatus 60 may be the battery pack capable of storing the electrical energy. The battery pack can be repeatedly charged or release the electrical energy to power a power tool accessing the bidirectional power supply apparatus 5. For example, the third energy storage apparatus 60 may be a 1P battery pack of 56 V, a 2P battery pack, a 3P battery pack, or a 4P battery pack. The preceding various direct current power tools can be powered with the electrical energy outputted by the third energy storage apparatus 60.

In this example, the bidirectional energy conversion module 502 can implement the bidirectional flow of the energy. Referring to FIG. 34, the bidirectional energy conversion module 502 can access the alternating current power supply. The bidirectional energy conversion module 502 may perform an alternating current/direct current (AC/DC) conversion on the alternating current or perform a direct current/alternating current (DC/AC) conversion on the direct current accessed by another port. In this example, the bidirectional energy conversion module 502 may perform a direct current output port or an alternating current output port. The bidirectional energy conversion module 502 may output the charging electrical energy to the third energy storage apparatus 60 or the supercapacitor, output direct current electrical energy for supplying power to the power tool or another direct current powered device, or perform the output through the USB interface after the electrical energy passes through the Internet of Things module 506. In some examples, the bidirectional energy conversion module 502 may also convert electrical energy from the direct current charging module 503 into the alternating current output port, convert the electrical energy of the third energy storage apparatus 60 into the alternating current output port, or convert a direct current from the direct current charging/discharging module into the alternating current output port. The electrical coupling relationship between the bidirectional energy conversion module 502 and another module in the bidirectional power supply apparatus 5 is not specifically limited here.

Like the direct current input port 521 in the preceding example, the direct current charging module 503 can be connected to the photovoltaic charging apparatus or the in-vehicle charging port to access the direct current power supply. In an example, another module in the bidirectional power supply apparatus 5 may be powered with a direct current input ported through the direct current charging module 503. Alternatively, a direct current input ported through the direct current charging module 503 may be converted by the bidirectional energy conversion module 502 and then outputted to an external alternating current powered device or a direct current powered device. Alternatively, a direct current input ported through the direct current charging module 503 may be outputted to an external powered device through the direct current charging/discharging module 504.

The direct current charging/discharging module 504 may include and connect multiple USB type-A interfaces for outputting the electrical energy to the outside, a USB type-C interface for outputting the electrical energy to the outside, and a USB type-C interface capable of bidirectionally transferring the electrical energy.

The LED controller 505 is configured to control the lighting state of LED lights, for example, a flashing frequency, an illumination intensity, or the number of lighted LED lights so that current charging and discharging modes, a working state, or the alarm of an abnormal state, or the like of the bidirectional power supply apparatus 5 is displayed through the lighting state of the LED lights.

The Internet of Things module 506 is configured to be capable of performing wireless communication with an external terminal device. For example, the Internet of Things module 506 may display the working state of the bidirectional power supply apparatus 5, charging and discharging states of the bidirectional power supply apparatus 5, a connection state between the bidirectional power supply apparatus 5 and an external port, a connection state of an interface of the third energy storage apparatus 60 or a fourth energy storage apparatus 507, the charging power or discharging power of each module, the remaining charging time of different modules, the number of historical charging and discharging times, or a health status of the energy storage apparatus through a terminal application in a smart terminal. In an example, the charging and discharging states or the charging and discharging power of the bidirectional power supply apparatus 5 may also be adjusted through the terminal application, or the user customizes the power allocation priority of different modules in a charging or discharging process. In another example, the Internet of Things module 506 may also acquire an update program transmitted by the external terminal device, a server, a cloud server, or the like to upgrade and update some modules or ports in the bidirectional power supply apparatus 5. In an example, the bidirectional power supply apparatus 5 may be remotely controlled through the wireless communication between a remote terminal device and the Internet of Things module 506.

In an example, the bidirectional power supply apparatus 5 may be provided with a display screen or a user input. The display screen may directly display a connection state of each port of the bidirectional power supply apparatus 5, a charging/discharging state of each port, the charging/discharging power, the charging/discharging mode, a charging/discharging countdown, indication information about simultaneous charging and discharging, an Internet of Things connection state, a fault state, the lighting state of the LED lights, the interaction information or control information between the Internet of Things module 506 and the external terminal device, or the like. In an example, the display screen may also display a connection state of each of different ports accessing the power supply or the powered device. For example, the display screen may display whether the third energy storage apparatus 60 is plugged or unplugged or has a fault.

The user input may be an on/off button for the user to control the bidirectional power supply apparatus 5 to be on or off. In an example, the user input may be displayed on the display screen. The user may control, by touching the screen, the bidirectional power supply apparatus 5 to be on or off. In an example, an operator may select an enable terminal of the bidirectional power supply apparatus 5 through the user input. For example, the operator may select AC enabling, that is, the bidirectional power supply apparatus 5 is controlled to be capable of outputting the alternating current to the powered device and be incapable of outputting the direct current. Alternatively, the operator may select DC enabling, that is, the bidirectional power supply apparatus 5 can output the direct current to the powered device and cannot output the alternating current. Alternatively, the operator may select LED enabling, that is, the on or off states, illumination intensities, and the like of the LED lights can be controlled.

Figure 35:
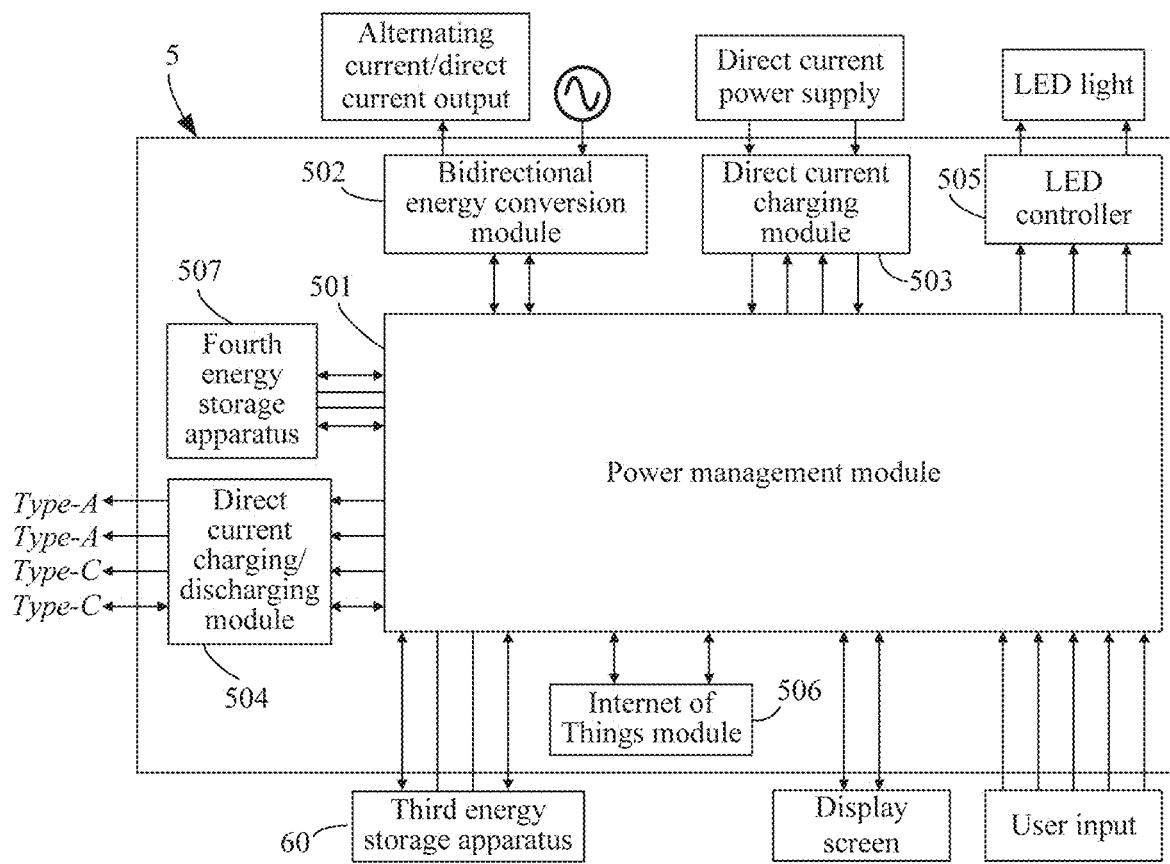
FIG. 35 is a circuit diagram of a bidirectional power supply apparatus in this example.

In an example, referring to FIG. 35, the fourth energy storage apparatus 507 may be built in the bidirectional power supply apparatus 5. The fourth energy storage apparatus 507 is fixedly disposed in the bidirectional power supply apparatus 5 and can serve as a power supply powering each module in the bidirectional power supply apparatus 5. In an example, the fourth energy storage apparatus 507 may be charged with electrical energy outputted by at least one of the direct current charging module 503, the direct current charging/discharging module 504, or the bidirectional energy conversion module 502.

In this example, the third energy storage apparatus 60 and the fourth energy storage apparatus 507 may have at least partially the same or completely the same or completely different performance or parameters such as a capacity, a chemical property, a rated voltage, a shape, a size, a service life, a power density, an energy density, a temperature characteristic, and charging and discharging rates. In an example, the rated voltage, capacity, or output power of the fourth energy storage apparatus 507 is less than the rated voltage, capacity, or output power of the third energy storage apparatus 60.

In this example, each of the third energy storage apparatus 60 and the fourth energy storage apparatus 507 may include one or more battery packs or may be another apparatus capable of storing or releasing the electrical energy.

When the fourth energy storage apparatus 507 is built in the bidirectional power supply apparatus 5, the third energy storage apparatus 60 is externally connected to the bidirectional power supply apparatus 5, and the two energy storage apparatuses supply the power, that is, the two energy storage apparatuses output the electrical energy, the power management module 501 may control all third energy storage apparatuses 60 to discharge in parallel first. After the third energy storage apparatuses 60 end discharging or discharge for a preset time, the built-in fourth energy storage apparatus 507 is controlled to discharge. The characteristic parameters of the two types of energy storage apparatuses satisfy discharging parameter thresholds. That is to say, the bidirectional power supply apparatus 5 has the capabilities of discharging in parallel and discharging in a time-division manner. In an example, the power management module 501 may control the third energy storage apparatus 60 and the fourth energy storage apparatus 507 to discharge alternately. In an example, the power management module 501 may determine, according to the type of powered device accessed by the bidirectional power supply apparatus 5, whether the third energy storage apparatus 60 or the fourth energy storage apparatus 507 is used to discharge.

In an example, the alternating current powered device or the direct current powered device may be powered with electrical energy outputted by the third energy storage apparatus 60 or the fourth energy storage apparatus 507. In this example, the output power of the fourth energy storage apparatus 507 is greater than or equal to 100 W and less than or equal to 1000 W, for example, 100 W, 200 W, 400 W, 600 W, 800 W, 900 W, or 1000 W. In this example, the characteristic parameter of the third energy storage apparatus 60 or the fourth energy storage apparatus 507 may include a parameter which can measure whether the energy storage apparatus can stably output the electrical energy, for example, a current capacity, a voltage, or a temperature. The discharging parameter threshold may be a minimum discharging voltage, a minimum or maximum discharging temperature, a minimum discharging capacity, or the like.

When receiving the electricity, the third energy storage apparatus 60 or the fourth energy storage apparatus 507 may be charged through the bidirectional power supply apparatus 5. It can be learned from the preceding example that the bidirectional power supply apparatus 5 may input the electrical energy through the bidirectional energy conversion module 502, the direct current charging module 503, or the direct current charging/discharging module 504. In an example, the power management module 501 may control a power supply inputted by at least one power supply input to charge the fourth energy storage apparatus 507 first. After the fourth energy storage apparatus 507 is fully charged substantially, the third energy storage apparatus 60 is charged. When the bidirectional power supply apparatus 5 is externally connected to at least two third energy storage apparatuses 60, the power management module 501 may control the charging order of the multiple third energy storage apparatuses 60 according to the magnitudes of the real-time voltages of the multiple third energy storage apparatuses 60. For example, after the built-in fourth energy storage apparatus 507 is fully charged substantially, the multiple third energy storage apparatuses 60 are charged in ascending order of voltage. In another example, the power management module 501 may set charging order according to another parameter of the multiple third energy storage apparatuses 60 such as the current capacity or the temperature. In an example, the power management module 501 may charge, at the same time, all the third energy storage apparatuses 60 externally connected to the bidirectional power supply apparatus 5 after the fourth energy storage apparatus 507 is fully charged substantially.

In an example, the power management module 501 may charge the third energy storage apparatuses 60 externally connected and then charge the fourth energy storage apparatus 507 after all the third energy storage apparatuses 60 are fully charged. The power management module 501 may control the third energy storage apparatus 60 with the lowest voltage to be charged to have the same voltage as the third energy storage apparatus 60 with the second lowest voltage, then control the two third energy storage apparatuses 60 to be charged at the same time to have the same voltage as the third energy storage apparatus with the third lowest voltage, and next control the three energy storage apparatuses 60 to be charged at the same time, and so on until all the third energy storage apparatuses 60 substantially have the same voltage and are fully charged substantially.

In this example, the Internet of Things module 506 may change the control of the power management module 501 on the charging and discharging of the third energy storage apparatus 60 and the charging and discharging of the fourth energy storage apparatus 507. For example, the charging and discharging order or the charging and discharging time of the two power supply apparatuses are changed. For example, the user may communicate with the Internet of Things module 506 in the bidirectional power supply apparatus 5 through an application in a user terminal to remotely control the charging/discharging order or time of the fourth energy storage apparatus 507 and the third energy storage apparatus 60 in the bidirectional power supply apparatus 5. For example, the power management module 501 may be controlled to charge all the energy storage energy apparatuses in ascending order of voltage one by one in the time-division manner, one by one alternately, or at the same time without distinguishing the types of energy storage apparatuses. Alternatively, the Internet of Things module 506 may control the power management module 501 to charge multiple built-in fourth energy storage apparatuses 507 in ascending order of voltage one by one in the time-division manner, one by one alternately, or at the same time. Alternatively, the Internet of Things module 506 may control the power management module 501 to charge the multiple external third energy storage apparatuses 60 in ascending order of voltage one by one in the time-division manner, one by one alternately, or at the same time. In this example, the Internet of Things module 506 may control the power management module 501 to charge the energy storage apparatus in another order. For example, the multiple third energy storage apparatuses are controlled to be charged one by one in the time-division manner, one by one alternately, or at the same time. Alternatively, the multiple fourth energy storage apparatuses are controlled to be charged one by one in the time-division manner, one by one alternately, or at the same time. Alternatively, without distinguishing the third energy storage apparatuses from the fourth energy storage apparatuses, all the energy storage apparatuses are controlled to be charged one by one in the time-division manner, one by one alternately, or at the same time.

FIGS. 36A to 36D show the charging process of the third energy storage apparatus 60 and/or the fourth energy storage apparatus 507. In FIGS. 36A to 36D, it is assumed that one fourth energy storage apparatus 507 and two third energy storage apparatuses 60 are provided, but the number of fourth energy storage apparatuses 507 or third energy storage apparatuses 60 is not limited thereto. In addition, in FIGS. 36A to 36D, Bat1 is the fourth energy storage apparatus, that is, the built-in battery pack, and Bat2 and Bat3 are the third energy storage apparatuses, that is, external battery packs. The first row represents the initial states of the battery packs. Each of the second row and its subsequent rows represent the charging states of the three battery packs at an occasion. It is to be understood that there may be multiple third energy storage apparatuses 60 and multiple fourth energy storage apparatuses 507, and no drawing is provided here.

Figure 36A:
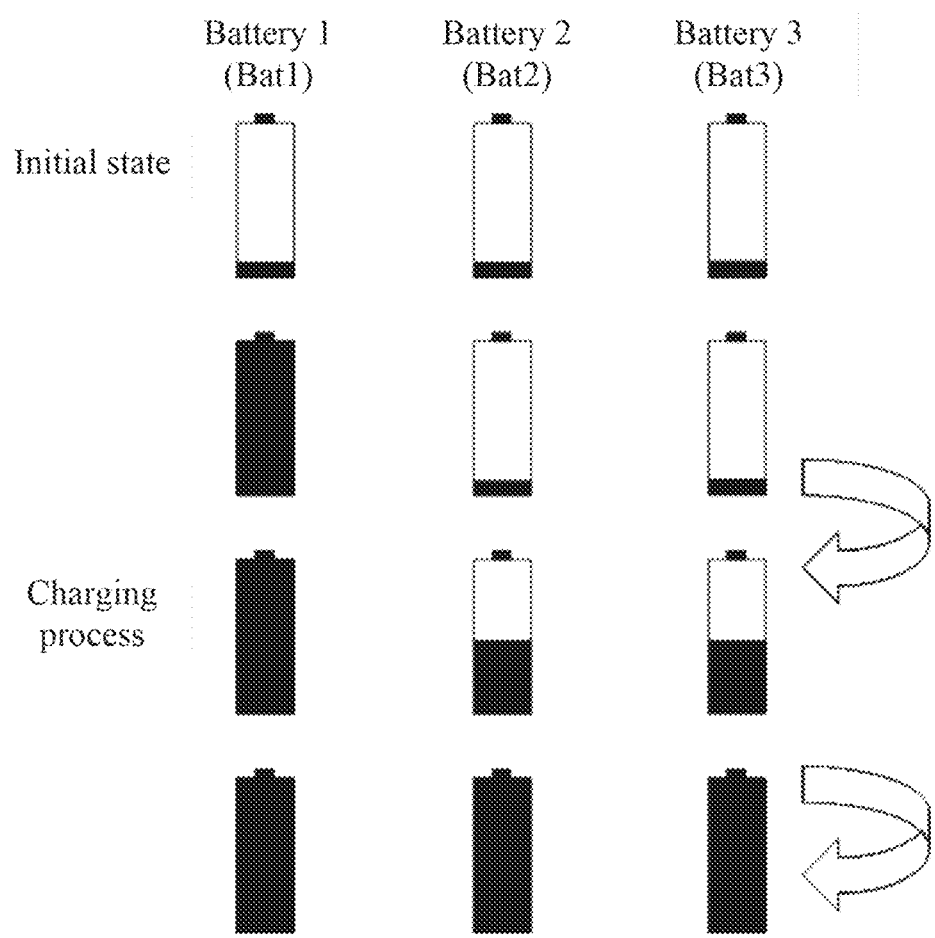
FIGS. 36A to 36D are schematic diagrams showing charging processes of energy storage apparatuses in this example.
Figure 36B:
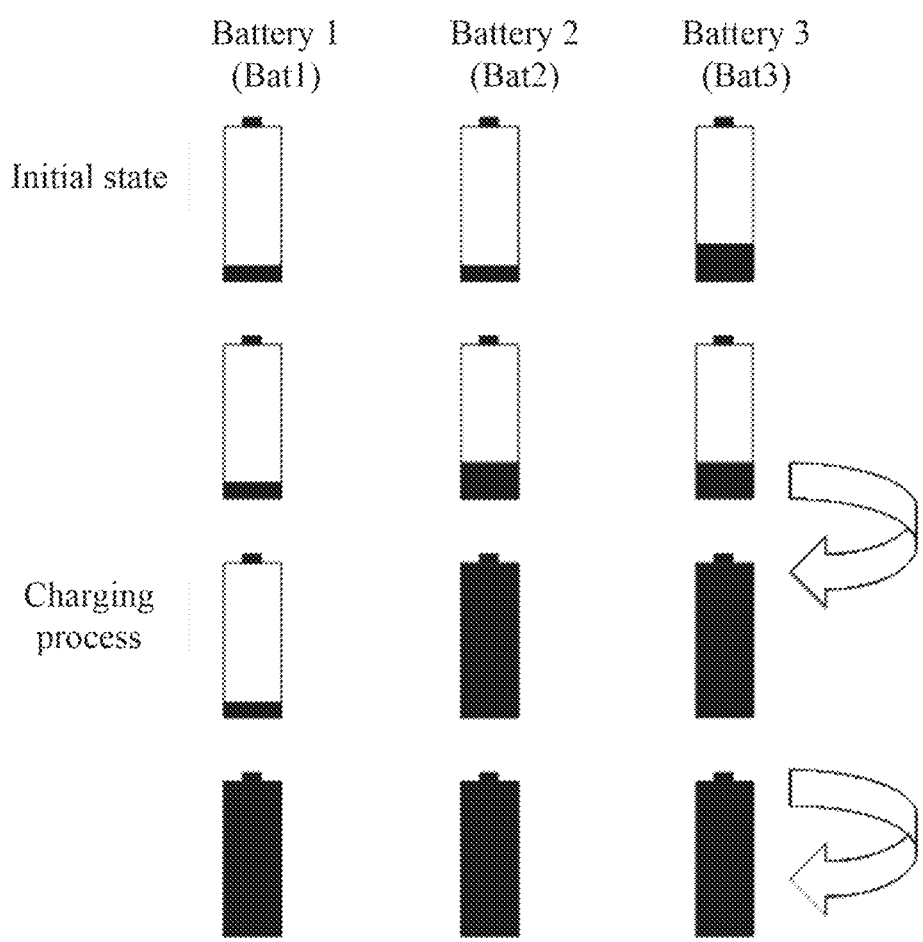

As shown in FIG. 36A, in the initial states, Bat1, Bat2, and Bat3 are all in the to-be-charged state. The power management module 501 may charge Bat1 until the Bat1 is fully charged substantially and then charge Bat2 and Bat3 at the same time. In FIG. 36B, the power management module 501 may control the one of Bat2 and Bat3 that has a lower voltage to be charged to have the same voltage as the other, then charge Bat2 and Bat3 at the same time until Bat2 and Bat3 are fully charged substantially, and next control Bat1 to be charged.

Figure 36C:
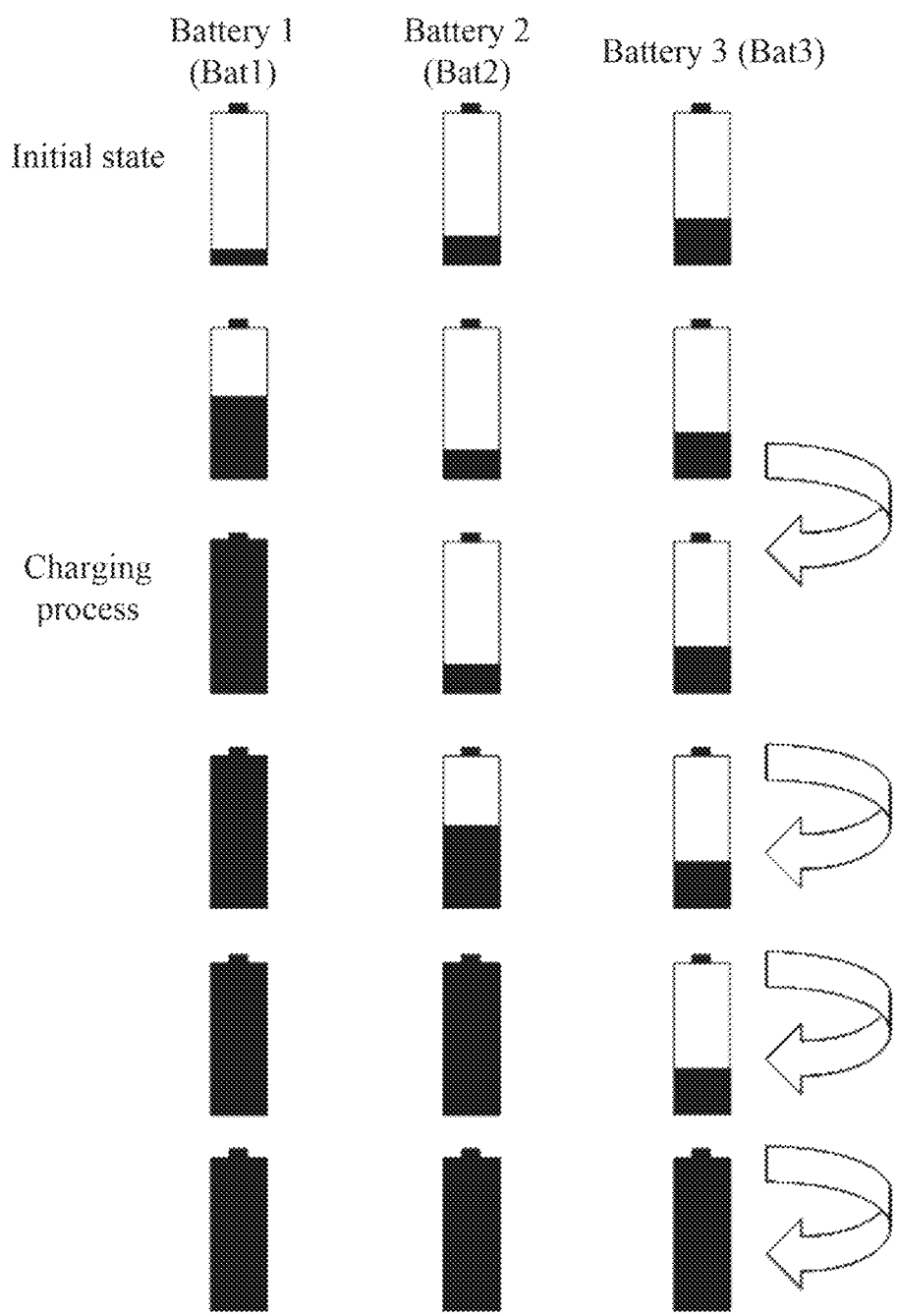

Alternatively, as shown in FIG. 36C, without distinguishing the types of energy storage apparatuses, that is, without distinguishing the built-in battery packs from the external battery packs, the power management module 501 may control the battery packs to be charged one by one in the time-division manner. That is, after one battery pack is fully charged substantially, another one is charged until all the battery packs are fully charged. The power management module 501 may charge the battery packs one by one in ascending order of voltage or battery level. For example, in this example, Bat1 with the lowest voltage is first charged until Bat1 is fully charged substantially. Then, Bat2 is charged until Bat2 is fully charged substantially. Finally, Bat3 is charged.

Figure 36D:
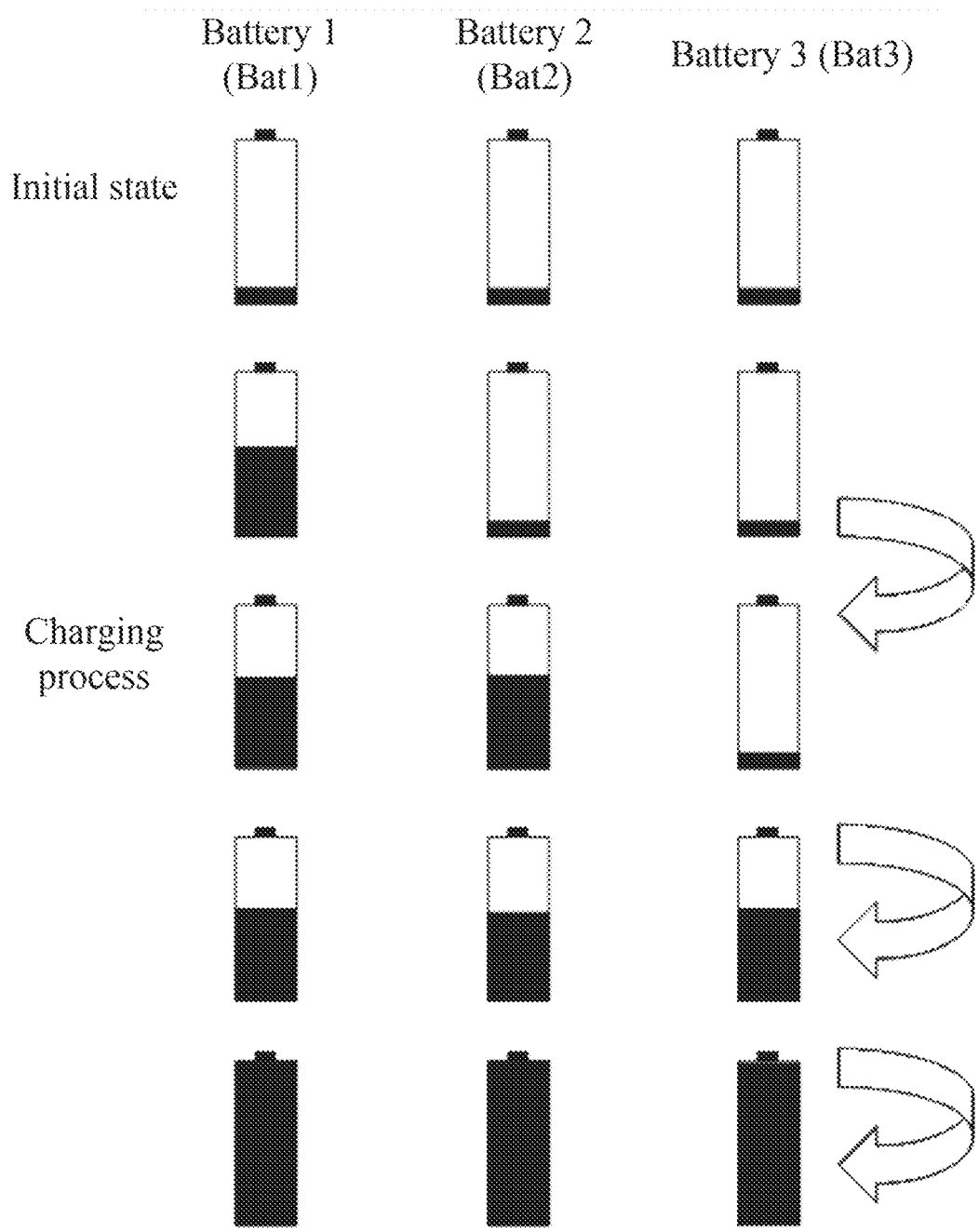

Alternatively, as shown in FIG. 36D, without distinguishing the types of energy storage apparatuses, that is, without distinguishing the built-in battery packs from the external battery packs, the power management module 501 may control the battery packs to be charged one by one alternately. For example, after one battery pack is charged for a period, another battery pack is charged for a period. For example, Bat1 is charged for a period t1 and then stops being charged, then Bat2 is charged for a period t1 and then stops being charged, and next, Bat3 is charged for a period t1. Within one charging cycle (about three periods t1), each of all the battery packs is charged for the period t1 in the time-division manner. In the next charging cycle, the battery packs are still charged according to the preceding process until all the battery packs are fully charged substantially.

The process in which all the energy storage apparatuses connected to the bidirectional power supply 5 are charged one by one shown in FIG. 36C may start from any other battery pack, which is not limited to the external battery packs. Similarly, the process in which all the energy storage apparatuses connected to the bidirectional power supply 5 are charged alternately shown in FIG. 36D may also start from any other battery pack, which is not limited to the external battery packs.

In this example, since the fourth energy storage apparatus 507 is built in the bidirectional power supply apparatus 5 and is inconvenient to replace, to prolong the service life of the fourth energy storage apparatus 507, the discharging cutoff voltage of the fourth energy storage apparatus 507 may be increased or the charging cutoff voltage of the fourth energy storage apparatus 507 may be reduced in the discharging or charging process of the fourth energy storage apparatus 507 so that the fourth energy storage apparatus 507 is subjected to no overdischarge or overcharge. Thus, the service life of the fourth energy storage apparatus 507 is ensured.

In this example, an external power supply or an external power supply port that can input the electrical energy to the bidirectional power supply apparatus 5 may be the utility power, the charging pile, the photovoltaic charging apparatus, the in-vehicle charging port, a type-C charging port which may also be referred to as a type-C charger, or the like. Therefore, when the bidirectional power supply apparatus 5 is connected to different power supply parties, it may be considered that the bidirectional power supply apparatus 5 has different charging manners. In this example, the bidirectional power supply apparatus 5 is charged by the utility power, which may be referred to as a first charging manner. The bidirectional power supply apparatus 5 is charged by the photovoltaic device or the in-vehicle charging port, which may be referred to as a second charging manner. The bidirectional power supply apparatus 5 is charged by the type-C charging port, which may be referred to as a third charging manner.

In an example, the bidirectional power supply apparatus 5 is capable of being charged in three charging manners at the same time. Nevertheless, the power management module 501 may control the charging of the bidirectional power supply apparatus 5 according to a maximum power charging mode and does not use the three charging manners at the same time. That is to say, when the bidirectional energy conversion module 502, the direct current charging module 503, and the direct charging/discharging module 504 are each connected to power supply parties that can serve as power supplies for supplying the power, the bidirectional power supply apparatus 5 does not use all the power supplies for supplying the power as the power supply parties to charge the energy storage apparatuses at the same time but may select, according to the maximum power charging mode, a power supply for supplying the power to charge the energy storage apparatuses.

In this example, in terms of the stability and power supply durability of the power supplies, the power management module 501 may charge the third energy storage apparatus 60 or the fourth energy storage apparatus 507 in the order of the first charging manner, the second charging manner, and the third charging manner. That is to say, as long as the utility power serves as a power supply party, the utility power is first used to charge the energy storage apparatus. If the energy storage apparatus is not fully charged after the utility power is cut off, the photovoltaic device or the in-vehicle charging port may be selected to charge the energy storage apparatus.

When the third energy storage apparatus 60 or the fourth energy storage apparatus 507 is charged, the power management module 501 may select corresponding charging manners according to different power supply parties accessed by the bidirectional power supply apparatus 5. In an example, when the utility power serves as the power supply party, regardless of where other power supply parties exist, the bidirectional power supply apparatus 5 may charge the energy storage apparatus in the first charging manner, disable other charging manner, or cause other charging manners to be in a wait state. In an example, if the power supply party is the photovoltaic device, the in-vehicle charging port, or the type-C charging port, the bidirectional power supply apparatus 5 may charge the energy storage apparatus in the second charging manner and disable the third charging manner or cause the third charging manner to be in the wait state. When the electrical energy is outputted in the second charging manner unstably or the second charging manner has a problem, the bidirectional power supply apparatus 5 may charge the energy storage apparatus in the third charging manner and disable the second charging manner or cause the second charging manner to be in the wait state.

In this example, the bidirectional power supply apparatus 5 may charge the third energy storage apparatus 60 or the fourth energy storage apparatus 507 while outputting the alternating current or the direct current to power, for example, the alternating current power tool or the direct current power tool or outputting the electrical energy through the USB interface to power a powered device with a USB interface. For example, when charging the energy storage apparatus with the utility power, the bidirectional power supply apparatus 5 may directly output the alternating current from the side of the power grid through a bypass to power the alternating current power tool. All the USB interfaces connected to the direct current charging/discharging module 504 may perform a discharging output. When charging the energy storage apparatus with the photovoltaic charging apparatus, the bidirectional power supply apparatus 5 may also output the alternating current to the alternating current power tool. In addition, all the USB interfaces may also perform the discharging output. When the bidirectional power supply apparatus 5 is charged through the USB type-C interface that can transfer the electrical energy bidirectionally, the bidirectional power supply apparatus 5 may also output the alternating current to power the powered device. In this case, all the USB type-A interfaces and the USB type-C interface that outputs the electrical energy to the outside may perform the discharging output.

In an example, after selecting the first charging manner, the second charging manner, or the third charging manner, the power management module 501 may charge the third energy storage apparatus 60 or the fourth energy storage apparatus 507 in the selected charging manner while outputting the electrical energy to the power tool or another powered device.

Figure 37:
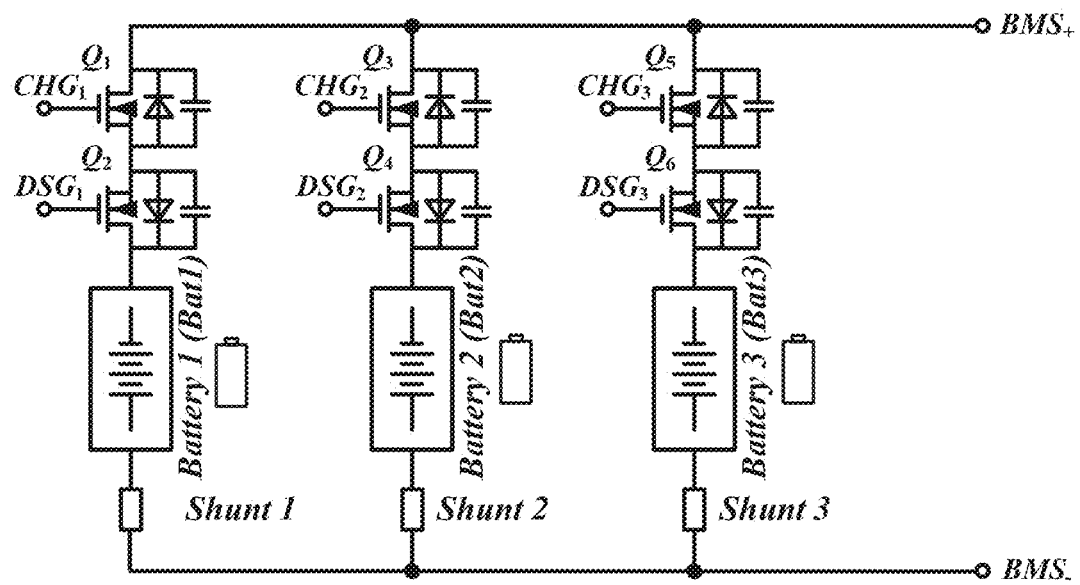
FIG. 37 is a circuit diagram showing electrical energy transfer paths in this example.
Figure 38:
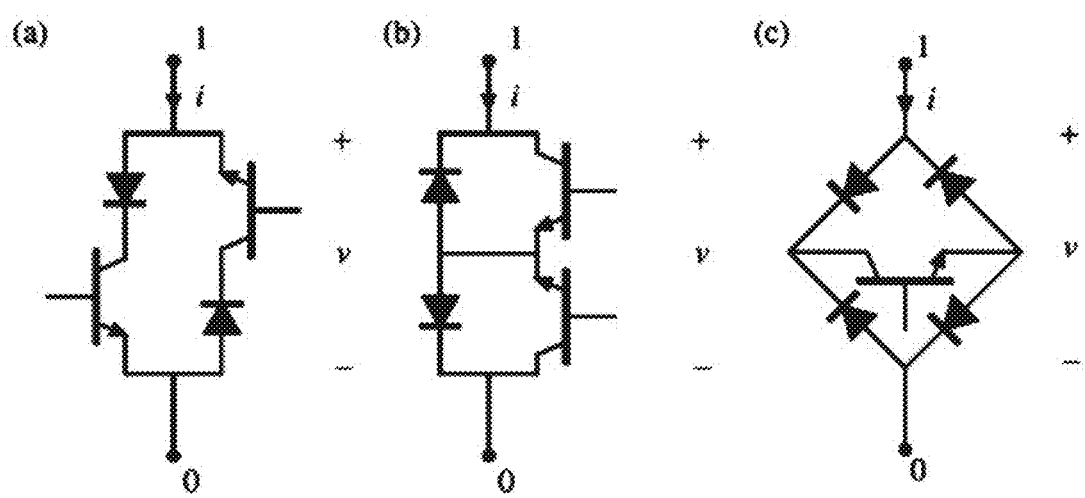
FIG. 38 is another circuit diagram showing electrical energy transfer paths in this example.

In an example, a charging circuit in the bidirectional power supply apparatus 5 may include multiple electrical energy transfer paths. Each energy storage apparatus corresponds to one electrical energy transfer path. Electronic switches Q are disposed on each electrical energy transfer path to control the transfer direction of the electrical energy. The electronic switches Q may be back-to-back power switches, that is, two metal-oxide semiconductor field-effect transistors (MOSFETs) in an anti-series connection. For example, as shown in FIG. 37, back-to-back MOSFETs Q1 and Q2 are disposed on the electrical energy transfer path for Bat1, back-to-back MOSFETs Q3 and Q4 are disposed on the electrical energy transfer path for Bat2, and back-to-back MOSFETs Q5 and Q6 are disposed on the electrical energy transfer path for Bat3. The energy storage apparatuses Bat1, Bat2, and Bat3 in this example may be the same as Bat1, Bat2, and Bat3 in FIGS. 36a to 36d. That is, Bat1 is the fourth energy storage apparatus as the built-in battery pack, and Bat2 and Bat3 are the third energy storage apparatuses as the external battery packs. In another example, it is also possible not to distinguish the built-in battery pack and the external battery packs among Bat1, Bat2, and Bat3. In this example, the controller may control the conduction states of the MOSFETs in the anti-series connection, thereby controlling the battery pack disposed on the electrical energy transfer path to be charged or discharge. For example, when Q1 is turned on and Q2 is turned off, Bat1 may be controlled to be charged, when Q3 is turned on and Q4 is turned off, Bat2 may be controlled to be charged, and when Q5 is turned on and Q6 is turned off, Bat3 may be controlled to be charged. The controller may control, according to a current charging manner or strategy, the preceding switches to be on or off, so as to charge the corresponding battery packs. In another example, several types of back-to-back switches shown in FIG. 38 may be disposed on the electrical energy transfer path for each battery pack. The specific working states of these switches are not described in detail here. In an example, each of the MOSFETs in FIG. 37 may be a gallium nitride power device, an insulated-gate bipolar transistor (IGBT), or the like.

Figure 39:
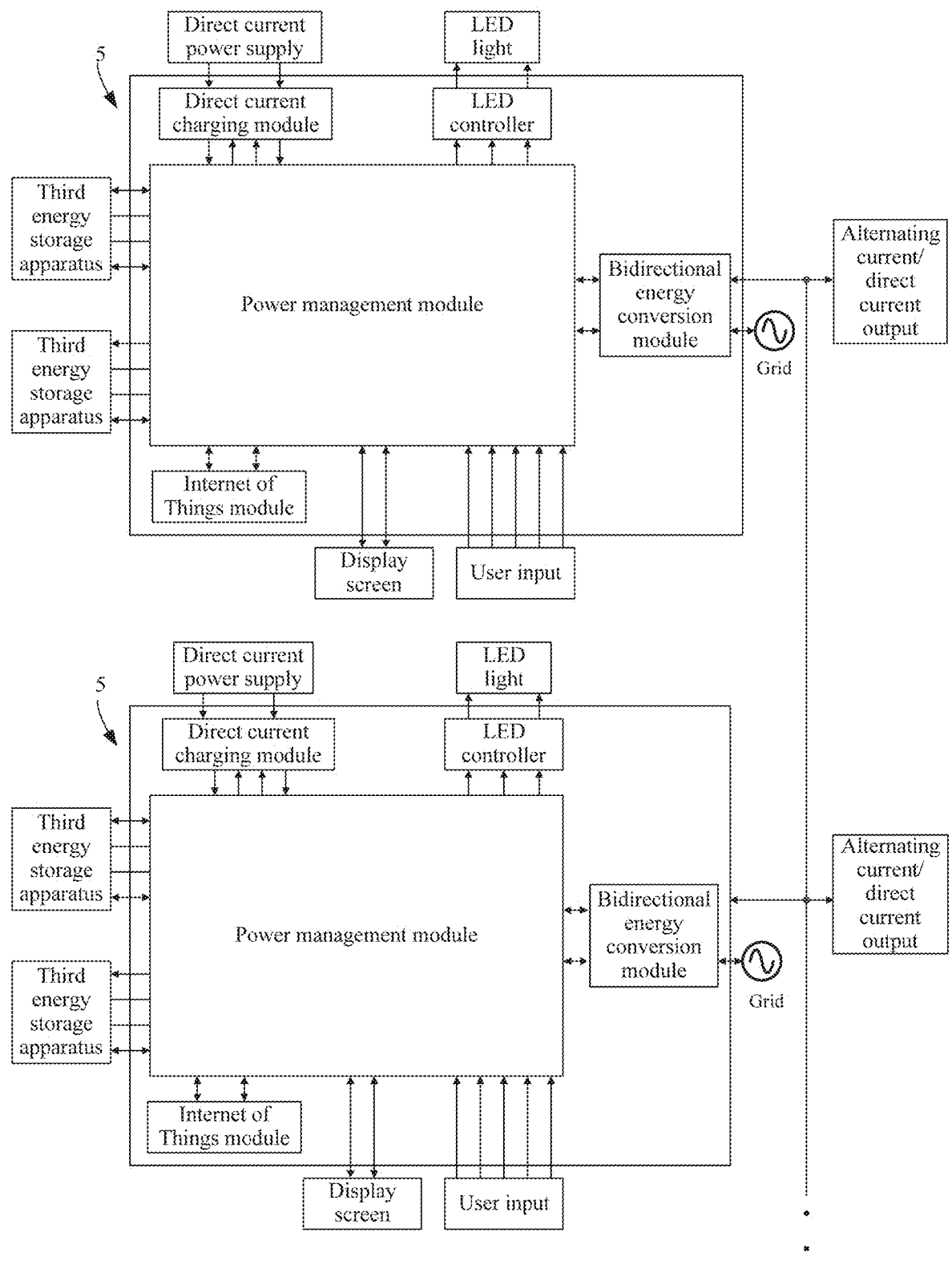
FIG. 39 is a circuit diagram showing that bidirectional power supply apparatuses are stacked in this example.
Figure 40A:
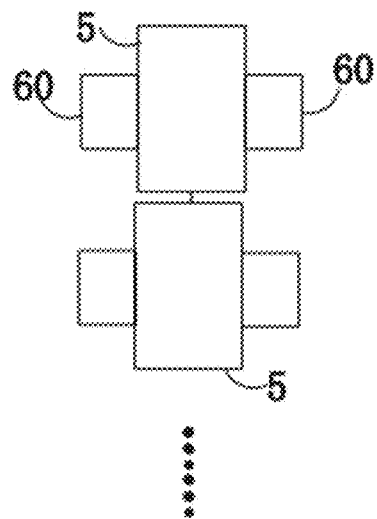
FIGS. 40A and 40B are structural diagrams showing that bidirectional power supply apparatuses are stacked as shown in FIG. 39.
Figure 40B:
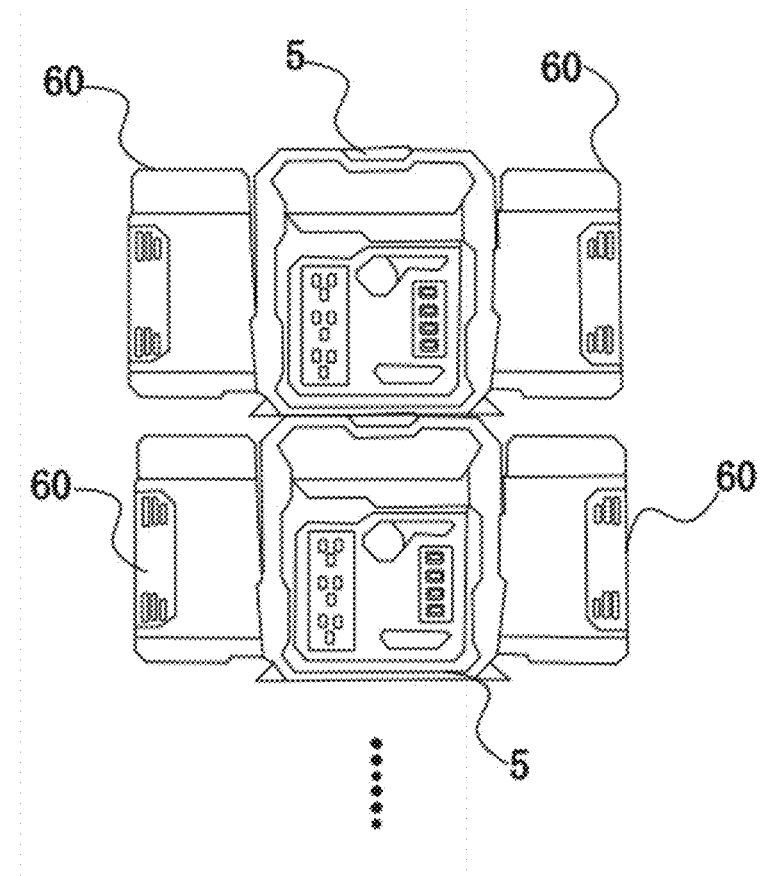

Referring to FIGS. 39 to 40B after each of multiple bidirectional power supply apparatuses 5 accesses at least one third energy storage apparatus 60 as the power supply for supplying the power, the output interfaces of at least two of the bidirectional power supply apparatuses 5 may be electrically coupled to each other to output the electrical energy for supplying the power so that the direct current powered device or the alternating current powered device is powered. This powering manner may be referred to as stacking. In FIG. 39, an example in which the two bidirectional power supply apparatuses are stacked is provided for illustration. The power is supplied in the stacking manner so that the overall output power of the multiple bidirectional power supply apparatuses and the total capacity of the energy storage apparatuses can be increased. That is to say, in this example, the capacity of a power supply apparatus system constituted by the multiple stacked bidirectional power supply apparatuses 5 is positively correlated with the number of third energy storage apparatuses 60 accessed by the power supply apparatus system. In addition, the output power of the power supply apparatus system is also positively correlated with the number of third energy storage apparatuses 60 accessed by the power supply apparatus system.

In an example, alternating current output ports 53 of the two bidirectional power supply apparatuses 5 may be electrically coupled to each other, or part of direct current output ports of the two bidirectional power supply apparatuses 5 may be electrically coupled to each other. When household electrical loads are relatively high, for example, in summer or winter, power outages may occur. The multiple stacked bidirectional power supply apparatuses 5 can satisfy a household electricity demand within a certain period. In this example, when the multiple bidirectional power supply apparatuses 5 are stacked, external housings or other structural components of all the bidirectional power supply apparatuses may be mechanically connected to each other.

In an example, the fourth energy storage apparatus may also be disposed in the bidirectional power supply apparatus 5 in FIGS. 39 to 40B.

Figure 41:
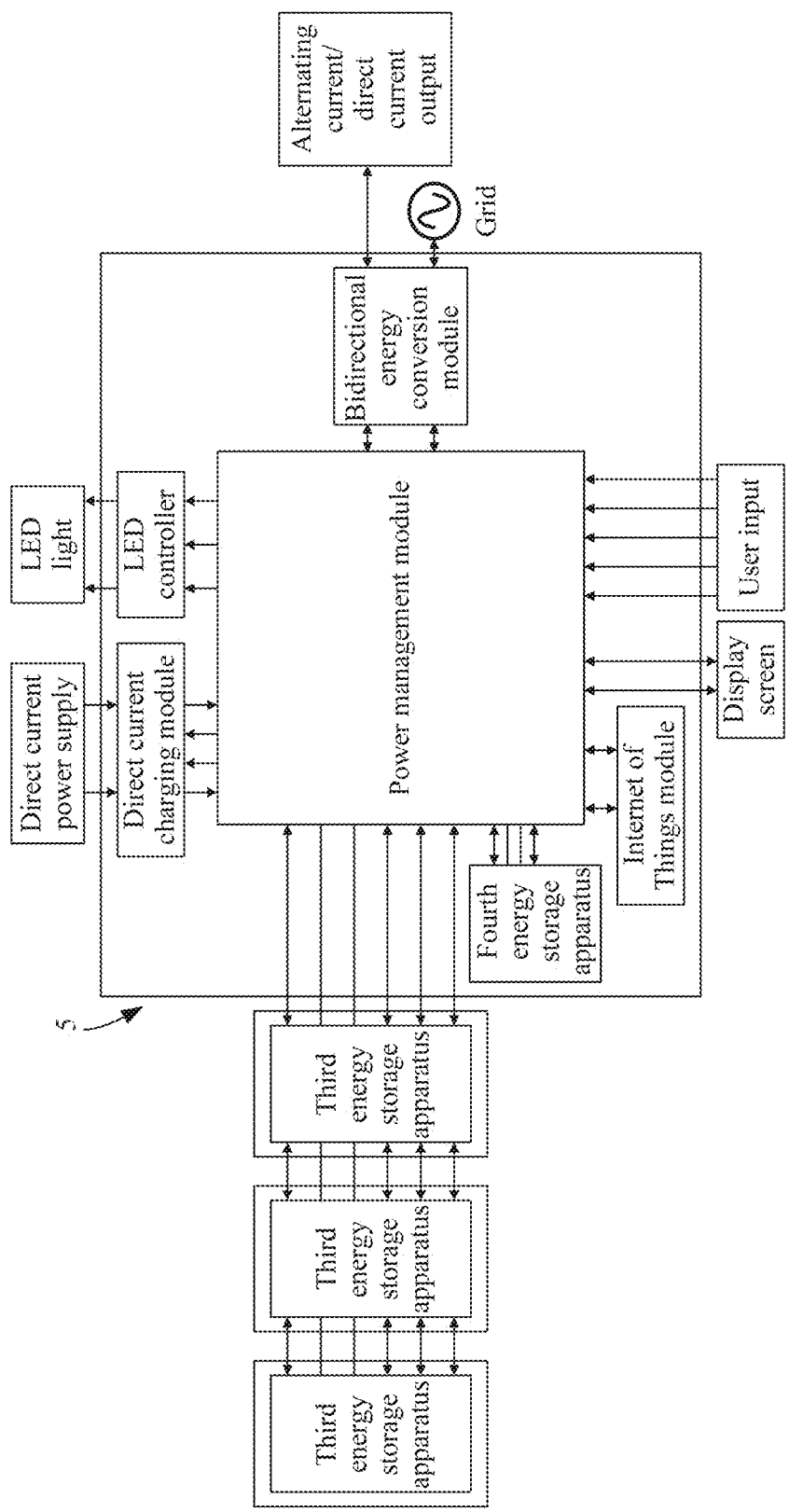
FIG. 41 is a circuit diagram showing that bidirectional power supply apparatuses are stacked in this example.

Referring to FIGS. 41 to 45, one bidirectional power supply apparatus 5 and multiple third energy storage apparatuses 60 may be stacked to discharge. Thus, the total discharging capacity of the bidirectional power supply apparatus 5 can be gradually increased, allowing the bidirectional power supply apparatus 5 to have long-lasting endurance. The bidirectional power supply apparatus 5 involved in this example is the same as the bidirectional power supply apparatus 5 in FIGS. 33 and 35. Therefore, this example follows some of reference numerals in FIGS. 33 and 35. Apparatuses or modules with the same reference numeral indicate the same content. The fourth energy storage apparatus is not shown in the bidirectional power supply apparatus 5 shown in FIG. 41. In this example, the third energy storage apparatus 60 may include a battery pack for power tools. The third energy storage apparatus 60 may be built in a capacity expansion compartment 61. As shown in FIG. 41, the multiple third energy storage apparatuses 60 are cascaded and then access the bidirectional power supply apparatus 5. The third energy storage apparatuses 60 may be cascaded in series and/or in parallel. That is to say, energy outputted by the multiple third energy storage apparatuses 60 can be transferred stage by stage until the energy is transferred to the bidirectional power supply apparatus 5.

Figure 42:
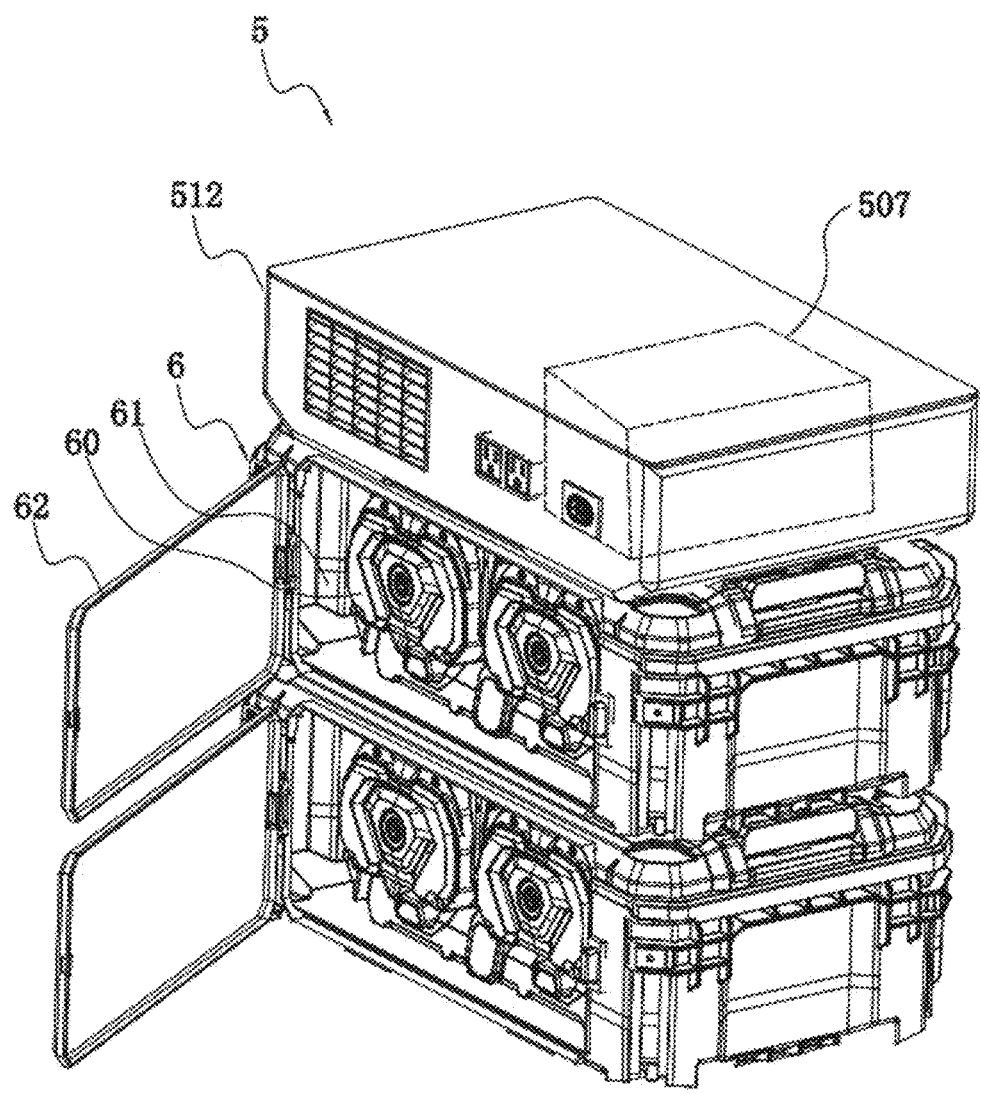
FIG. 42 is a structural view showing that bidirectional power supply apparatuses are stacked as shown in FIG. 41.
Figure 43:
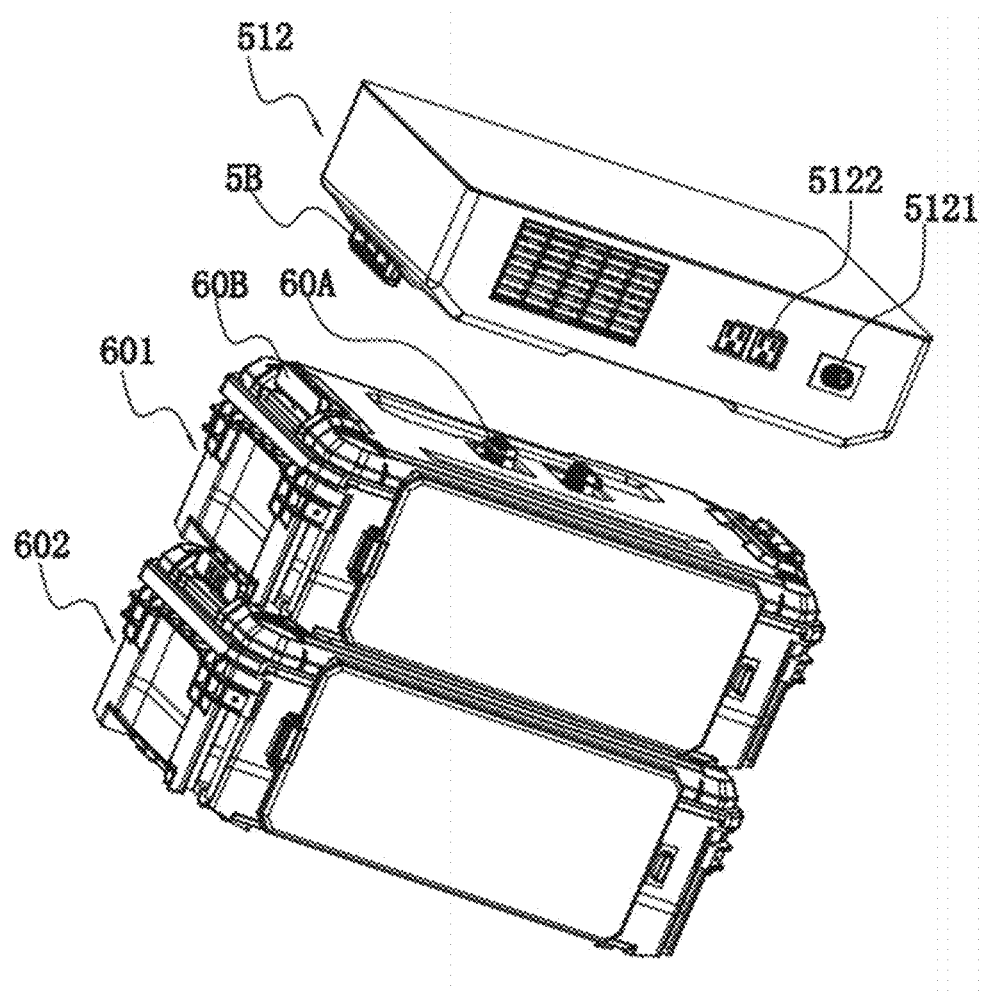
FIG. 43 is an exploded view showing that bidirectional power supply apparatuses are stacked as shown in FIG. 41.
Figure 44:
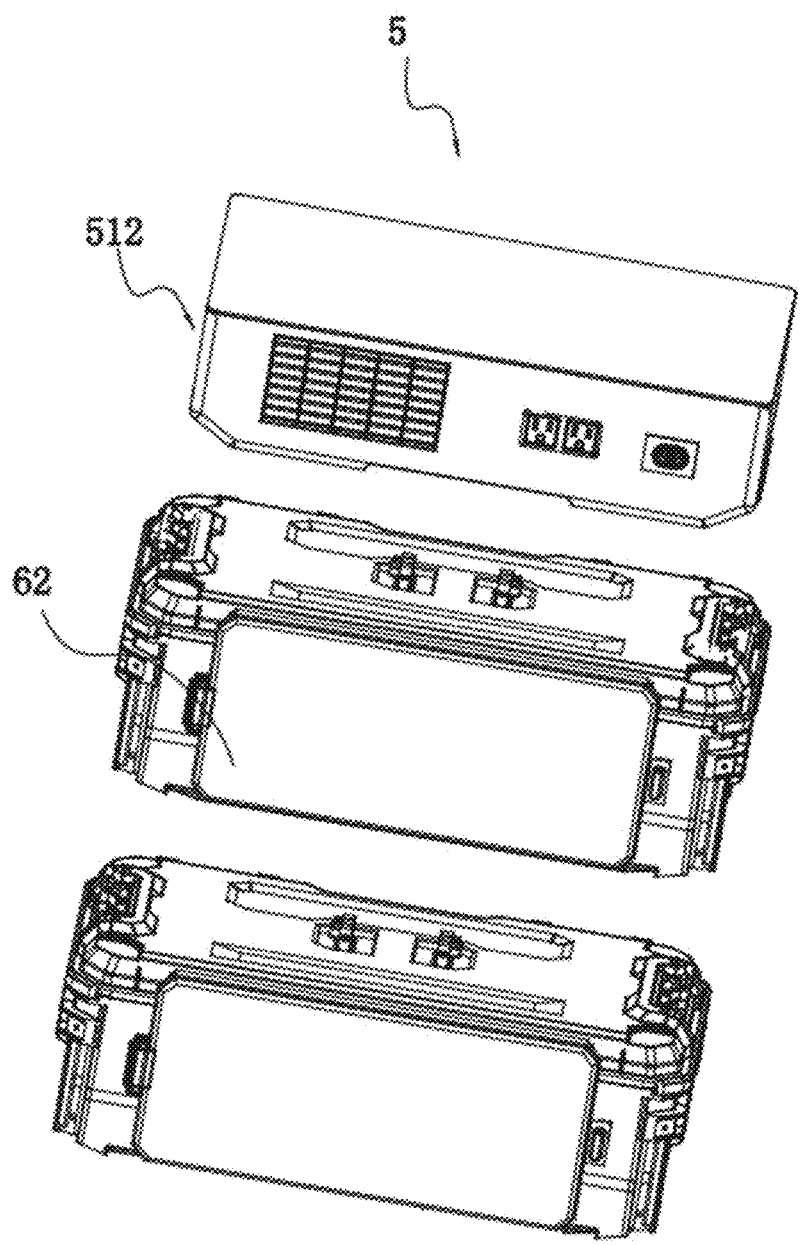
FIG. 44 is an exploded view showing that bidirectional power supply apparatuses are stacked as shown in FIG. 41 from a perspective.

Referring to FIG. 42, the bidirectional power supply apparatus 5 includes a housing 511. The fourth energy storage apparatus 507 is fixedly disposed in the housing 511. In this example, the bidirectional power supply apparatus 5 is detachably cascaded to at least one capacity expansion apparatus 6 to increase the total capacity of the bidirectional power supply apparatus 5. It is defined that a capacity expansion apparatus 6 directly connected to the bidirectional power supply apparatus 5 is a first capacity expansion apparatus 601 and a capacity expansion apparatus 6 indirectly connected to the bidirectional power supply apparatus 5 is a second capacity expansion apparatus 602. In this example, one or more first capacity expansion apparatuses 601 may be provided, and one or more second capacity expansion apparatuses 602 may be provided. Referring to FIG. 43, an electrical connection end 60A and a structural connection end 60B on the first capacity expansion apparatus 601 may be detachably connected to a corresponding electrical connection end (not shown) and a corresponding structural connection end 5B on the bidirectional power supply apparatus 5. The second capacity expansion apparatus 602 is connected to the first capacity expansion apparatus 601. The electrical connection manner and the structural connection manner between the preceding two capacity expansion apparatuses may be the same as the connection manners between the first capacity expansion apparatus 601 and the bidirectional power supply apparatus 5. In this example, the electrical connection manner and the structural connection manner of each second capacity expansion apparatus 602 may also be the same as the connection manners between the first capacity expansion apparatus 601 and the bidirectional power supply apparatus 5. The structural connection end 60B and the corresponding structural connection end 5B on the bidirectional power supply apparatus 5 may be referred to as an interlocking apparatus. The interlocking apparatus has a locked state and an unlocked state. In the locked state, the bidirectional power supply apparatus 5 may be directly connected to the first capacity expansion apparatus 601, and the bidirectional power supply apparatus 5 and the first capacity expansion apparatus 601 constitute a power supply apparatus. In the unlocked state, the bidirectional power supply apparatus 5 may be used as a power supply apparatus alone. The specific structure of the interlocking apparatus is not limited in the present application.

In this example, the capacity expansion compartment 61 and the third energy storage apparatus 60 built therein may be collectively referred to as the capacity expansion apparatus 6. That is to say, the capacity expansion apparatus 6 includes the capacity expansion compartment 61 and the third energy storage apparatus 60. The capacity expansion apparatus 6 may further include an apparatus cover 62 disposed at the inlet of the capacity expansion compartment 61. When the apparatus cover 62 is opened, the third energy storage apparatus 60 can be placed in the capacity expansion compartment 61 or removed from the capacity expansion compartment 61. The apparatus cover 62 may be made of a transparent or translucent material so that the user can conveniently observe the battery level display information or the charging and discharging states of the third energy storage apparatus 60 inside through the apparatus cover 62. In this example, locking mechanisms that can mate with each other are disposed on the third energy storage apparatus 60 and the capacity expansion compartment 61, respectively. The third energy storage apparatus 60 is locked by the locking mechanisms after the third energy storage apparatus 60 is mounted in the capacity expansion compartment 1.

Figure 45:
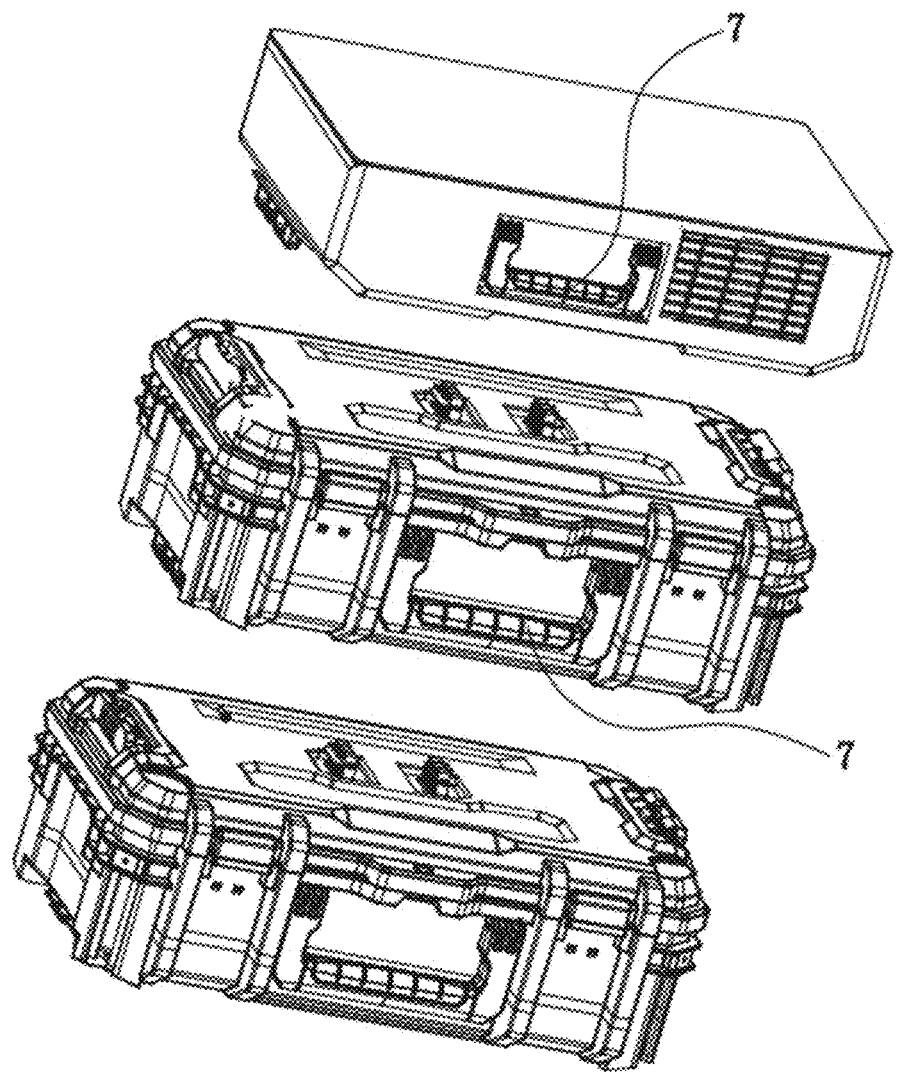
FIG. 45 is an exploded view showing that bidirectional power supply apparatuses are stacked as shown in FIG. 41 from another perspective.

The bidirectional power supply apparatus 5 may include a capacity expansion apparatus 6. In an implementation, the bidirectional power supply apparatus 5 includes an apparatus body 512 and a capacity expansion apparatus 6 detachably cascaded to the apparatus body 512. That is to say, the apparatus body 512 and the capacity expansion apparatus 6 collectively constitute the bidirectional power supply apparatus 5. The electrical connection and the structural connection between the apparatus body 512 and the capacity expansion apparatus 6 are the same as those in the preceding example and are not repeated here. Referring to FIG. 45, a handle 7 may be disposed on each of the apparatus body 512 and the capacity expansion apparatus 6 so that the user conveniently carries the apparatus body 512 or the capacity expansion apparatus 6 separately. The handle 7 may be disposed at the top or another position of the apparatus body 512. In another example, the apparatus body 512 and the capacity expansion apparatus 6 may be detachably connected to each other structurally or electrically through plugging and unplugging.

As shown in FIGS. 42 to 45, the apparatus body 512 includes the fourth energy storage apparatus 507 (not shown) built therein, at least one electrical energy input port 5121, at least one electrical energy output port 5122, and a bidirectional energy conversion module. In this example, the electrical energy input port 5121 and the electrical energy output port 5122 may be the same as the electrical energy transfer ports shown in FIG. 33. That is, the electrical energy input port 5121 and the electrical energy output port 5122 may be configured with reference to the alternating current input port 51, the first direct current input or output port 52, the alternating current output port 53, and the second direct current input or output port 54 in FIG. 33. The type of electrical energy input port, the type of electrical energy output port, and the positions of the electrical energy input port and the electrical energy output port on the apparatus body 512 are not specifically limited in the present application. The design of the bidirectional energy conversion module in this example is the same as the design of the energy conversion circuit 43 in the preceding example. The details are not repeated here.

In this example, the bidirectional power supply apparatus 5 can increase, by cascading multiple capacity expansion apparatuses 6, the total capacity of the apparatus in the case where the output voltage and output power are kept constant. That is to say, the output power or rated voltage of any capacity expansion apparatus 6 connected to the apparatus body 512 is the same as the output power or rated voltage of the fourth energy storage apparatus 507 in the apparatus body 512. During outdoor picnics, camping, or travel, the bidirectional power supply apparatus 5 may be cascaded to the multiple capacity expansion apparatuses 6 to supply the power so that the total capacity of the apparatus is increased to ensure the battery lifetime.

In this example, the capacity expansion apparatus 6 may at least have one or more third energy storage apparatuses 60 built therein. The multiple third energy storage apparatuses 60 may have the same or different electrical parameters. The electrical parameters may include the rated voltage or capacity of the third energy storage apparatus 60. For example, each of the multiple third energy storage apparatuses 60 is a 56-V battery pack. For example, the multiple third energy storage apparatuses 60 include a 12-V battery pack, an 18-V battery pack, and a 20-V battery pack.

In an example, all third energy storage apparatuses 60 in the first capacity expansion apparatus 601 may have the same electrical parameter while all third energy storage apparatuses 60 in the second capacity expansion apparatus 602 may have different electrical parameters. In an example, all the third energy storage apparatuses 60 in the first capacity expansion apparatus 601 have different electrical parameters while all the third energy storage apparatuses 60 in the second capacity expansion apparatus 602 have the same electrical parameter. In an example, all the third energy storage apparatuses 60 in the first capacity expansion apparatus 601 have different electrical parameters while all the third energy storage apparatuses 60 in the second capacity expansion apparatus 602 have different electrical parameters. In an example, all the third energy storage apparatuses 60 in the first capacity expansion apparatus 601 have the same electrical parameter while all the third energy storage apparatuses 60 in the second capacity expansion apparatus 602 have the same electrical parameter.

In this example, all the third energy storage apparatuses 60 in the same capacity expansion apparatus 6 may be connected in parallel and/or in series, which is specifically related to whether all the third energy storage apparatuses 60 in the capacity expansion apparatus 6 have the same electrical parameter and the electrical parameter of each of the third energy storage apparatuses is the same as the electrical parameter of the fourth energy storage apparatus 507. For example, the rated voltage of the bidirectional power supply apparatus 5 is 56 V, that is, the rated output voltage of the apparatus body 512 is 56 V. If all the third energy storage apparatuses 60 in the first capacity expansion apparatus 601 are 56-V battery packs, all the third energy storage apparatuses 60 in the first capacity expansion apparatus 601 are connected in parallel. If the first capacity expansion apparatus 601 includes 18-V and 20-V battery packs, all the third energy storage apparatuses 60 in the first capacity expansion apparatus 601 may be connected in series or in parallel.

In this example, the first capacity expansion apparatus 601 and the second capacity expansion apparatus 602 that are connected to the apparatus body 512 are electrically connected in parallel.

In this example, the power management module in the bidirectional power supply apparatus 5 can manage not only the charging and discharging of the fourth energy storage apparatus 507 in the apparatus body 512 but also the energy transfer between the fourth energy storage apparatus 507 and the third energy storage apparatuses 60 in the capacity expansion apparatus 6. For example, the third energy storage apparatuses 60 may be controlled to charge the fourth energy storage apparatus 507, or the fourth energy storage apparatus 507 may be controlled to charge the third energy storage apparatuses 60. In an example, the power management module may also control the fourth energy storage apparatus 507 to charge part of the third energy storage apparatuses 60 in the capacity expansion apparatus 6 or may control part of the third energy storage apparatuses 60 in the capacity expansion apparatus 6 to charge the fourth energy storage apparatus 507.

In an example, a capacity expansion management module (not shown) may be disposed in the capacity expansion apparatus 6 and can be electrically and/or communicatively connected to the power management module in the apparatus body 512. Thus, the battery type, the battery level, the voltage, or other battery information of each of the third energy storage apparatuses 60 in the capacity expansion apparatus 6 can be transmitted to the power management module in the apparatus body 512 so that the power management module controls the electrical energy transfer between the apparatus body 512 or the capacity expansion apparatus 6.

In an implementation, the capacity expansion management module in the second capacity expansion apparatus 602 may be electrically and communicatively connected to the capacity expansion management module in the first capacity expansion apparatus 601. The capacity expansion management module in the first capacity expansion apparatus 601 may be electrically and communicatively connected to the power management module in the apparatus body 512. Thus, the capacity expansion management module in the second capacity expansion apparatus 602 can indirectly communicate with the preceding power management module.

In an example, the power management module may also manage the power supply of the bidirectional power supply apparatus 5 to the external powered device.

In an example, after the bidirectional power supply apparatus 5 is cascaded to the multiple capacity expansion apparatuses 6, a moving wheel set may be detachably connected under the lowest capacity expansion apparatus 6 so that it is convenient for the user to push or pull the bidirectional power supply apparatus 5.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A bidirectional power supply apparatus, comprising:
   an alternating current input port configured to input an alternating current to the bidirectional power supply apparatus;
   an alternating current output port configured to output the alternating current to an alternating current device;
   a direct current input or output port configured to be capable of at least transmitting a direct current between the bidirectional power supply apparatus and a direct current device bidirectionally;
   a bidirectional energy conversion module configured to be capable of at least performing a plurality of energy conversions on electrical energy inputted to the bidirectional power supply apparatus; and
   a power management module electrically connected to at least the alternating current input port, the alternating current output port, and the direct current input or output port;
   wherein the power management module is configured to:
   control an energy conversion manner of the bidirectional energy conversion module according to a port connection status of the alternating current input port, the alternating current output port, or the direct current input or output port.

2. The bidirectional power supply apparatus according to claim 1, wherein the direct current input or output port comprises a direct current input port inputting the direct current to the bidirectional power supply apparatus, a direct current output port outputting the direct current to the direct current device, and a direct current input port/output port transmitting the direct current between the bidirectional power supply apparatus and the direct current device bidirectionally.

3. The bidirectional power supply apparatus according to claim 1, wherein the alternating current input port is configured to access at least utility power or a vehicle charging pile.

4. The bidirectional power supply apparatus according to claim 1, wherein the alternating current device comprises at least an alternating current power tool or an alternating current/direct current power tool, and the direct current device comprises at least a direct current power tool or the alternating current/direct current power tool.

5. The bidirectional power supply apparatus according to claim 2, wherein the direct current input port comprises at least one of a port for a photovoltaic charging apparatus and an in-vehicle charging port.

6. The bidirectional power supply apparatus according to claim 2, wherein the direct current input port/output port comprises at least one of a bidirectional Universal Serial Bus (USB) type-C interface and an energy storage apparatus.

7. The bidirectional power supply apparatus according to claim 2, wherein the direct current output port comprises at least one unidirectional USB type-C interface or at least one USB type-A interface.

8. The bidirectional power supply apparatus according to claim 1, further comprising an Internet of Things module configured to be capable of communicating with an external terminal device to acquire operation information inputted by a user through the external terminal device.

9. The bidirectional power supply apparatus according to claim 8, wherein the power management module is configured to adjust input power or output power of the alternating current input port, the alternating current output port, or the direct current input or output port according to at least the operation information.

10. The bidirectional power supply apparatus according to claim 1, further comprising light-emitting diode (LED) lights and an LED controller configured to control a lighting state of the LED lights, wherein the lighting state comprises at least a flashing frequency, an illumination intensity, or a number of lighted LED lights.

11. The bidirectional power supply apparatus according to claim 1, further comprising a display screen configured to display at least the port connection status of the alternating current input port, the alternating current output port, or the direct current input or output port.

12. A bidirectional power supply apparatus, comprising:
    a housing;
    at least one electrical energy input port configured to input electrical energy to the bidirectional power supply apparatus;
    at least one electrical energy output port configured to output the electrical energy to a powered device; and
    a bidirectional energy conversion module configured to be capable of at least performing a plurality of energy conversions on the electrical energy inputted to the bidirectional power supply apparatus;
    wherein the bidirectional power supply apparatus is detachably cascaded to at least one capacity expansion apparatus; and
    at least one first energy storage apparatus is built in a capacity expansion apparatus of the at least one capacity expansion apparatus.

13. The bidirectional power supply apparatus according to claim 12, wherein a plurality of first energy storage apparatuses in the capacity expansion apparatus have a same electrical parameter.

14. The bidirectional power supply apparatus according to claim 12, wherein each of a plurality of first energy storage apparatuses in the capacity expansion apparatus has a different electrical parameter.

15. The bidirectional power supply apparatus according to claim 12, wherein a plurality of first energy storage apparatuses built in a first capacity expansion apparatus directly connected to the bidirectional power supply apparatus have a same electrical parameter, and each of a plurality of first energy storage apparatuses built in a second capacity expansion apparatus indirectly connected to the bidirectional power supply apparatus has a different electrical parameter.

16. The bidirectional power supply apparatus according to claim 12, wherein each of a plurality of first energy storage apparatuses built in a first capacity expansion apparatus directly connected to the bidirectional power supply apparatus has a different electrical parameter, and a plurality of first energy storage apparatuses built in a second capacity expansion apparatus indirectly connected to the bidirectional power supply apparatus have a same electrical parameter.

17. The bidirectional power supply apparatus according to claim 12, further comprising a structural connection end and an electrical connection end, wherein the structural connection end and a structural connection end on the capacity expansion apparatus form an interlocking apparatus, and the electrical connection end is adapted to an electrical connection end on the capacity expansion apparatus.

18. The bidirectional power supply apparatus according to claim 12, further comprising a second energy storage apparatus disposed in the housing, wherein the at least one capacity expansion apparatus cascaded to the bidirectional power supply apparatus is configured to transfer the electrical energy to the second energy storage apparatus, and the second energy storage apparatus is configured to transfer the electrical energy to the at least one capacity expansion apparatus.

19. The bidirectional power supply apparatus according to claim 12, wherein a plurality of first energy storage apparatuses in the capacity expansion apparatus are connected in parallel and/or in series.

20. An energy apparatus, comprising:
   a load interface configured to access a load;
   a first power interface configured to access an alternating current power supply;
   a second power interface comprising a battery connection terminal adapted to be connected to a battery pack; and
   an energy conversion circuit having a first circuit port and a second circuit port;
   wherein the first circuit port is electrically connected to one or two of the load interface, the first power interface, and the second power interface, and the second circuit port is electrically connected to at least one remaining interface; and
   the energy conversion circuit is capable of performing a plurality of energy conversions on accessed electrical energy and outputting electrical energy to be supplied to the first circuit port and electrical energy to be supplied to the second circuit port.

\* \* \* \* \*